US012766860B2

(12) United States Patent
Idaka et al.

(10) Patent No.: US 12,766,860 B2
(45) Date of Patent: Oct. 20, 2026

(54) INK JET PRINTER

(71) Applicant: KEYENCE CORPORATION, Osaka (JP)

(72) Inventors: Mamoru Idaka, Osaka (JP); Shota Nakano, Osaka (JP); Kentaro Yamazaki, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 174 days.

(21) Appl. No.: 18/911,744

(22) Filed: Oct. 10, 2024

(65) Prior Publication Data

US 2025/0128525 A1 Apr. 24, 2025

(30) Foreign Application Priority Data

Oct. 18, 2023 (JP) ................................ 2023-179673

(51) Int. Cl.
*B41J 11/00* (2006.01)
*B41J 29/46* (2006.01)
(Continued)

(52) U.S. Cl.
CPC .......... *B41J 11/0095* (2013.01); *B41J 11/008* (2013.01); *B41J 29/46* (2013.01); *B65B 61/025* (2013.01); *G01B 11/254* (2013.01)

(58) Field of Classification Search
CPC ...................... B41J 29/393; B41J 2029/3935; B41J 2/2142; B41J 2/0451; B41J 2/04573;
(Continued)

(56) References Cited

U.S. PATENT DOCUMENTS 6,966,712 B2 11/2005 Trelewicz et al.
7,104,627 B2 9/2006 Weast
(Continued)

FOREIGN PATENT DOCUMENTS

JP 2014-144574 A 8/2014
WO WO-2024043923 A1 * 2/2024 ........... G01J 1/0228

OTHER PUBLICATIONS

Co-pending application: U.S. Appl. No. 18/911,654, filed Oct. 10, 2024, counterpart JP Patent Application No. 2023-179670.
(Continued)

*Primary Examiner* — Scott A Richmond
(74) *Attorney, Agent, or Firm* — WHDA, LLP

(57) ABSTRACT

An ink jet printer includes: a nozzle configured to eject ink toward a drawing target object; a storage unit that stores drawing data specifying an ejection timing of the nozzle at each of a plurality of offset positions, the ejection timing corresponding to drawing information; an optical movement measurement sensor that receives light from the drawing target object and generates a measurement value related to movement of the drawing target object in the conveyance direction based on the received light; a drawing control unit that controls ink ejection from the nozzle based on a current offset position based on the measurement value, and the drawing data; an evaluation unit that evaluates reliability of measurement by the optical movement measurement sensor; and an abnormality processing unit that executes an abnormality process when the reliability evaluated by the evaluation unit does not satisfy a predetermined criterion.

9 Claims, 55 Drawing Sheets

(51) Int. Cl.
*B65B 61/02* (2006.01)
*G01B 11/25* (2006.01)

(58) Field of Classification Search
CPC .... B41J 2/2139; B41J 2/16579; B41J 2/2135; B41J 2203/01
See application file for complete search history.

(56) References Cited

U.S. PATENT DOCUMENTS

| | | | | |
|---|---|---|---|---|
| 2005/0030331 | A1* | 2/2005 | Komatsu | B41J 2/04558<br>347/19 |
| 2013/0265361 | A1* | 10/2013 | Yatsunami | B41J 29/393<br>347/19 |

OTHER PUBLICATIONS

Co-pending application: U.S. Appl. No. 18/911,856, filed Oct. 10, 2024, counterpart JP Patent Application No. 2023-179676.
Co-pending application: U.S. Appl. No. 18/911,981, filed Oct. 10, 2024, counterpart JP Patent Application No. 2023-179680.
Co-pending application: U.S. Appl. No. 18/912,031, filed Oct. 10, 2024, counterpart JP Patent Application No. 2023-179683.
Co-pending application: U.S. Appl. No. 18/911,499, filed Oct. 10, 2024, counterpart JP Patent Application No. 2023-179690.

* cited by examiner

DRAWING CONTROL ACCORDING TO ONLY DETECTION SPEED OR DISTANCE

TIME RELATIONSHIP IN CASE OF CONSTANT-SPEED DRAWING

TIME RELATIONSHIP AT NON-CONSTANT SPEED BY ENCODER CONTROL, ETC.

FIG. 48

140

141 142 143 144

DRAWING RESULT CONFIRMATION SCREEN

| DRAWING No | DISTANCE TO WORKPIECE [mm] | | CONVEYANCE SPEED [mm/s] | | MOVEMENT IN PERPENDICULAR DIRECTION | |
|---|---|---|---|---|---|---|
| | MINIMUM | MAXIMUM | MINIMUM | MAXIMUM | MOVEMENT AMOUNT [mm] | SPEED [mm/s] |
| 1 | 5.0 | 5.2 | 500 | 505 | 0.1 | 0.0 |
| 2 | 4.9 | 5.0 | 499 | 506 | 0.0 | 0.0 |
| 3 | 5.0 | 5.2 | **221** | **578** | 0.5 | 0.0 |
| 4 | 5.1 | 5.2 | **0** | 503 | 0.1 | 0.0 |
| 5 | 5.0 | **9.2** | 500 | 505 | 0.1 | 0.0 |
| 6 | 5.0 | 5.2 | 499 | 506 | 0.1 | 0.0 |
| 7 | **0.1** | 5.2 | 500 | 505 | 0.1 | 0.0 |
| 8 | 5.0 | 5.2 | 499 | 506 | **5.0** | 0.0 |
| 9 | 5.0 | 5.2 | 501 | 511 | 3.3 | **115.0** |

FIG. 52

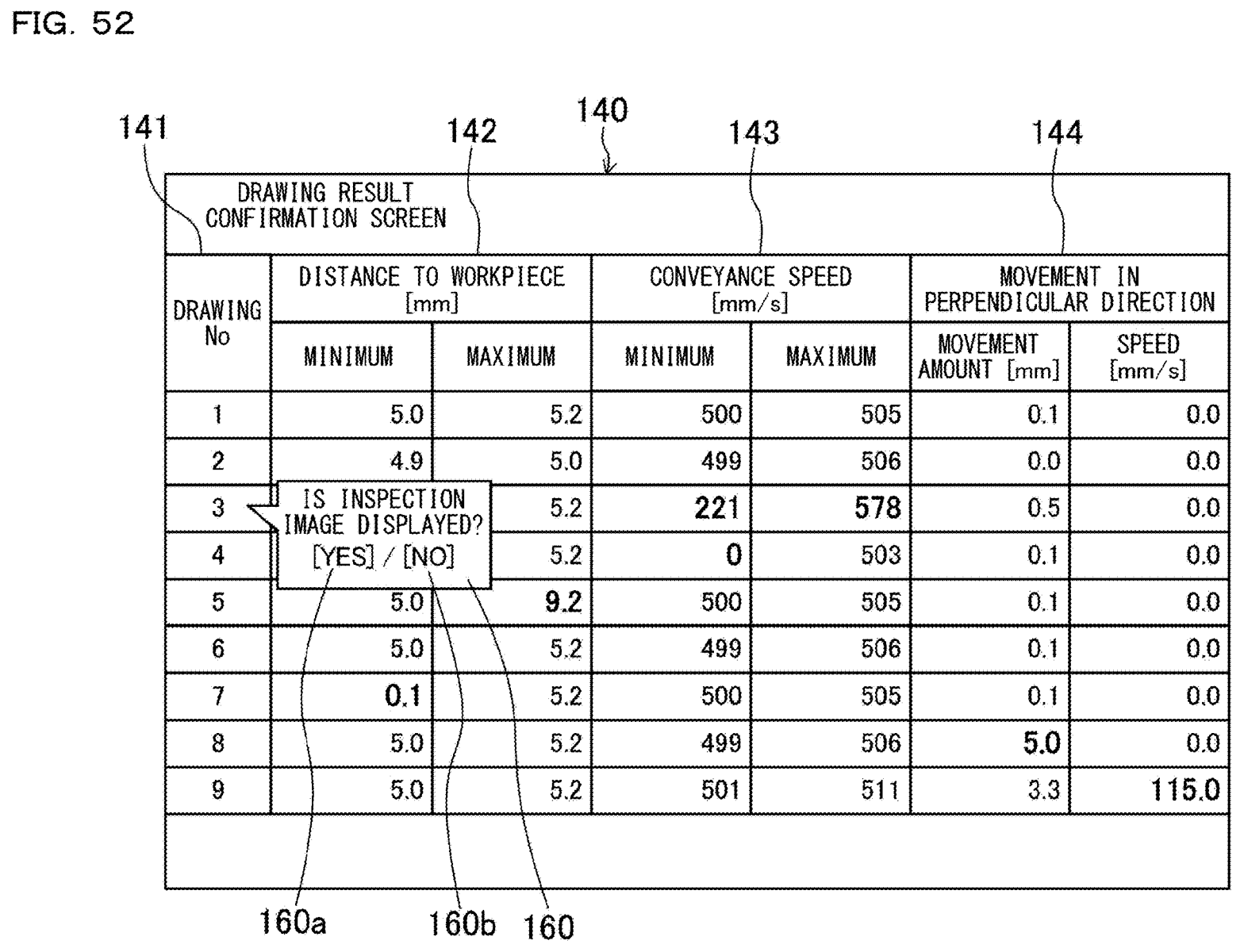

140

141 DRAWING RESULT CONFIRMATION SCREEN

| DRAWING No | 142 DISTANCE TO WORKPIECE [mm] MINIMUM | MAXIMUM | 143 CONVEYANCE SPEED [mm/s] MINIMUM | MAXIMUM | 144 MOVEMENT IN PERPENDICULAR DIRECTION MOVEMENT AMOUNT [mm] | SPEED [mm/s] |
|---|---|---|---|---|---|---|
| 1 | 5.0 | 5.2 | 500 | 505 | 0.1 | 0.0 |
| 2 | 4.9 | 5.0 | 499 | 506 | 0.0 | 0.0 |
| 3 | | 5.2 | **221** | **578** | 0.5 | 0.0 |
| 4 | | 5.2 | **0** | 503 | 0.1 | 0.0 |
| 5 | 5.0 | **9.2** | 500 | 505 | 0.1 | 0.0 |
| 6 | 5.0 | 5.2 | 499 | 506 | 0.1 | 0.0 |
| 7 | **0.1** | 5.2 | 500 | 505 | 0.1 | 0.0 |
| 8 | 5.0 | 5.2 | 499 | 506 | **5.0** | 0.0 |
| 9 | 5.0 | 5.2 | 501 | 511 | 3.3 | **115.0** |
| | | | | | | |

160 IS INSPECTION IMAGE DISPLAYED?
160a [YES] / 160b [NO]

INK JET PRINTER

CROSS-REFERENCE TO RELATED APPLICATIONS

The present application claims foreign priority based on Japanese Patent Application No. 2023-179673, filed Oct. 18, 2023, the contents of which are incorporated herein by reference.

BACKGROUND OF THE INVENTION

1. Technical Field

The disclosure relates to an ink jet printer that draws information by causing ejected ink to adhere to an object.

2. Description of the Related Art

For example, characters, symbols, images, and the like indicating various types of information such as a date, a serial number, and a barcode are drawn on packaging materials such as corrugated cardboard. JP 2014-144574 A discloses a drop-on-demand (DOD) type ink jet printer that performs printing by ejecting ink onto a packaging material.

In this ink jet printer, ink supplied from an ink tank is ejected from an ejection port formed in a nozzle, forms particulate ink, flies to a surface of a packaging material, and then lands on the surface, whereby a character or the like is drawn.

Meanwhile, drawing accuracy of an ink jet printer is determined depending on a relative movement speed of a drawing target with respect to a nozzle and a distance between the drawing target and the nozzle. However, at a site where the drawing target is conveyed, variations in a conveyance line speed and variations in a position of the drawing target on a conveyance line occur, and errors caused by a slip of the drawing target on the conveyance line also occur in principle. If the above-described variations and errors exceed a preset landing accuracy tolerance, a drawing failure occurs as a result.

SUMMARY OF THE INVENTION

The disclosure has been made in view of such a point, and an object thereof is to suppress occurrence of a drawing failure.

In order to achieve the above object, according to one embodiment of the disclosure, it is possible to assume an ink jet printer that ejects ink to draw information on an object conveyed by a conveyor. For example, the ink jet printer can include: an ink tank that stores the ink; a nozzle configured to eject the ink supplied from the ink tank toward a drawing target object; a storage unit that stores drawing data specifying an ejection timing of the nozzle at each of a plurality of offset positions in a conveyance direction, the ejection timing corresponding to drawing information; an optical movement measurement sensor that receives light from the drawing target object and generates a measurement value related to movement of the drawing target object in the conveyance direction based on the received light; a drawing control unit that controls ink ejection from the nozzle based on a current offset position based on the measurement value generated by the optical movement measurement sensor, and the drawing data; an evaluation unit that evaluates reliability of measurement by the optical movement measurement sensor; and an abnormality processing unit that executes an abnormality process when the reliability evaluated by the evaluation unit does not satisfy a predetermined criterion.

According to this configuration, the information such as characters including numbers, symbols, barcodes, two-dimensional codes, and images can be drawn on the object conveyed by the conveyor. At this time, the measurement value related to the movement of the drawing target object in the conveyance direction is generated by the optical movement measurement sensor. The ink ejection from the nozzle is controlled based on the current offset position based on the measurement value and the drawing data, but the current offset position becomes inaccurate if the reliability of the measurement by the optical movement measurement sensor is low, and the ink ejection is controlled based on the inaccurate current offset position, which may lead to occurrence of a drawing failure. In the present aspect, the reliability of the measurement by the optical movement measurement sensor is evaluated, and the abnormality process is executed at an appropriate timing when the evaluated reliability does not satisfy the predetermined criterion. This suppresses the occurrence of a large number of drawing failures.

In addition, the evaluation unit may evaluate the reliability based on an amount of received light received by the optical movement measurement sensor. In this case, when the amount of received light received by the optical movement measurement sensor is out of a predetermined range (for example, less than a predetermined range), the abnormality processing unit can execute the abnormality process by determining that the reliability does not satisfy the predetermined criterion. That is, there is a case where the measurement value is not obtained when the amount of received light of the optical movement measurement sensor is out of the predetermined range, and it is estimated that the measurement value is inaccurate even if the measurement value is obtained. Thus, in such a case, the drawing failure can be suppressed by executing the abnormality process.

The evaluation unit may evaluate the reliability based on whether the measurement by the optical movement measurement sensor is possible. In this case, the abnormality processing unit can execute the abnormality process by determining that the reliability does not satisfy the predetermined criterion when the measurement by the optical movement measurement sensor is impossible.

The abnormality processing unit may execute a notification process of notifying a user or the like of an abnormality as the abnormality process. The notification process can be executed using, for example, a display unit.

The abnormality processing unit can also execute an interruption process of interrupting drawing as the abnormality process. For example, the ink jet printer may further include a reception unit that receives selection of execution and non-execution of the interruption process. In this case, the abnormality processing unit can be configured to execute the interruption process in a case where the reception unit has received the execution of the interruption process, and not to execute the interruption process in a case where the reception unit has received the non-execution of the interruption process.

In addition, the optical movement measurement sensor may include: a light projecting unit that projects light onto the drawing target object; and a light receiving unit that receives a speckle pattern, generated according to a characteristic of a surface shape of the drawing target object by the light projected from the light projecting unit, and generates light reception data including the speckle pattern, and may generate the measurement value based on a movement amount of the speckle pattern included in the light reception data generated by the light receiving unit. In this case, the evaluation unit can evaluate the reliability based on a recognition rate and contrast distribution of the speckle pattern included in the light reception data generated by the light receiving unit. In addition, when the recognition rate of the speckle pattern is lower than a predetermined value, the abnormality processing unit can execute the abnormality process by determining that the reliability does not satisfy the predetermined criterion.

The ink jet printer may further include a movement amount acquisition unit that acquires a movement amount caused by the conveyor. When the reliability evaluated by the evaluation unit does not satisfy the predetermined criterion, the drawing control unit can control the ink ejection from the nozzle based on the movement amount acquired by the movement amount acquisition unit and the drawing data.

As described above, the reliability of the optical movement measurement sensor that generates the measurement value related to the movement of the drawing target object in the conveyance direction is evaluated so as to execute the abnormality process when the reliability does not satisfy the predetermined criterion, and thus, the occurrence of the drawing failure can be suppressed.

BRIEF DESCRIPTION OF THE DRAWINGS

FIG. 48 is a view illustrating a drawing result confirmation screen;

FIG. 52 is a view illustrating an image display confirmation window;

DETAILED DESCRIPTION

Hereinafter, an embodiment of the invention will be described in detail with reference to the drawings. Note that the following preferred embodiment is described merely as an example in essence, and there is no intention to limit the invention, its application, or its use.

Figure 1:
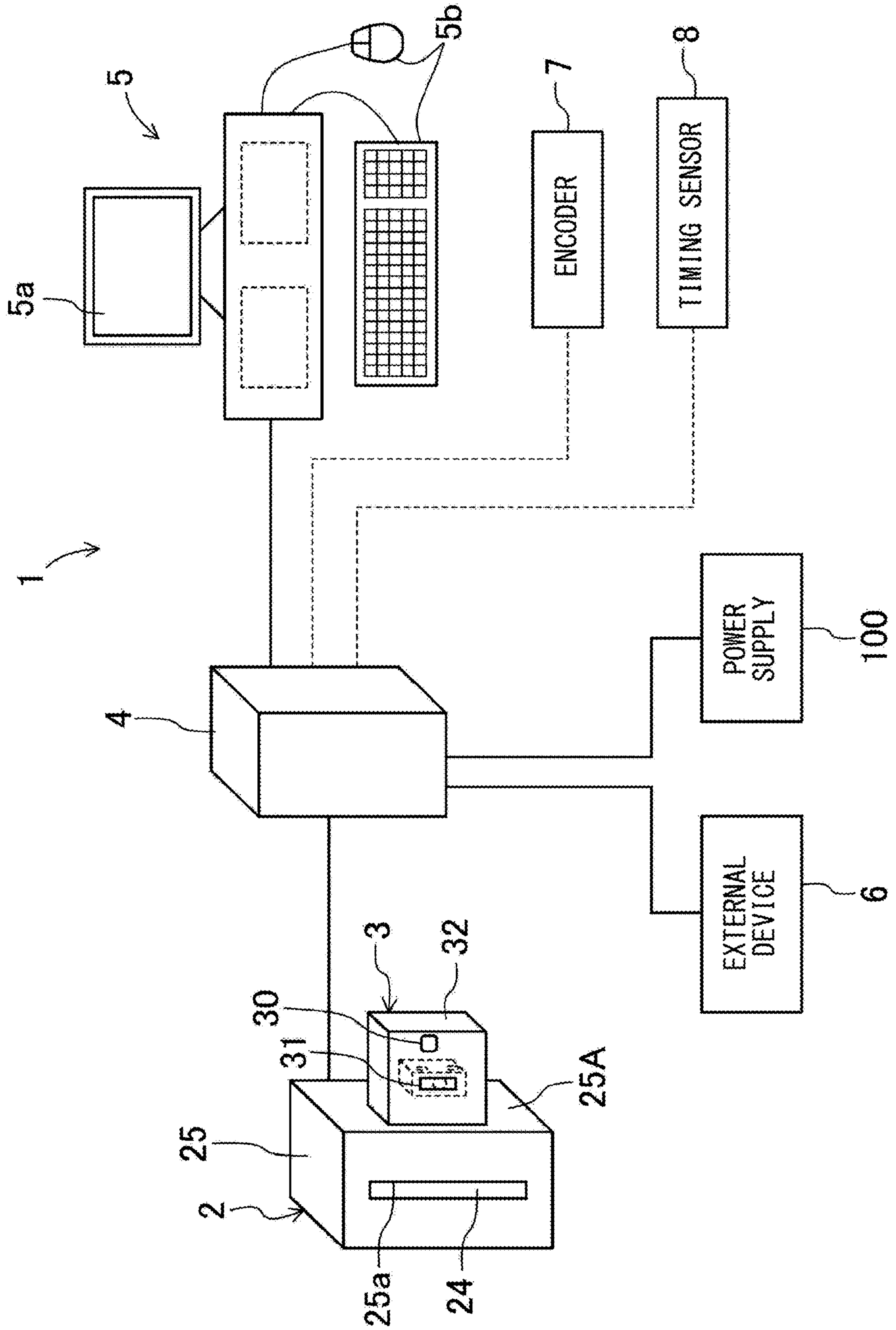
FIG. 1 is a view illustrating an overall configuration of an ink jet printer according to an embodiment of the invention.
Figure 2:
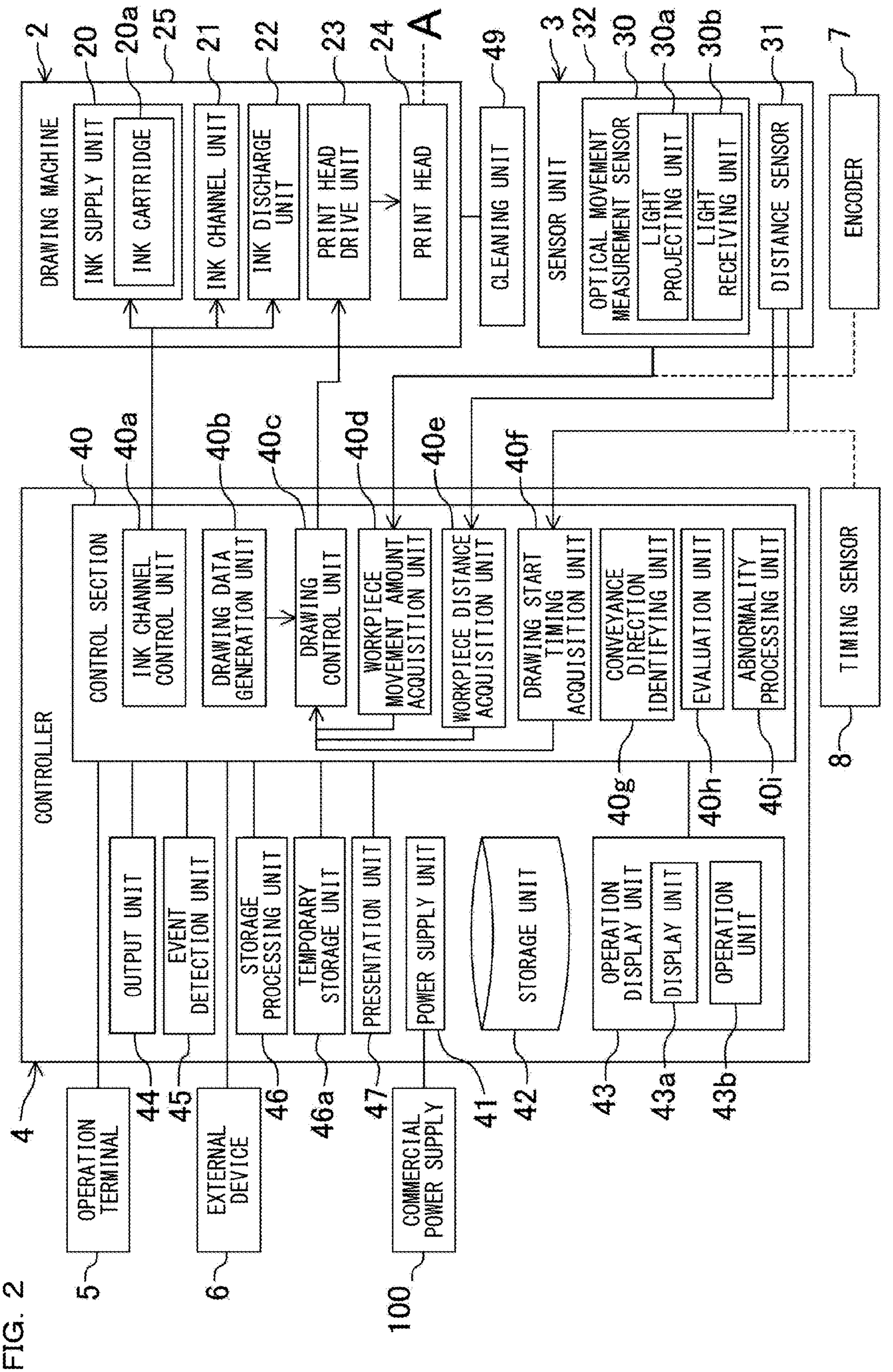
FIG. 2 is a block diagram of the ink jet printer.

FIG. 1 is a diagram illustrating an overall configuration of an ink jet printer 1 according to the embodiment of the invention, and FIG. 2 is a block diagram of the ink jet printer 1. The ink jet printer 1 includes, for example, a drawing machine 2, a sensor unit 3, a controller 4, and an operation terminal 5. The drawing machine 2 is a portion that executes a drawing process on a drawing target object, and is configured separately from the controller 4. The sensor unit 3 is a portion that executes measurement required to execute the drawing process by the drawing machine 2 and measurement required to execute drawing inspection, and is configured separately from the controller 4. The controller 4 is a portion that controls the drawing machine 2 and the sensor unit 3, and can also be referred to as a control apparatus, a control unit, or the like. The operation terminal 5 includes a personal computer and the like, and is a portion that allows a user to perform, for example, input of drawing information, various settings, selection, confirmation, and the like. The operation terminal 5 includes, for example, a terminal-side display unit 5*a* including a liquid crystal display and the like and a terminal-side operation unit 5*b* including a keyboard, a mouse, a pointing device, and the like.

The above configuration example is an example, and the invention is not limited to the above configuration example. That is, the controller 4 may be incorporated in the operation terminal 5 or may be incorporated in the drawing machine 2. In addition, the operation terminal 5 may function as the controller 4. In addition, FIGS. 1 and 2 illustrate an external device 6 including a programmable logic controller (PLC) and the like, and the external device 6 is communicably connected to the controller 4. A control signal output from the external device 6 is input to the controller 4. The external device 6 may be a device constituting a part of the ink jet printer 1, or may be a device separate from the ink jet printer 1.

FIGS. 1 and 2 illustrate an encoder 7 and a timing sensor 8. The encoder 7 is a movement amount acquisition unit that acquires information regarding a movement amount of a conveyor 10 illustrated in FIG. 3 to be described later. Examples of the information regarding the movement amount can include a pulse signal, and the movement amount can be calculated by the number of such pulse signals. The timing sensor 8 is a sensor configured to detect that the drawing target object conveyed by the conveyor 10 has arrived at a predetermined position, and can typically include a photoelectric sensor, a mark sensor, a distance sensor, and the like.

One or both of the encoder 7 and the timing sensor 8 are provided. The encoder 7 and the timing sensor 8 may be devices each constituting a part of the ink jet printer 1, or may be devices separate from the ink jet printer 1.

Figure 3:
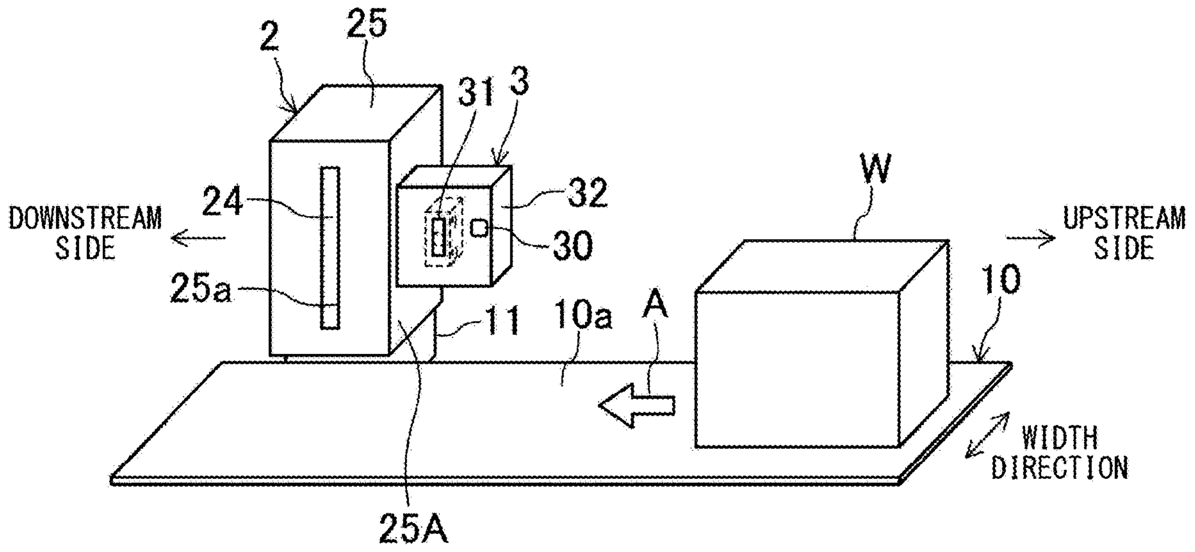
FIG. 3 is a perspective view illustrating the ink jet printer during operation.

As illustrated in FIG. 3, the ink jet printer 1 is an apparatus configured to draw various types of information on a workpiece W (an example of the drawing target object) conveyed by the conveyor 10, and is an in-line apparatus used by being incorporated in a manufacturing line (also referred to as a production line). The conveyor 10 is, for example, a belt conveyor, a roller conveyor, or the like. The conveyor 10 constitutes the production line. The production line is installed in various factories, warehouses, and the like.

The drawing machine 2 is fixed such that a relative position with respect to the conveyor 10 has a predetermined positional relationship. A member, an apparatus, a tool, and the like for fixing the drawing machine 2 are not particularly limited, and examples thereof can include a fixing member 11 such as a fixing base or a bracket. The fixing member 11 may be fixed to floor surfaces of factories, warehouses, and the like, or may be fixed to a frame or the like of the conveyor 10.

During operation of the ink jet printer 1, a plurality of the workpieces W are sequentially conveyed in a direction of an arrow A illustrated in FIG. 3 in a state of being placed on a conveyance surface 10*a* of the conveyor 10. Therefore, an upstream side in the conveyance direction is a right side in FIG. 3, and a downstream side in the conveyance direction is a left side in FIG. 3. The plurality of workpieces W are placed on the conveyance surface 10*a* in a state of being spaced apart from each other in the direction of the arrow A which is the conveyance direction. A direction orthogonal to the direction of the arrow A and along the conveyance surface 10*a* is defined as a width direction. The conveyance surface 10*a* may be horizontal or may be inclined so as to have a predetermined angle with respect to the horizontal plane, and thus, the direction of the arrow A is not always the horizontal direction.

Not all the plurality of workpieces W are placed at the same position in the width direction of the conveyance surface 10*a*, and placement positions of the workpieces W on the conveyance surface 10*a* may deviate from each other in the width direction of the conveyance surface 10*a*. In addition, the workpiece W is conveyed by a frictional force acting between the workpiece W and the conveyance surface 10*a*, and thus, the workpiece W may also slip with respect to the conveyance surface 10*a* due to certain causes. In the present embodiment, the favorable drawing quality of the drawing machine 2 can be maintained even if the deviation in the width direction, the slip with respect to the conveyance surface 10*a*, or the like of the workpiece W occurs as will be described later.

Although not particularly limited, and examples of the workpiece W can include a packing material for packing various products. As a typical example of the packing material, for example, corrugated cardboard or the like can be mentioned. The ink jet printer 1 draws information such as characters including numbers, symbols, barcodes, two-dimensional codes, images, marks, illustrations, and combinations thereof on the workpiece W conveyed by the conveyor 10. In a case of drawing only characters, the ink jet printer 1 can also be referred to as a typewriting apparatus or the like, and the drawing machine 2 can also be referred to as a typewriting machine. In addition, the drawing of information by the ink jet printer 1 also includes a case of printing images and the like. In this case, the ink jet printer 1 can be referred to as a printing apparatus. In the following description, typewriting and printing are simply referred to as drawing.

(Configuration of Drawing Machine 2)

The drawing machine 2 is a drawing machine of a drop on demand (DOD) system that ejects ink only when there is a need as a drawing operation, but may be a drawing machine of a continuous ink jet (CIJ) system that ejects ink even when the drawing operation is not performed, other than the DOD system. Hereinafter, a case where the drawing machine of the DOD system is used as the drawing machine 2 of the present embodiment will be described.

As illustrated in FIG. 2, the drawing machine 2 includes an ink supply unit 20, an ink channel unit 21, an ink discharge unit 22, a print head drive unit 23, and a DOD print head (hereinafter, referred to as a print head) 24. The drawing machine 2 also includes a main housing 25 in which the print head 24 is provided. A member 25A (illustrated in FIGS. 1 and 3) constituting the main housing 25 is an attachment portion configured to fix the ink jet printer 1 at an attachment position. The ink jet printer 1 can be fixed so as not to move from the predetermined attachment position by attaching the member 25A constituting the main housing 25 to the fixing member 11 as illustrated in FIG. 3. The attachment portion may be, for example, a bracket, a fastening member such as a bolt or a screw, or the like.

The print head 24 is fixed in a state of being accommodated in the main housing 25, and a positional relationship between the main housing 25 and the print head 24 is fixed. In addition, the ink supply unit 20, the ink channel unit 21, the ink discharge unit 22, and the print head drive unit 23 are also accommodated inside the main housing 25.

The print head 24 of the drawing machine 2 of the DOD system is a member corresponding to a nozzle of the invention, and ejects ink to draw information on the workpiece W. There are a plurality of types of structures of the print head 24, and for example, any of a thermal ink jet type, a valve jet type, and a piezo type may be used. In the present embodiment, a piezo type print head capable of performing drawing with low resolution to high resolution, having a wide drawing width, and having high durability is used as the print head 24.

Figure 4:
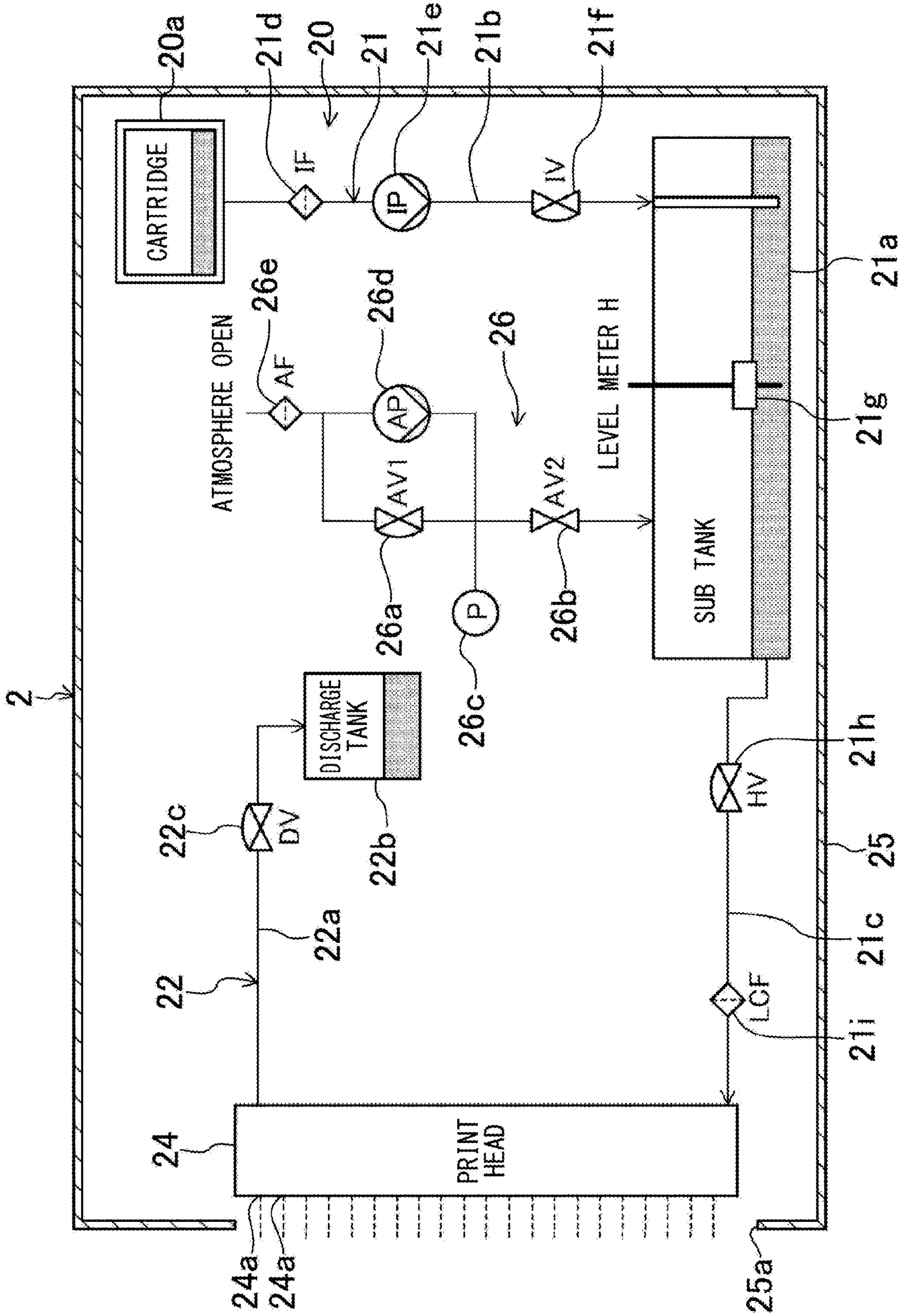
FIG. 4 is a diagram illustrating a channel of ink of a drawing machine.

As illustrated in FIG. 4, the print head 24 includes a plurality of ejection ports 24*a* formed along an up-down direction (first direction). As illustrated in FIG. 3, an opening 25*a* that is long in the up-down direction is formed on a face of the main housing 25 opposing the workpiece W. A face of the print head 24 on which the ejection ports 24*a* are formed is arranged so as to face the outside through the opening 25*a* of the main housing 25. Therefore, the ink ejected from the ejection ports 24*a* of the print head 24 flies out of the main housing 25 from the opening 25*a* of the main housing 25 and adheres to the workpiece W.

FIG. 4 illustrates a channel of ink of the drawing machine 2. The ink supply unit 20 is a portion that supplies ink to the ink channel unit 21, and includes an ink cartridge 20*a*. The ink cartridge 20*a* is detachably attached to a main body portion of the ink supply unit 20, that is, the main housing 25. When ink in the ink cartridge 20*a* runs out, the ink cartridge 20*a* can be replaced. Instead of the ink cartridge 20*a*, an ink reservoir that can be refilled with ink may be provided.

The ink channel unit 21 includes a sub tank 21*a* that stores ink supplied from the ink cartridge 20*a*, an upstream channel 21*b*, and a downstream channel 21*c*. The ink cartridge 20*a* and the sub tank 21*a* are ink tanks that store ink. In this embodiment, a hydraulic head pressure of an ink liquid level in the sub tank 21*a* is applied to the print head 24 as a negative pressure. Therefore, the ink ejected from the print head 24 is replenished by being sucked from the sub tank 21*a* by capillary action of a nozzle orifice (not illustrated) formed in the print head 24. In addition, a meniscus of ink replenished to the print head 24 is at a position corresponding to the balance between the capillary action of the nozzle orifice and the hydraulic head pressure of the ink liquid level in the sub tank 21*a*. The ink is supplied from the ink cartridge 20*a* to the sub tank 21*a* such that the hydraulic head pressure of the ink liquid level in the sub tank 21*a* is within a range that does not break the meniscus.

Since a structure in which the ink in the sub tank 21*a* is supplied to the print head 24 using the hydraulic head pressure of the ink liquid level in the sub tank 21*a* is adopted in the present embodiment, the drawing machine 2 is installed such that the ink liquid level in the sub tank 21*a* is within a predetermined tilt range with respect to a horizontal plane. That is, as long as the ink can be supplied to the print head 24 using the hydraulic head pressure of the ink liquid level in the sub tank 21*a* during operation, the ink liquid level in the sub tank 21*a* is allowed to be inclined with respect to the horizontal plane, and the drawing machine 2 is installed in such an installation posture. Note that the posture at the time of installation is adjusted such that the ink liquid level in the sub tank 21*a* is substantially horizontal in the present embodiment.

The upstream channel 21*b* extends from the ink supply unit 20 to the sub tank 21*a* and is a channel for supplying the ink in the ink cartridge 20*a* to the sub tank 21*a*. The upstream channel 21*b* is provided with an upstream filter 21*d* that filters ink, an ink pump 21*e* that feeds ink, and an upstream valve 21*f* that opens and closes the upstream channel 21*b* in order from the upstream side. The sub tank 21*a* is provided with a level meter 21*g* that measures a liquid level height of the ink in the sub tank 21*a*. The level meter 21*g* can be configured using, for example, a float sensor, a capacitive sensor, an ultrasonic liquid level sensor, or the like. The ink pump 21*e* and the upstream valve 21*f* are controlled by an ink channel control unit 40*a* (illustrated in FIG. 2) to be described later, and adjust the liquid level height such that the liquid level height measured by the level meter 21*g* is within a predetermined range.

The downstream channel 21*c* extends from the sub tank 21*a* to the print head 24, and is a channel for supplying the ink in the sub tank 21*a* to the print head 24. The downstream channel 21*c* is provided with a downstream valve 21*h* that opens and closes the downstream channel 21*c* and a downstream filter 21*i* that filters ink in order from the upstream side. The downstream valve 21*h* is controlled by the ink channel control unit 40*a* to be described later, and is opened when drawing is executed. Since such an ink channel unit 21 is provided, the ink that has been supplied from the ink cartridge 20*a* to the sub tank 21*a* can be supplied from the sub tank 21*a* to the print head 24, and the ink that has been supplied to the print head 24 can be ejected from the ejection ports 24*a* toward the workpiece W.

The ink channel unit 21 also includes a pressure adjustment channel 26. One end of the pressure adjustment channel 26 communicates with an upper portion (a portion where air is accumulated) of the sub tank 21*a*, and the other end of the pressure adjustment channel 26 is opened to the atmosphere. The pressure adjustment channel 26 is provided with a first valve 26*a*, a second valve 26*b*, a pressure sensor 26*c*, an air pump 26*d*, and an air filter 26*e*. The pressure sensor 26*c* is configured to detect a pressure in a portion between the first valve 26*a* and the second valve 26*b* in the pressure adjustment channel 26. In addition, the second valve 26*b* can be always opened except during transportation of the drawing machine 2. In this case, what is measured by the pressure sensor 26*c* is a pressure in the sub tank 21*a*, and ink ejection pressure and amount in a purge operation can be controlled by controlling the pressure in the sub tank 21*a*.

The air pump 26*d* is configured to feed air to the portion between the first valve 26*a* and the second valve 26*b* in the pressure adjustment channel 26. For example, the inside of the sub tank 21*a* can be pressurized to a desired pressure with air by controlling the air pump 26*d*, the first valve 26*a*, and the second valve 26*b* at the time of maintenance of the drawing machine 2 or the like. The air before being sucked into the air pump 26*d* is filtered by the air filter 26*e*.

The ink discharge unit 22 includes a discharge channel 22*a* for discharging the ink in the print head 24, a discharge tank 22*b*, and a discharge valve 22*c*. An upstream end of the discharge channel 22*a* is connected to the print head 24, and a downstream end of the discharge channel 22*a* is connected to the discharge tank 22*b*. The discharge valve 22*c* is provided in a midway portion of the discharge channel 22*a*, and is configured to open and close the discharge channel 22*a*. For example, the ink in the downstream channel 21*c* and the print head 24 can be discharged to the discharge tank 22*b* by pressurizing the inside of the sub tank 21*a* by the air pump 26*d* of the pressure adjustment channel 26 during maintenance of the drawing machine 2 or before the transportation of the drawing machine 2.

The print head drive unit 23 illustrated in FIG. 2 is controlled by a drawing control unit 40*c* to be described later when the drawing operation is performed. The print head drive unit 23 generates a driving electric waveform for driving the print head 24 and outputs the driving electric waveform to the print head 24. The driving electric waveform is a waveform for individually driving drive elements (piezoelectric vibrators) respectively provided for the ejection ports 24*a* of the print head 24 at a timing based on a drawing command output from the drawing control unit 40*c*.

(Detailed Description of Channel Control)

1. Initial Filling Control

The initial filling control is a control of replacing air in the print head 24 with ink and filling the print head 24 with the ink before starting the operation of the ink jet printer 1. First, the sub tank 21*a* is filled with ink. The ink channel control unit 40*a* illustrated in FIG. 2 opens the downstream valve 21*h*, the second valve 26*b*, and the discharge valve 22*c* illustrated in FIG. 4, and closes the first valve 26*a* and the upstream valve 21*f*. In addition, the ink pump 21*e* is turned OFF, and the air pump 26*d* is turned ON. As a result, the downstream channel 21*c*, the inside of the print head 24, and a portion between the print head 24 and the discharge valve 22*c* are filled with ink inside the sub tank 21*a* to replace air.

2. Control of Ink Supply to Sub Tank 21*a*

The ink supply control to the sub tank 21*a* is control to keep the liquid level height of the ink in the sub tank 21*a* within a certain range. The ink channel control unit 40*a* opens the first valve 26*a*, the second valve 26*b*, and the upstream valve 21*f*, and also opens the downstream valve 21*h*. In addition, the ink pump 21*e* is turned ON, and the air pump 26*d* is turned OFF. As a result, the ink can be supplied from the ink cartridge 20*a* to the sub tank 21*a* such that the liquid level height measured by the level meter 21*g* is always constant. For example, an amount of ink transported from the sub tank 21*a* to the print head 24 side may be roughly estimated by software so as to perform an ink supply operation until the level meter 21*g* detects ON if the liquid level height measured by the level meter 21*g* decreases to a certain level.

3. Control of Ink Supply to Print Head 24

In this control, the ink channel control unit 40*a* opens the downstream valve 21*h*, the first valve 26*a*, and the second valve 26*b*, and closes the upstream valve 21*f* and the discharge valve 22*c*. In addition, the ink pump 21*e* and the air pump 26*d* are turned OFF. As a result, when ink is ejected from the print head 24, the ink is drawn from the sub tank 21*a* into the nozzle orifice in the print head 24 due to the capillary action. At this time, the ink liquid level in the sub tank 21*a* is set to be lower in the direction of gravity than the ejection port 24*a* at the lowermost end of the print head 24, so that the ink in the print head 24 always has a negative pressure, the negative pressure and the capillary action of the nozzle orifice are balanced, and the ink meniscus is formed at a specified position of the nozzle orifice. That is, a positional relationship in a height direction of the ink liquid level in the print head 24 and the sub tank 21*a* is set so as to obtain the negative pressure at which the ink meniscus is formed at the specified position.

4. Print Head Purge Control

Print head purge control is control to remove air mixed in the print head 24 due to the meniscus breakage of the nozzle orifice or foreign matter such as paper dust adhering to a surface of the nozzle orifice or the inside of the nozzle orifice outside the print head 24. The ink channel control unit 40*a* opens the second valve 26*b* and closes the first valve 26*a*, the downstream valve 21*h*, the upstream valve 21*f*, and the discharge valve 22*c*. In addition, the ink pump 21*e* is turned OFF, and the air pump 26*d* is turned ON. This control is performed, an air pressure in the sub tank 21*a* is measured by a pressure gauge, and pressurization is performed by the air pump 26*d* until a certain pressure is obtained.

Thereafter, the ink channel control unit 40*a* opens the downstream valve 21*h* and closes the upstream valve 21*f*, the first valve 26*a*, the second valve 26*b*, and the discharge valve 22*c*. In addition, the ink pump 21*e* and the air pump 26*d* are turned OFF. As a result, the ink in the sub tank 21*a* is supplied to the print head 24 by pressurization using the air pressure in the sub tank 21*a*, so that the air mixed in the print head 24 and the foreign matter such as paper dust adhering to the surface of the nozzle orifice and the inside of the nozzle orifice are removed to the outside of the print head 24.

5. Discharge Control

Discharge control is control to empty the entire ink in ink channels. Before this control is performed, the ink cartridge 20*a* is detached. Thereafter, the ink channel control unit 40*a* opens the first valve 26*a*, the second valve 26*b*, and the upstream valve 21*f*, and also opens the downstream valve 21*h*. In addition, the ink pump 21*e* is turned ON, and the air pump 26*d* is turned OFF. As a result, the entire ink in the upstream channel 21*b* is transferred to the sub tank 21*a*.

Thereafter, the downstream valve 21*h*, the second valve 26*b*, and the discharge valve 22*c* are opened, and the first valve 26*a* and the upstream valve 21*f* are closed. In addition, the ink pump 21*e* is turned OFF, and the air pump 26*d* is turned ON. As a result, the ink in the sub tank 21*a* is pressurized by the air pump 26*d* to discharge the ink to the discharge tank 22*b* via the inside of the downstream channel 21*c*, the inside of the print head 24, and the portion between the print head 24 and the discharge valve 22*c*, so that the ink in these portions is replaced with air. At this time, some ink is also discharged from the print head 24.

(Configuration of Controller 4)

As illustrated in FIG. 2, the controller 4 includes a control section 40, a power supply unit 41, a storage unit 42, and an operation display unit 43. The control section 40 includes, for example, a microcomputer including a central processing unit, various memories, and the like, and can execute software stored in advance. The control section 40 includes the ink channel control unit 40*a*, a drawing data generation unit 40*b*, the drawing control unit 40*c*, a workpiece movement amount acquisition unit 40*d*, a workpiece distance acquisition unit 40*e*, a drawing start timing acquisition unit 40*f*, a conveyance direction identifying unit 40*g*, an evaluation unit 40*h*, and an abnormality processing unit 40*i*. The respective units 40*a* to 40*i* of the control section 40 are portions configured by hardware and software, and are described separately as each of the units 40*a* to 40*i* for convenience, but may be integrated in terms of hardware.

The power supply unit 41 is a portion that converts AC power from a commercial power supply 100 into DC power and supplies the DC power to, for example, the control section 40, the storage unit 42, the operation display unit 43, the drawing machine 2, and the like, and includes, for example, a switching power supply and the like.

Figure 5:
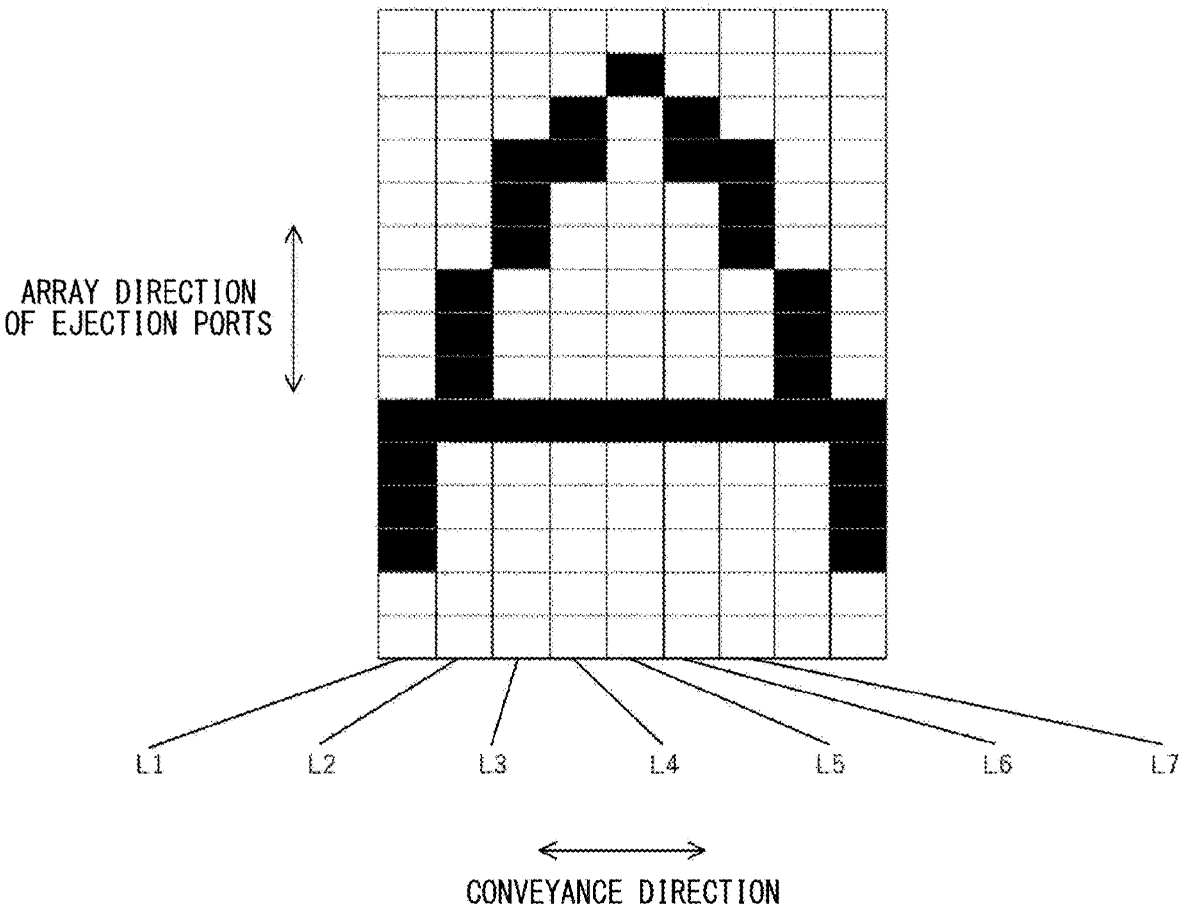
FIG. 5 is a view schematically illustrating an example of drawing data.

The storage unit 42 is a portion that stores drawing data specifying an ejection timing of the ejection ports 24*a* of the print head 24 corresponding to drawing information at each of a plurality of offset positions in the conveyance direction. The storage unit 42 may include, for example, a working memory and the like. FIG. 5 illustrates an example of the drawing data. A longitudinal direction in FIG. 5 is an array direction of the ejection ports 24*a* of the print head 24, and is an up-down direction during drawing in the present embodiment. A lateral direction in FIG. 5 is the conveyance direction of the workpiece W, that is, a time-axis direction, and reference signs L1, L2, L3, L4, L5, L6, and L7 indicate ejection timings, respectively. The timings indicated by the reference signs L1 to L7 are referred to as first to seventh ejection timings, respectively. The first ejection timing L1 is a drawing start timing, and the seventh ejection timing L7 is a drawing end timing. When the drawing process is executed based on the drawing data illustrated in FIG. 5, the first to seventh ejection timings L1 to L7 come in order, and the print head 24 is controlled such that ink is ejected only from the ejection ports 24*a* corresponding to cells illustrated in black in the drawing.

As illustrated in FIG. 2, the operation display unit 43 includes a drawing-machine-side display unit 43*a* including, for example, a liquid crystal display and the like, and a drawing-machine-side operation unit 43*b* including an operation key and the like. The drawing-machine-side operation unit 43*b* is a portion that receives various operations such as a drawing setting with respect to the workpiece W performed by the user, an installation setting of the drawing machine 2, and maintenance execution instruction. A drawing setting screen, an installation screen, a maintenance execution instruction screen, and the like are displayed on the drawing-machine-side display unit 43*a*, and the user can operate the drawing-machine-side operation unit 43*b* while viewing the drawing-machine-side display unit 43*a*.

The ink channel control unit 40*a* of the control section 40 is a portion that outputs an execution command for the above-described channel controls 1 to 4 to the drawing machine 2 in response to an instruction made using the drawing-machine-side operation unit 43*b* from the user, inputs from various sensors, and the like. Each control after the ink channel control unit 40*a* outputs the execution command to the drawing machine 2 is as described above.

The drawing data generation unit 40*b* is a portion that generates the drawing data as illustrated in FIG. 5 based on input content, setting content, and the like input from the terminal-side display unit 5*a* and the drawing-machine-side operation unit 43*b*. The drawing data generated by the drawing data generation unit 40*b* is stored in, for example, the storage unit 42.

The drawing control unit 40*c* reads the drawing data stored in the storage unit 42, and receives information regarding a position and a distance input from the sensor unit 3, the encoder 7, the timing sensor 8, and the like and a signal (timing signal) indicating that the workpiece W has arrived at a predetermined position. Then, the drawing control unit 40*c* outputs a control signal to the print head drive unit 23 based on the information regarding the position and the distance, the timing signal, and the drawing data generated by the drawing data generation unit 40*b*, and controls the ink ejection from the ejection ports 24*a* of the print head 24. Details of the drawing control unit 40*c* will be described later.

The workpiece movement amount acquisition unit 40*d* is a portion that acquires a movement amount of the workpiece W with respect to the drawing machine 2 based on signals input from the sensor unit 3 and the encoder 7. As the workpiece movement amount acquisition unit 40*d* detects the movement amount of the workpiece W, a position of the workpiece W with respect to the drawing machine 2 can be acquired. The movement amount and position of the workpiece W acquired by the workpiece movement amount acquisition unit 40*d* are input to the drawing control unit 40*c*.

The workpiece distance acquisition unit 40*e* is a portion that acquires a timing (drawing start timing) at which the drawing machine 2 starts drawing based on signals input from the sensor unit 3 and the timing sensor 8. The drawing start timing acquired by the workpiece distance acquisition unit 40*e* is input to the drawing control unit 40*c*.

The drawing start timing acquisition unit 40*f* is a portion that acquires a timing at which the workpiece W crosses a predetermined drawing start position based on signals input from the sensor unit 3 and the timing sensor 8. The signal acquired by the drawing start timing acquisition unit 40*f* is input to the drawing control unit 40*c*. The signals input from the sensor unit 3 and the timing sensor 8 function as a trigger (drawing start trigger) for starting drawing.

The conveyance direction identifying unit 40*g* is a portion that identifies the conveyance direction of the workpiece W based on an output from the sensor unit 3. In a case where the workpiece W is conveyed in the horizontal direction, the conveyance direction identifying unit 40*g* identifies that the workpiece W is conveyed in the horizontal direction and outputs the identified result to the drawing control unit 40*c*. In addition, in a case where the workpiece W is conveyed in an inclined direction, the conveyance direction identifying unit 40*g* identifies that the workpiece W is conveyed in the inclined direction, identifies the inclination angle thereof, and outputs the identified results to the drawing control unit 40*c*. As will be described later, the drawing control unit 40*c* controls the ink ejection from the ejection ports 24*a* of the print head 24 based on the conveyance direction of the workpiece W identified by the conveyance direction identifying unit 40*g*.

Figure 6:
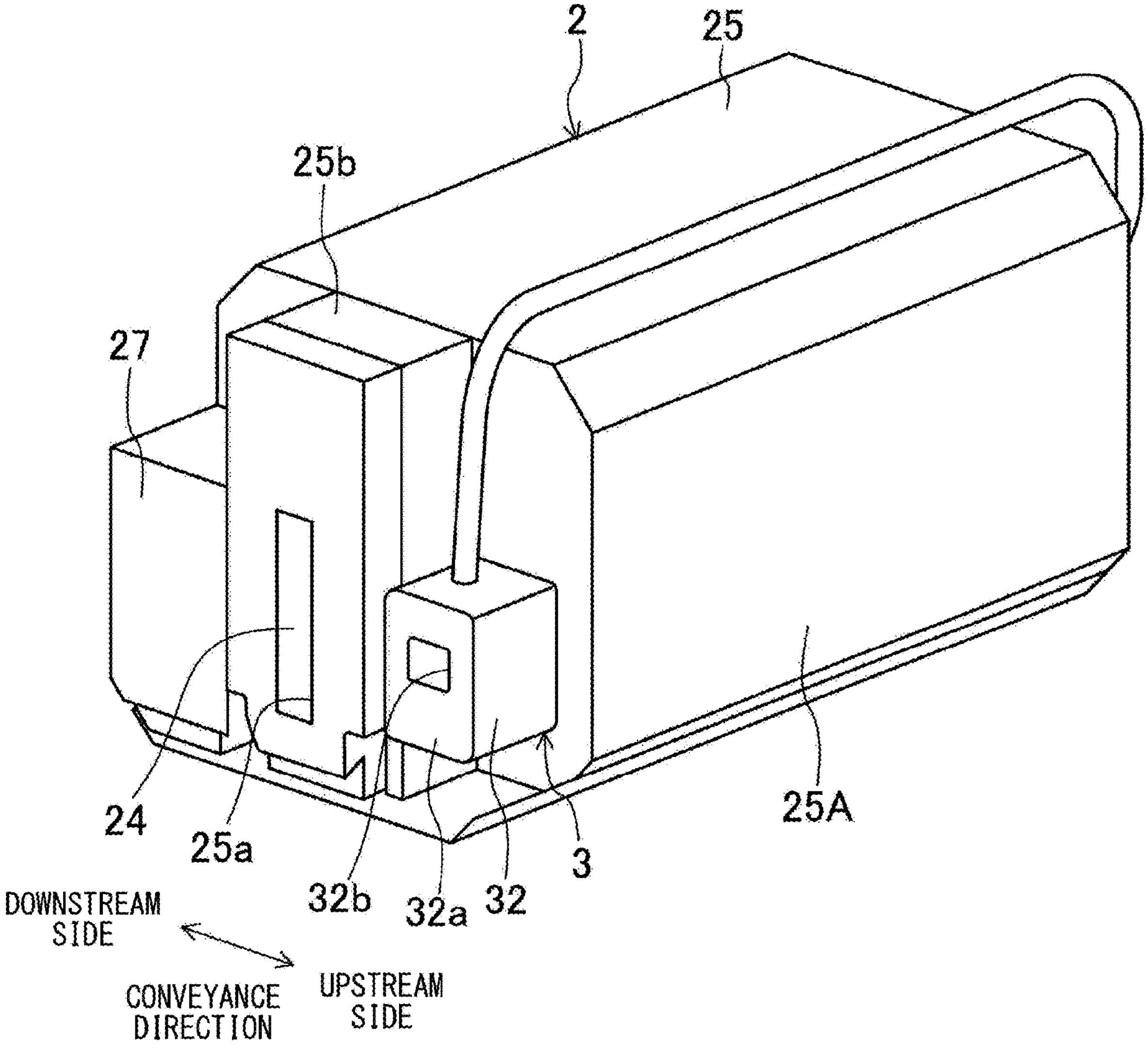
FIG. 6 is a perspective view of a drawing machine to which a sensor unit is fixed.

FIG. 6 is a perspective view specifically illustrating a case where the drawing machine 2 to which the sensor unit 3 is fixed is viewed from an ink ejection side. The main housing 25 has a protrusion-shaped portion 25*b* formed such that a middle portion in the conveyance direction of a face opposing the workpiece W protrudes toward the ink ejection side. The opening 25*a* is formed on a distal end face in a protruding direction of the protrusion-shaped portion 25*b*.

The sensor unit 3 is fixed to the main housing 25 on the upstream side in the conveyance direction of the protrusion-shaped portion 25*b* on the face opposing the workpiece W. On the other hand, an absorbing member 27 capable of absorbing ink is attached on the downstream side in the conveyance direction of the protrusion-shaped portion 25*b* on the face of the main housing 25 opposing the workpiece W.

Figure 7:
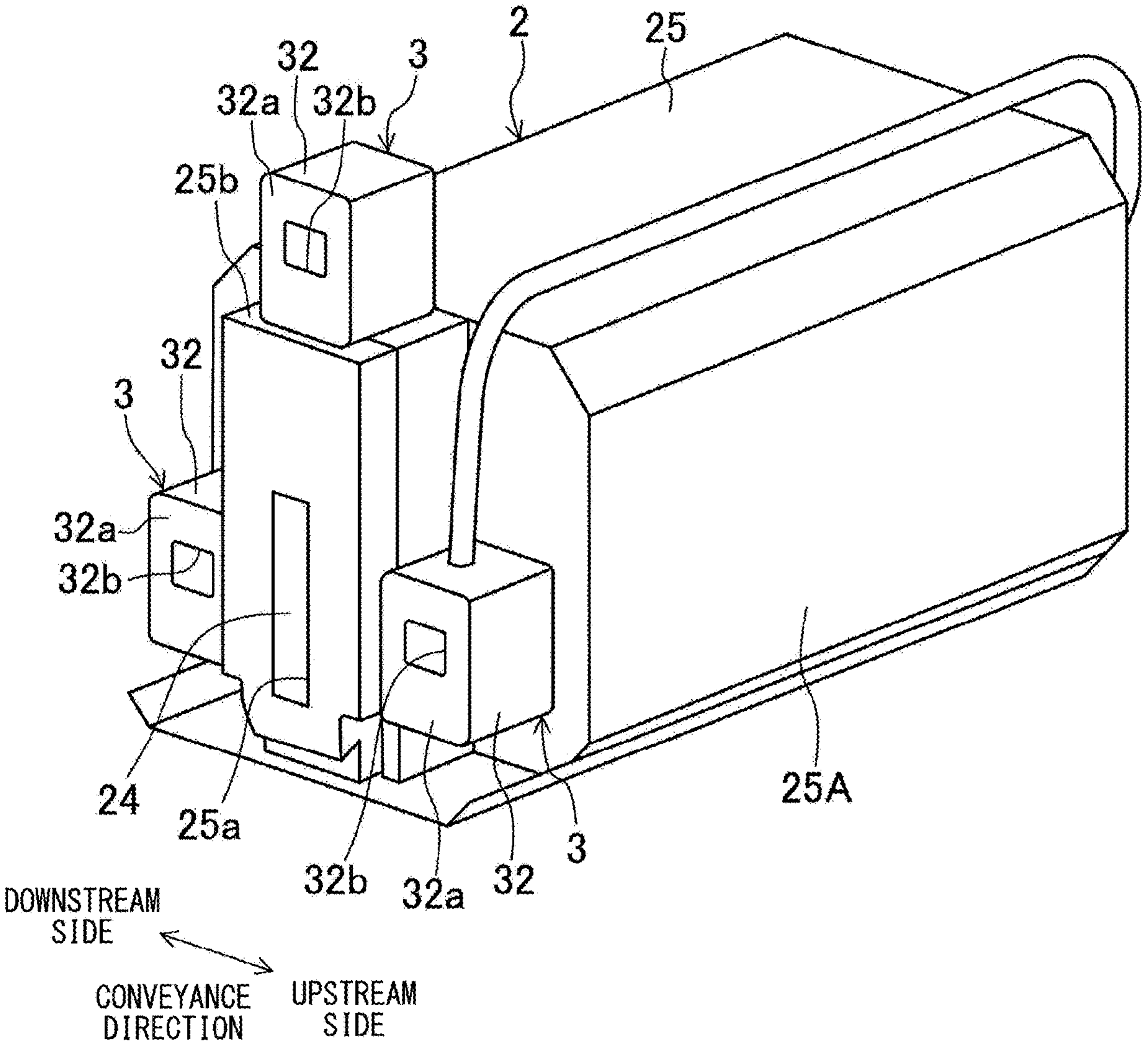
FIG. 7 is a view corresponding to FIG. 6, which illustrates another fixing example of the sensor unit.

As illustrated in FIG. 7, the sensor unit 3 may be fixed to the downstream side of the protrusion-shaped portion 25*b* of the main housing 25 of the drawing machine 2 in the conveyance direction. In addition, the sensor unit 3 may be fixed above the protrusion-shaped portion 25*b* of the main housing 25 of the drawing machine 2. Three sensor units 3 may be fixed to one drawing machine 2 as illustrated in FIG. 7, or any two of the three sensor units 3 illustrated in FIG. 7 may be fixed. That is, the ink jet printer 1 including a plurality of the sensor units 3 can also be configured.

(Configuration of Sensor Unit 3)

As illustrated in FIG. 2, the sensor unit 3 includes an optical movement measurement sensor 30 that generates a measurement value related to movement of the workpiece W with respect to the print head 24, a distance sensor 31 that measures a distance to the workpiece W in an ejection direction of the print head 24, and a sensor housing 32 in which the optical movement measurement sensor 30 and the distance sensor 31 are accommodated. Both the optical movement measurement sensor 30 and the distance sensor 31 are sensors that execute measurement using measurement light, and thus, correspond to an optical measurement sensor. In other words, the sensor unit 3 constituting the optical measurement sensor of the present embodiment includes the optical movement measurement sensor 30 and the distance sensor 31.

The optical movement measurement sensor 30 and the distance sensor 31 are accommodated in the common sensor housing 32, thereby being integrated into a sensor module. With the sensor unit 3, it is possible to detect the drawing start timing, detect a conveyance speed (movement distance) of the workpiece W, detect a distance to the workpiece W, and the like. Note that the distance to the workpiece W in the ejection direction of the print head 24 is also referred to as the distance to the workpiece W. In addition, although the expression of the distance to the workpiece W in the ejection direction of the print head 24 is used in the present embodiment, this is merely defined to specify a distance between the workpiece W and the drawing machine 2 for convenience, and for example, a definition as a distance between the ejection ports 24*a* of the print head 24 and a drawing surface of the workpiece W or a definition as a distance between any part of the print head 24 and any part of the workpiece W may be used.

The optical movement measurement sensor 30 emits light in the ejection direction of the print head 24, receives light reflected from the workpiece W, and generates a measurement value related to movement of the workpiece W in the conveyance direction based on the received light. As such an optical movement measurement sensor 30, an optical tracking sensor (OTS) capable of obtaining the movement amount of the workpiece W by continuously capturing images of the workpiece W at a high speed and performing image processing on the obtained images is used in the present embodiment. The OTS that can be used as the optical movement measurement sensor 30 may be either a system that measures a movement amount of a captured image using a light emitting diode as a light source or a system that measures a movement amount of a speckle pattern using a laser as a light source. In the present embodiment, the system using the laser as the light source that has a higher depth than the system using the light emitting diode as the light source is adopted. This is because the distance between the print head 24 and the workpiece W may vary by, for example, about 10 mm. Note that, in addition to the OTS, a laser Doppler velocimeter or the like can be used as the optical movement measurement sensor 30.

The OTS using the laser as the light source includes a light projecting unit 30*a* that projects light (laser light) onto the workpiece W, and a light receiving unit 30*b* that receives a speckle pattern, generated according to a characteristic of a surface shape of the workpiece W by the light projected from the light projecting unit 30*a*, and generates light reception data including the speckle pattern. The light receiving unit 30*b* includes, for example, an imaging device having an image sensor such as a complementary MOS (CMOS). A field of view of the imaging device may overlap a diameter of spot light projected from the distance sensor 31 including a laser distance sensor to be described later.

The OTS generates a measurement value related to movement of the workpiece W in the conveyance direction based on a movement amount of the speckle pattern included in the light reception data generated by the light receiving unit 30*b*. That is, the optical movement measurement sensor 30 can generate the measurement value related to the movement of the workpiece W based on a measurement image generated by capturing the workpiece W by the imaging device.

The optical movement measurement sensor 30 measures not only the movement amount of the workpiece W in the conveyance direction but also a movement amount in a direction perpendicular to the conveyance direction. When the movement amount in the direction perpendicular to the conveyance direction is measured, the optical movement measurement sensor 30 also generates a measurement value related to movement in the direction perpendicular to the conveyance direction. Since the conveyance direction of the workpiece W and the direction perpendicular to the conveyance direction are orthogonal to each other, the optical movement measurement sensor 30 can generate measurement values of two axes orthogonal to each other. In this case, the optical movement measurement sensor 30 determines a measurement value related to the movement of the workpiece W in the conveyance direction from the generated measurement values of the two axes.

An optical system of the light receiving unit 30*b* does not include a lens. The optical system having no lens in this manner makes it possible to secure a larger depth of field of the light receiving unit 30*b* than an optical system having a lens. As a result of securing the larger depth of field of the light receiving unit 30*b*, a measurable range by the optical movement measurement sensor 30 can be widened. This makes it possible to measure the workpiece W passing through a place far from the print head 24, so that the degree of freedom of a conveyance position of the workpiece W increases, cost in manufacturing the production line can be reduced, and the necessity of confirming the conveyance position of the workpiece W can be reduced. Further, a usable distance range is widened so that the degree of freedom of an installation method of the drawing machine 2 is improved. Note that the optical system of the light receiving unit 30*b* may include a lens.

As the distance sensor 31, for example, a conventionally known device such as a triangulation distance sensor, a time of flight (TOF) distance sensor, or an ultrasonic sensor can be used. The distance sensor 31 of the present embodiment is a laser distance sensor capable of projecting spot light generated by laser light to an object to be measured.

The distance sensor 31 and the optical movement measurement sensor 30 are arranged at substantially the same height. Specifically, in a state where the distance sensor 31 and the optical movement measurement sensor 30 are fixed to the sensor housing 32, a height of measurement light projected from the distance sensor 31 and a height of measurement light projected from the optical movement measurement sensor 30 coincide with each other. As a result, the same height portion of the workpiece W can be measured by the distance sensor 31 and the optical movement measurement sensor 30.

Attachment positions of the distance sensor 31 and the optical movement measurement sensor 30 in the height direction can be adjusted. For example, for adjustment of the positions of the distance sensor 31 and the optical movement measurement sensor 30 in the height direction, the adjustment is possible by moving the housing 32 itself up and down with respect to the main housing 25. In addition, for example, the sensor housing 32 is provided with an attachment mechanism configured to attach the distance sensor 31 to the sensor housing 32 and an attachment mechanism for attaching the optical movement measurement sensor 30 to the sensor housing 32. The attachment mechanism of the distance sensor 31 is configured to be capable of changing a height of the distance sensor 31 within a predetermined range. In addition, the attachment mechanism of the optical movement measurement sensor 30 is configured to be capable of changing a height of the optical movement measurement sensor 30 within a predetermined range. As a result, the distance sensor 31 and the optical movement measurement sensor 30 can be arranged at the same height. Note that the distance sensor 31 and the optical movement measurement sensor 30 may be arranged at different heights. The distance sensor 31 and the optical movement measurement sensor 30 may be directly attached to the drawing machine 2, or may be indirectly attached to the drawing machine 2 while keeping a certain relationship with the drawing machine 2, and all of these attachment forms are included in a form of being attached to correspond to the drawing machine 2.

Since a timing signal can be generated based on distance data measured by the distance sensor 31, the distance sensor 31 can also be referred to as an optical timing sensor. Specifically, a timing signal indicating that a reference position of the workpiece W is at a predetermined position can be generated based on a change in the distance to the workpiece W in the ejection direction of the print head 24 measured by the distance sensor 31. The distance sensor 31 is arranged on the downstream side of the optical movement measurement sensor 30 in the conveyance direction of the workpiece W, and can identify the drawing start timing at this position. Since the distance sensor 31 is arranged on the downstream side of the optical movement measurement sensor 30 in the conveyance direction of the workpiece W, the optical movement measurement sensor 30 can generate a measurement value related to movement of the workpiece W before the distance sensor 31 generates a timing signal. Note that the generation of the timing signal by the distance sensor 31 and the generation of the measurement value by the optical movement measurement sensor 30 may be performed at the same timing.

The sensor housing 32 accommodating the optical movement measurement sensor 30 and the distance sensor 31 is detachably fixed to the main housing 25. As illustrated in FIG. 6, a front surface 32*a* of the sensor housing 32 has a window 32*b* formed of a light-transmitting cover that transmits light. The light receiving unit 30*b* (illustrated in FIG. 2) of the optical movement measurement sensor 30 captures an image of the workpiece W through the window 32*b*. In addition, the distance sensor 31 irradiates the workpiece W with the measurement light through the window 32*b*, and receives the measurement light reflected by the workpiece W through the window 32*b*. That is, the optical movement measurement sensor 30 and the distance sensor 31 are provided so as to be capable of measuring the workpiece W through the window 32*b*.

Since the main housing 25 is provided with the print head 24, the optical movement measurement sensor 30 and the distance sensor 31 are fixed to the main housing 25 such that a relative positional relationship with the print head 24 is a predetermined positional relationship. Examples of a detachable fixing structure can include, but are not limited to, a fastening structure using a screw or a bolt, and a structure in which a first engagement portion provided in the sensor housing 32 is engaged with a second engagement portion provided in the main housing 25.

The optical movement measurement sensor 30 and the distance sensor 31 are attached at fixed positions with respect to the print head 24 such that the positional relationship among the optical movement measurement sensor 30, the distance sensor 31, and the print head 24 becomes a known value in the conveyance direction of the workpiece W. Since the optical movement measurement sensor 30 and the distance sensor 31 are accommodated in the common sensor housing 32, the distance sensor 31 is arranged at a position offset in the same direction as the optical movement measurement sensor 30 along the conveyance direction with respect to the print head 24.

Note that the user may be allowed to input the positions where the optical movement measurement sensor 30 and the distance sensor 31 are attached to the control section 40 as setting values. This makes it possible to improve drawing accuracy while increasing the degree of freedom in installation of the optical movement measurement sensor 30 and the distance sensor 31.

As illustrated in FIG. 3, the optical movement measurement sensor 30 of the sensor unit 3 is arranged at a position offset along the conveyance direction, specifically, at a position offset to the upstream side in the conveyance direction with respect to the print head 24. The drawing machine 2 is installed such that a position in the up-down direction (first direction) of a drawing target region to which the ejection ports 24*a* of the print head 24 are directed and a position in the up-down direction of a region where a current offset position is measured by the optical movement measurement sensor 30 at least partially overlap each other. This makes it possible to accurately obtain a measurement value related to movement of the drawing target region.

The optical movement measurement sensor 30, the distance sensor (also functioning as a timing sensor) 31, and the print head 24 are arrayed in this order from the upstream side in the conveyance direction of the workpiece W. With this array, it is possible to start measuring a movement amount of the workpiece W in a state where the optical movement measurement sensor 30 outputs a valid measurement value.

In addition, the optical movement measurement sensor 30 and the distance sensor 31 are arranged at the positions offset upstream of the print head 24 along the conveyance direction for the following reasons. That is, ink mist, called satellites, generated during the ink ejection from the print head 24 and not landing on the workpiece W and droplets of ink splashed from the workpiece W flow in a downstream direction of the print head 24 due to a flow of wind generated by conveyance of the workpiece W to the print head 24. For this reason, if the optical movement measurement sensor 30 and the distance sensor 31 are installed downstream of the print head 24, there is a high possibility that the window 32*b* serving as a detection surface for the optical movement measurement sensor 30 and the distance sensor 31 is contaminated with ink to induce a detection failure. However, in this case, a dead space that is not measurable by the optical movement measurement sensor 30 is generated in principle at a final end (downstream end) of the workpiece W in the conveyance direction. In a case where drawing is to be performed onto the dead space, it is sufficient to execute complementary processing such as constant-speed control using a final measurement value of the optical movement measurement sensor 30 or acceleration control using final acceleration measured by the optical movement measurement sensor 30.

When the workpiece W is conveyed to a predetermined position opposing the print head 24, the print head 24 is directed to the drawing target region in the workpiece W. In addition, the distance sensor 31 can measure a current offset position by irradiating the workpiece W with the measurement light, and a region of the workpiece W irradiated with the measurement light by the distance sensor 31 is a measurement region of the workpiece W by the distance sensor 31. In the present embodiment, the distance sensor 31 is installed such that a position in the up-down direction of the drawing target region to which the print head 24 is directed and a position in the up-down direction of the region where the current offset position is measured by the distance sensor 13 at least partially overlap each other. That is, the region where drawing is performed and the region measured by the distance sensor 31 at least partially overlap each other, so that a distance of the region where drawing is performed from the print head 24 can be accurately measured.

(Drawing Setting)

The drawing setting performed before the operation of the ink jet printer 1 will be described with reference to a flowchart illustrated in FIG. 8A. To perform the drawing setting, the user uses, for example, the terminal-side display unit 5*a* and the terminal-side operation unit 5*b* of the operation terminal 5 or the operation display unit 43 of the controller 4. A setting screen (GUI) is displayed on the terminal-side display unit 5*a* or the drawing-machine-side display unit 43*a*. The terminal-side operation unit 5*b* or the drawing-machine-side operation unit 43*b* receives a setting operation by the user.

Figure 8A:
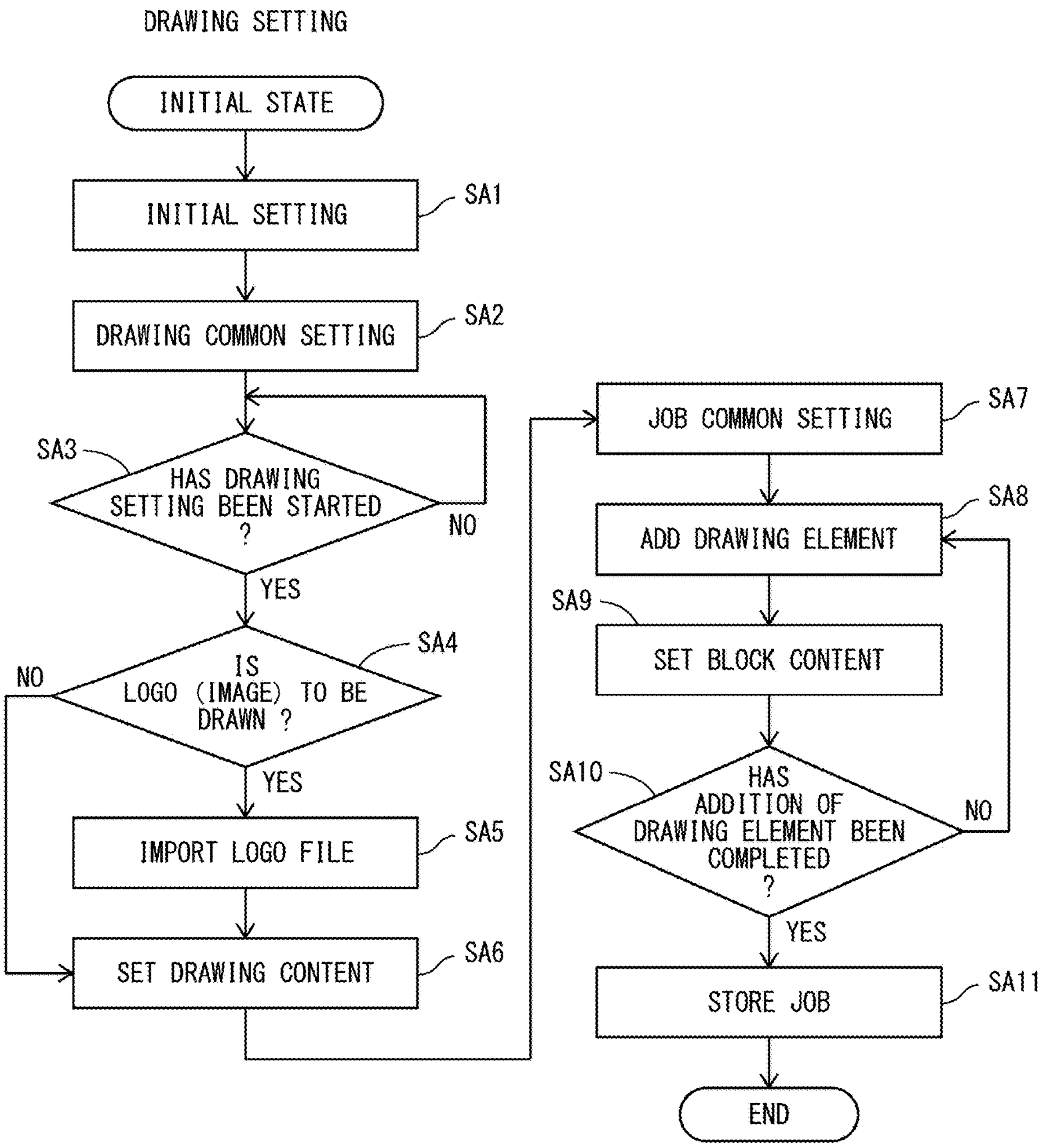
FIG. 8A is a flowchart illustrating an example of a procedure of a drawing setting.

In Step SA1 of FIG. 8A, the user performs an initial setting. In the initial setting, the user selects a GUI language, inputs a device configuration such as the number of the drawing machines 2, and inputs device installation information. The device installation information includes arrangement information of the drawing machine 2 (a tilt or the like of the drawing machine 2), line flow direction information on the drawing machine 2, conveyance speed information, and the like. The control section 40 acquires the content of a selection operation and an input operation by the user.

In Step SA2, the user performs a drawing common setting. In the drawing common setting, the user performs a manufacturing serial number counter setting and a replacement setting (such as an obfuscation setting of a manufacturing date or a lot number).

In Step SA3, the start of the drawing setting by the user is awaited. Specifically, it is determined whether the drawing setting has been started by the user. When the drawing setting is started, the process proceeds to Step SA4. In Step SA4, it is determined whether to draw a logo (image). When an image is to be drawn, the process proceeds to Step SA5, and image data is converted into resolution and size that can be drawn by the drawing machine 2 using a dedicated terminal such as a personal computer to obtain a dedicated logo file, and the logo file is stored in the storage unit 42 of the drawing machine 2.

When NO is determined in Step SA4 and an image is not to be drawn, the process proceeds to Step SA6. In Step SA6, the user performs a drawing content setting. Specifically, the user selects a job number to be set as drawing content or selects drawing content to be edited by a job number. A job represents a drawing data set to be drawn on one workpiece W, and this job includes the drawing data as illustrated in FIG. 5.

In Step SA7, the user sets a delay from reception of a drawing start trigger commonly used in a job selected in Step SA6 to the start of drawing. The delay from the reception of the drawing start trigger to the start of drawing may be set by setting, for example, time or a position (mm).

In Step SA8, a drawing element (block) is added to the job. Thereafter, the process proceeds to Step SA9, and in Step SA9, a drawing element such as a character string, a barcode, a two-dimensional code, or a logo is set in the added drawing element. At this time, the user sets a thickness of a character to be drawn, a character size, a barcode size, a two-dimensional code size, a logo size, position information thereof, or the like. The drawing data also includes a printing pitch and the like.

In Step SA10, it is determined whether the addition of the drawing element has been completed. Steps SA8, SA9, and SA10 are repeated until addition of all the drawing elements is completed, and the process proceeds to Step SA11 when the addition of all the drawing elements is completed. In Step SA11, the job is stored in the storage unit 42 of the drawing machine 2.

(Installation Assist Mode)

Since the supply of ink to the print head 24 is performed using the hydraulic head pressure of the ink liquid level in the sub tank 21*a* in the ink jet printer 1 of the present embodiment, the drawing machine 2 needs to be installed so as to fall within a predetermined tilt range at the time of installation of the drawing machine 2. As a measure for such adjustment, for example, it is conceivable to adjust a posture of the drawing machine 2 by a level. However, in the case of the posture adjustment by the level, there is a problem that it is difficult for the user to notice a change over time after installation of the drawing machine 2. In addition, the conveyance speed of the workpiece W is secondarily grasped from settings of the conveyor 10, or a speed measurement device such as the encoder 7 is required. In addition, it is necessary to temporarily stop the workpiece W and measure the distance between the workpiece W and the print head 24 in order to confirm that the drawing machine 2 has been installed within specifications of the drawing machine 2 although depending on a relative position of the drawing machine 2 with respect to the workpiece W. Further, a tilt of drawing and drawing quality are not known unless drawing is actually performed on the workpiece W, and it is necessary to repeat drawing, installation of the drawing machine 2, and correction of various settings.

On the other hand, in the ink jet printer 1 of the present embodiment, an installation assist mode for assisting installation work of the drawing machine 2 by the user and mitigating a load of the installation work performed by the user can be executed. Hereinafter, the installation assist mode will be described in detail based on a flowchart illustrated in FIG. 8B.

Figure 8B:
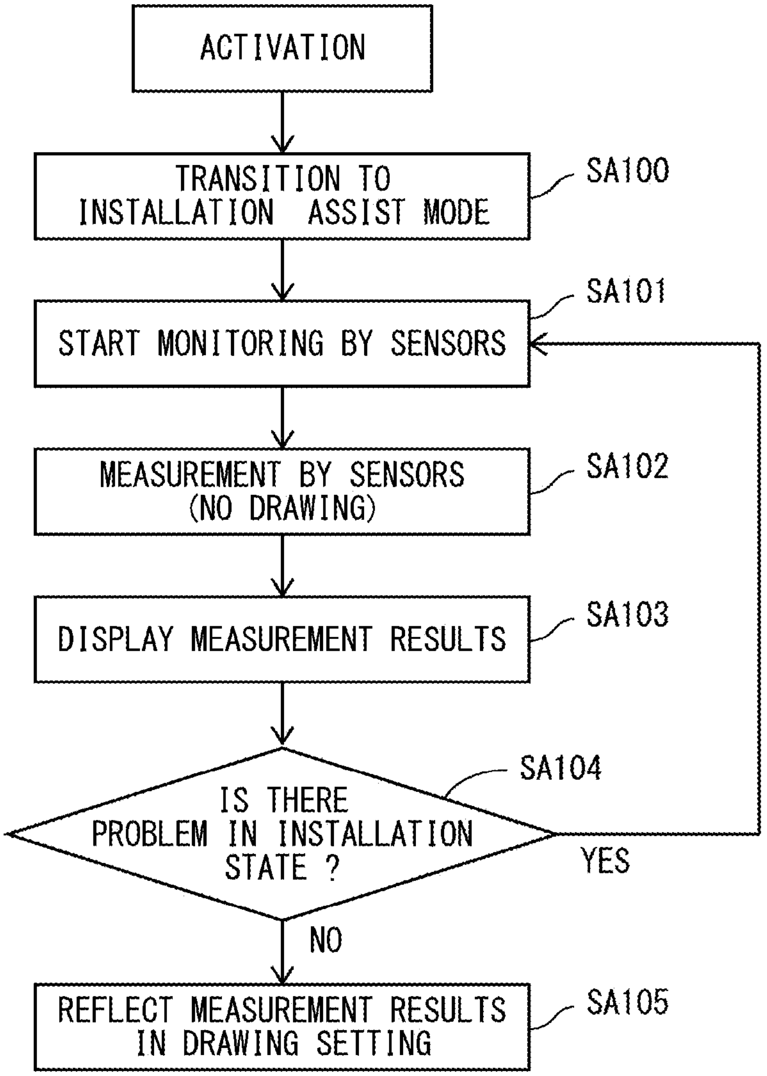
FIG. 8B is a flowchart illustrating an example of a procedure of processing in an installation assist mode.

For example, after the drawing setting illustrated in FIG. 8A, the ink jet printer 1 proceeds to Step SA100 of FIG. 8B in response to an instruction from the user or automatically. In Step SA100, the control section 40 executes processing for transitioning to the installation assist mode. In Step SA101, monitoring by the optical movement measurement sensor 30 and the distance sensor 31 is started. In Step SA102, when the workpiece W is conveyed, the optical movement measurement sensor 30 and the distance sensor 31 measure the workpiece W. In this Step SA102, the drawing process is not executed.

In Step SA103, measurement results of the optical movement measurement sensor 30 and the distance sensor 31 are displayed. Specifically, as illustrated in FIG. 2, the controller 4 includes an output unit 44, and the output unit 44 is a portion that outputs information regarding an installation state based on measurement values generated by the optical movement measurement sensor 30 and the distance sensor 31. For example, the output unit 44 generates a measurement result display screen 50 illustrated in FIG. 8C, and displays the measurement result display screen 50 on the drawing-machine-side display unit 43*a* or the terminal-side operation unit 5*b*. At least one of the drawing-machine-side display unit 43*a* and the terminal-side operation unit 5*b* is a display unit that displays the information regarding the installation state output from the output unit 44. The output by the output unit 44 includes external output and internal output.

The measurement result display screen 50 is provided with a workpiece size display area 51 in which a workpiece size, which is a dimension of the workpiece W in the conveyance direction, is displayed, a workpiece conveyance speed display area 52 in which an average of conveyance speeds of the workpiece W is displayed, a distance display area 53 in which a maximum distance between the print head 24 and the workpiece W is displayed, a longitudinal movement amount display area 54 in which the movement amount of the workpiece W in the direction perpendicular to the conveyance direction is displayed, and a tilt display area 55 in which the tilt of the drawing machine 2 is displayed.

The workpiece size, the conveyance speed of the workpiece W, the distance between the print head 24 and the workpiece W, the movement amount of the workpiece W in the direction perpendicular to the conveyance direction, and the tilt of the drawing machine 2 are generated based on the measurement values of the optical movement measurement sensor 30 and the distance sensor 31 included in the sensor unit 3, and are examples of the information regarding the installation state. Information regarding the installation state other than these may be displayed on the measurement result display screen 50.

The output unit 44 can also output, as the information regarding the installation state, a diagram (an example of information) illustrating a relationship between a distance measured by the distance sensor 31 (distance between the print head 24 and the workpiece W) and a specified distance range (also referred to as a drawing distance range) specified by the specifications of the drawing machine 2. For example, the distance measured by the distance sensor 31 is displayed as illustrated in FIG. 8C, and the output unit 44 generates and outputs the diagram indicating whether the distance is within the specified distance range or outside the specified distance range, so that the user can confirm the installation state related to the distance on the measurement result display screen 50.

The output unit 44 can also output, as the information regarding the installation state, a diagram illustrating a relationship between the conveyance speed of the workpiece W measured by the optical movement measurement sensor 30 (which is a movement speed of the workpiece W) and a specified speed range specified in the specifications. For example, the conveyance speed measured by the optical movement measurement sensor 30 is displayed as illustrated in FIG. 8C, and the output unit 44 generates and outputs the diagram indicating whether the speed is within the specified speed range or out of the specified speed range, so that the user can confirm the installation state related to the speed on the measurement result display screen 50.

The output unit 44 can also output, as the information regarding the installation state, a diagram illustrating a tilt of the conveyance direction determined from measurement values of the two axes measured by the optical movement measurement sensor 30. For example, as illustrated in FIG. 8C, the tilt of the conveyance direction can be indicated by illustrating the drawing machine 2 in a schematic diagram and inclining the schematic diagram.

Figure 8C:
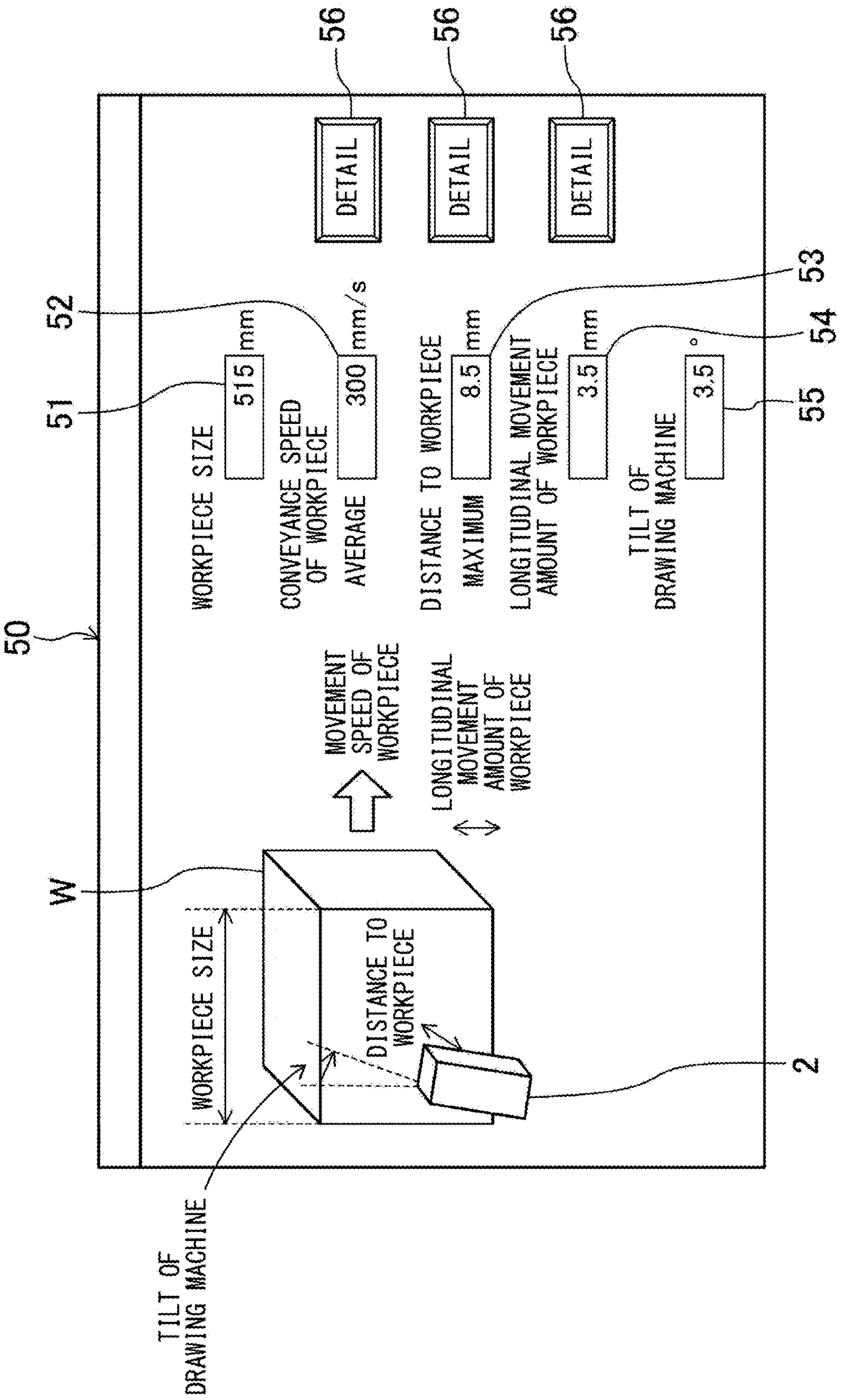
FIG. 8C is a view illustrating an example of a display screen when the installation assist mode is executed.
Figure 8D:
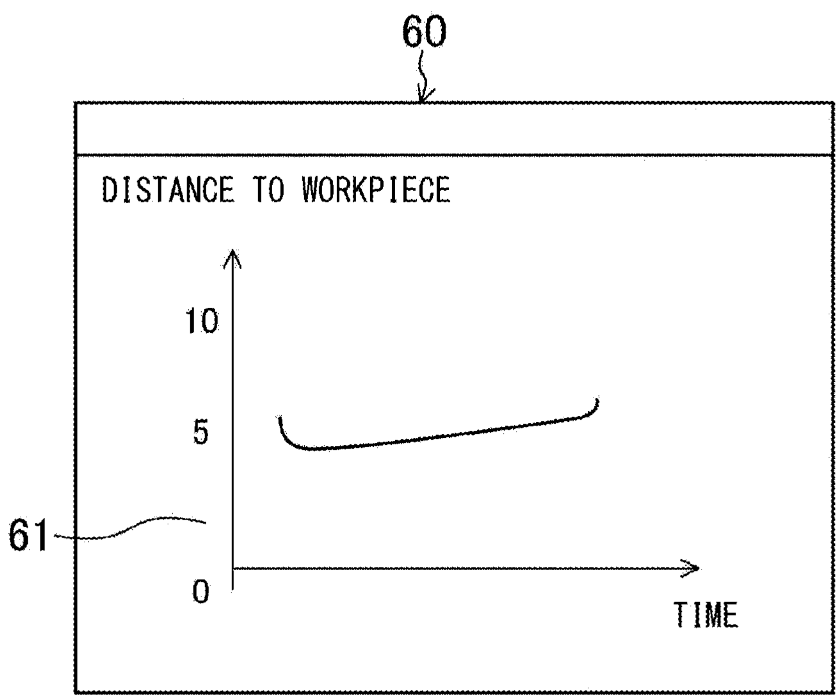
FIG. 8D is a view illustrating an example of a detailed display screen.
Figure 8E:
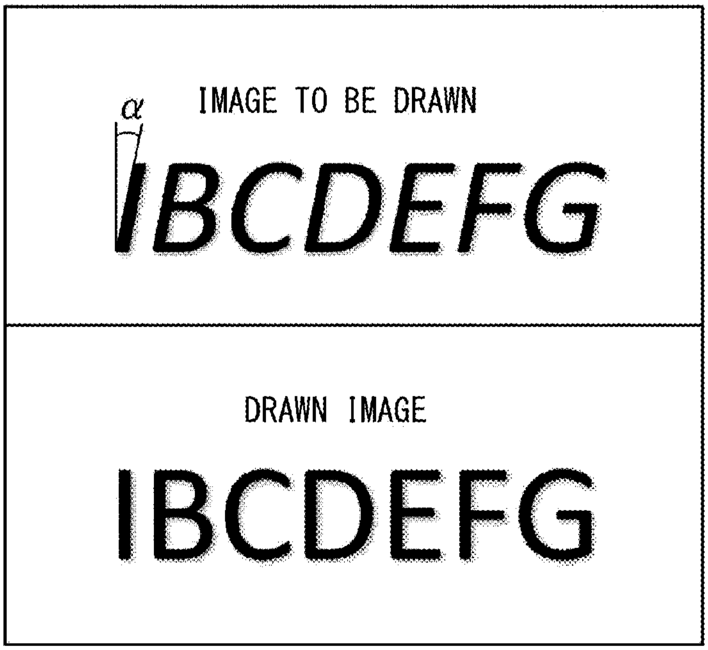
FIG. 8E is a view for describing drawing in a case where a workpiece is conveyed obliquely.

When the user operates a detail button 56 on the measurement result display screen 50 illustrated in FIG. 8C, the output unit 44 generates a detailed display screen 60 as illustrated in FIG. 8D and displays the detailed display screen 60 on the drawing-machine-side display unit 43*a* or the terminal-side operation unit 5*b*. The detailed display screen 60 is provided with a graph display area 61 for displaying a time-series change of measurement data in a graph format. For example, it can be seen that the workpiece W is moving in a direction (oblique direction) of being gradually separated from the drawing machine 2 by viewing the graph of FIG. 8D.

In Step SA104 of FIG. 8, it is determined whether there is no problem in the installation state based on the measurement results displayed in Step SA103. For example, it is determined whether a maximum value of the distance between the workpiece W and the print head 24 is within a specification of the drawing machine 2, and it is determined that there is a problem in an installation position of the drawing machine 2 in a case where there the maximum value exceeds the specification. The determination in Step SA104 may be performed by the user or may be performed by the controller 4. In the example illustrated in the detailed display screen 60 of FIG. 8D, it is necessary to adjust a relative positional relationship between the drawing machine 2 and the workpiece W such that the drawing machine 2 approaches the workpiece W.

In a case where there it is measured that the distance between the workpiece W and the print head 24 gradually changes, it is determined that there is a problem in the installation state because the workpiece is moving obliquely. In this case, it is necessary to adjusts an angle.

In a case where there the change in the distance between the workpiece W and the print head 24 is large, it is determined that there is a problem in the installation state because the drawing machine 2 has not been fixed or a guide of the workpiece W is unstable. In this case, it is necessary to fix the drawing machine 2 and adjust the guide.

The size of the workpiece W can be grasped based on a movement distance of the workpiece W in the conveyance direction, and it is possible to know whether a relationship between the movement distance of the workpiece W in the conveyance direction and a drawing size is satisfied. In a case where there the relationship between the movement distance of the workpiece W in the conveyance direction and the drawing size is not satisfied, it is determined that there is a problem in the installation state.

In a case where there is a large variation in the conveyance speed of the workpiece W in a constant-speed drawing setting, printing based on the constant-speed drawing setting cannot be performed, and thus, it is determined that there is a problem in the installation state.

A case where the movement amount of the workpiece W in the direction perpendicular to the conveyance direction monotonically increases or monotonically decreases indicates that the workpiece W is moving obliquely with respect to the drawing machine 2, and thus, it is determined that there is a problem in the installation state.

A case where vibration in the direction perpendicular to the conveyance direction of the workpiece W is large indicates that the workpiece W is bumping (which will be described later) or that the drawing machine 2 is incompletely installed, and thus, it is determined that there is a problem in the installation state. In this case, it is necessary to examine adjustment of the conveyor 10 or installation of the drawing machine 2.

When it is determined that there is a problem in the installation position of the drawing machine 2, the process proceeds from Step S104 to Step SA101. When it is determined that there is no problem in the installation position of the drawing machine 2, the process proceeds from Step S104 to Step SA105, and the measurement results are reflected in the drawing setting.

There is a case where the workpiece W is conveyed at an angle with respect to the horizontal direction. At this time, there is no problem in drawing if the drawing machine 2 is also inclined so as to match the conveyance direction of the workpiece W, but there is a case where the drawing machine 2 cannot be inclined so as to match the conveyance direction of the workpiece W as described above. In this case, as illustrated in the upper side of FIG. 8E, processing for inclining an image to be drawn by an angle $\alpha$ to match the conveyance direction of the workpiece W is executed, and the drawing control unit 40*c* controls ink ejection based on an image on which the processing has been executed, so that a final drawing result can be made correct as illustrated in the lower side of FIG. 8E. A specific flow will be described later.

There is a case where the optical movement measurement sensor 30 that measures a movement amount of the workpiece W requires correction depending on a state of the workpiece W or the like. The installation assist mode has an advantage that installation adjustment can be performed without actual drawing on the workpiece W, but a correction image may be drawn for the correction of the optical movement measurement sensor 30 in the installation assist mode as necessary. The correction image, for example, assumes to draw a reference image including a plurality of printing patterns having a predetermined interval from the print head 24 on the workpiece W. The correction image is drawn by the drawing control unit 40*c*.

Figure 8F:
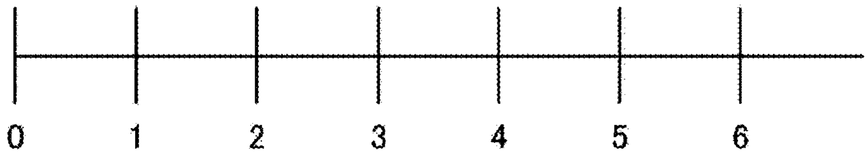
FIG. 8F is a view illustrating an example of a first correction image.
Figure 8G:
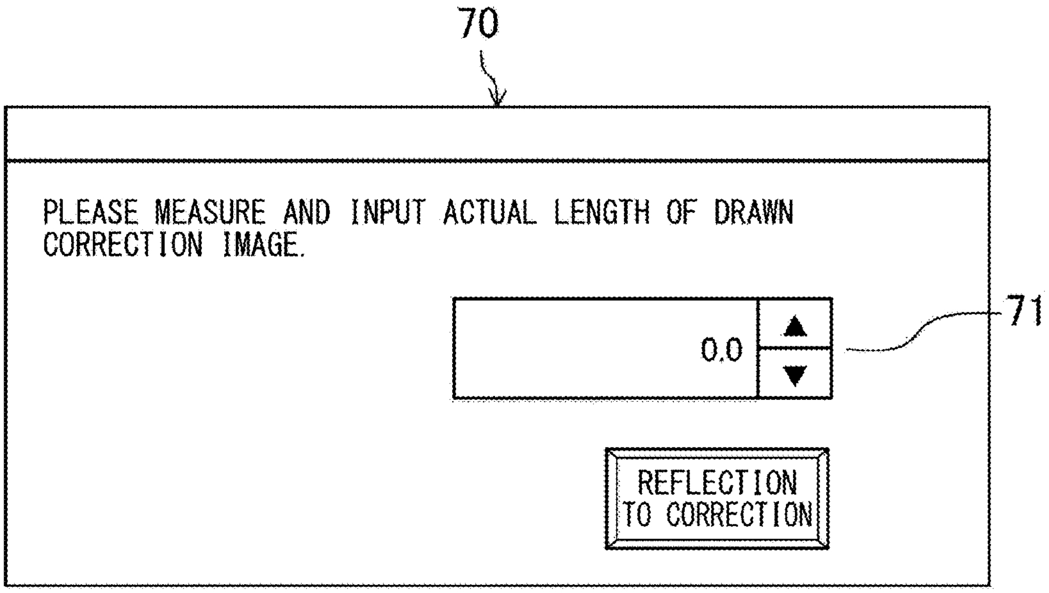
FIG. 8G is a view illustrating an example of a correction value input screen.

FIG. 8F illustrates an example of a first correction image. After the first correction image is drawn, a dimension is measured, and a deviation between the measured dimension and the first correction image is used as a correction coefficient, whereby the optical movement measurement sensor 30 can be corrected. FIG. 8G illustrates a correction value input screen 70, and the correction value input screen 70 is provided with an input area 71 to which a measurement result of the first correction image after drawing is input. The correction coefficient can be calculated based on a value input to the input area 71 and the dimension of the first correction image on the drawing data.

Figure 8H:
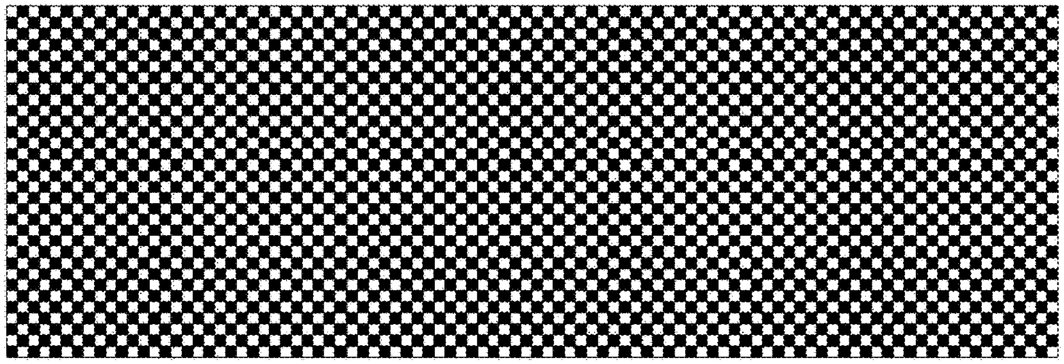
FIG. 8H is a view illustrating an example of a second correction image.

FIG. 8H illustrates an example of the first correction image. When such a grid-like pattern at regular intervals, the optical movement measurement sensor 30 can be corrected, and a movement amount in the direction perpendicular to the conveyance direction and a movement amount in the oblique direction of the workpiece W can be visually recognized.

As described above, the drawing control unit 40*c* draws the correction image assumed to be drawn on the workpiece W at a predetermined interval from the print head 24 on the workpiece, and receives an input of a drawing result of the correction image drawn on the workpiece W. Then, the drawing control unit 40*c* executes calibration based on a comparison between the drawing result of the correction image and the predetermined interval.

(Control by Drawing Control Unit)

The drawing control unit 40*c* illustrated in FIG. 2 acquires reference position information indicating that a reference position of the workpiece W is at a predetermined position and a measurement value generated by the optical movement measurement sensor 30. After acquiring the reference position information and the measurement value output from the optical movement measurement sensor 30, the drawing control unit 40*c* controls the ink ejection from the ejection ports 24*a* of the print head 24 based on a current offset position with respect to the reference position based on the reference position information and the measurement value output from the optical movement measurement sensor 30 and drawing data.

The reference position information acquired by the drawing control unit 40*c* is a timing signal indicating that the workpiece W being conveyed by the conveyor 10 has arrived at a predetermined position. Since the timing sensor 8 is a sensor that detects arrival of the workpiece W conveyed by the conveyor 10 at a predetermined position, the drawing control unit 40*c* acquires a signal output from the timing sensor 8 as a timing signal. In addition, the external device 6 can indirectly acquire, by a detector (not illustrated), arrival of the workpiece W conveyed by the conveyor 10 at a predetermined position, the drawing control unit 40*c* may acquire a signal output from the external device 6 as a timing signal. The timing sensor 8 and the external device 6 are examples of a timing signal output unit that outputs a timing signal.

In a case where the distance sensor 31 is caused to function as an optical timing sensor, the drawing control unit 40*c* receives the timing signal generated by the distance sensor 31. In this case, the drawing control unit 40*c* controls the ink ejection from the ejection ports 24*a* based on drawing data stored in the storage unit 42 and a current relative position from the ejection ports 24*a* of the print head 24 to each of a plurality of offset positions of the drawing data, the current relative position based on the measurement value generated by the optical movement measurement sensor 30 using the timing signal generated by the distance sensor 31 as a reference.

Since the sensor housing 32 is fixed to the main housing 25, the optical movement measurement sensor 30, the distance sensor 31, and the print head 24 are positioned and fixed. The relative positional relationship among the optical movement measurement sensor 30, the distance sensor 31, and the print head 24 is set so as to satisfy a relationship in which the optical movement measurement sensor 30 can receive light from the workpiece W from a time point when the timing signal generated by the distance sensor 31 is recognized until drawing of the drawing information on the workpiece W is completed. The light from the workpiece W also includes reflection light that has been emitted to the workpiece W and reflected by a surface of the workpiece W.

In addition, the optical movement measurement sensor 30 of the sensor unit 3 may generate a timing signal indicating that the workpiece W has arrived at a predetermined position based on a change in an amount of received light. That is, when the conveyed workpiece W enters a light projection range of the optical movement measurement sensor 30 from the outside of the light projection range, the amount of light received by the optical movement measurement sensor 30 changes. Since a timing at which the amount of light changes can be set as a timing at which the workpiece W has arrived at the predetermined position, the optical movement measurement sensor 30 can generate the timing signal without using the timing sensor 8 and the external device 6. That is, the optical movement measurement sensor 30 is a portion that receives light from the workpiece W, generates a measurement value related to movement of the workpiece W in the conveyance direction based on the received light, and generates a timing signal indicating that the reference position in the workpiece W has been detected.

The drawing control unit 40*c* can acquire the timing signal generated by the optical movement measurement sensor 30 as the reference position information. In this case, the drawing control unit 40*c* acquires a current relative position from the ejection ports 24*a* of the print head 24 to each of the plurality of offset positions of the drawing data based on the measurement value generated by the optical movement measurement sensor 30 using the timing signal generated by the optical movement measurement sensor 30 as a reference, and controls the ink ejection from the ejection ports 24*a* based on the acquired current relative position and the drawing data stored in the storage unit 42. Note that the drawing control unit 40*c* can also generate a timing signal at a timing when the amount of light received by the optical movement measurement sensor 30 changes and acquire the timing signal.

An offset amount from the reference position in the workpiece W to a position where the drawing information is drawn can be defined as a first offset amount, and an offset amount from the reference position in the workpiece W to the ejection ports 24*a* of the print head 24 can be defined as a second offset amount. The sensor housing 32 is positioned and fixed with respect to the ejection ports 24*a* of the print head 24 to correspond to the second offset amount. In this case, the drawing control unit 40*c* can determine a current relative position from the ejection ports 24*a* of the print head 24 to each of a plurality of offset positions of drawing data based on the first offset amount and the second offset amount.

(Drawing Control According to Only Detection Speed or Distance)

Figure 9:
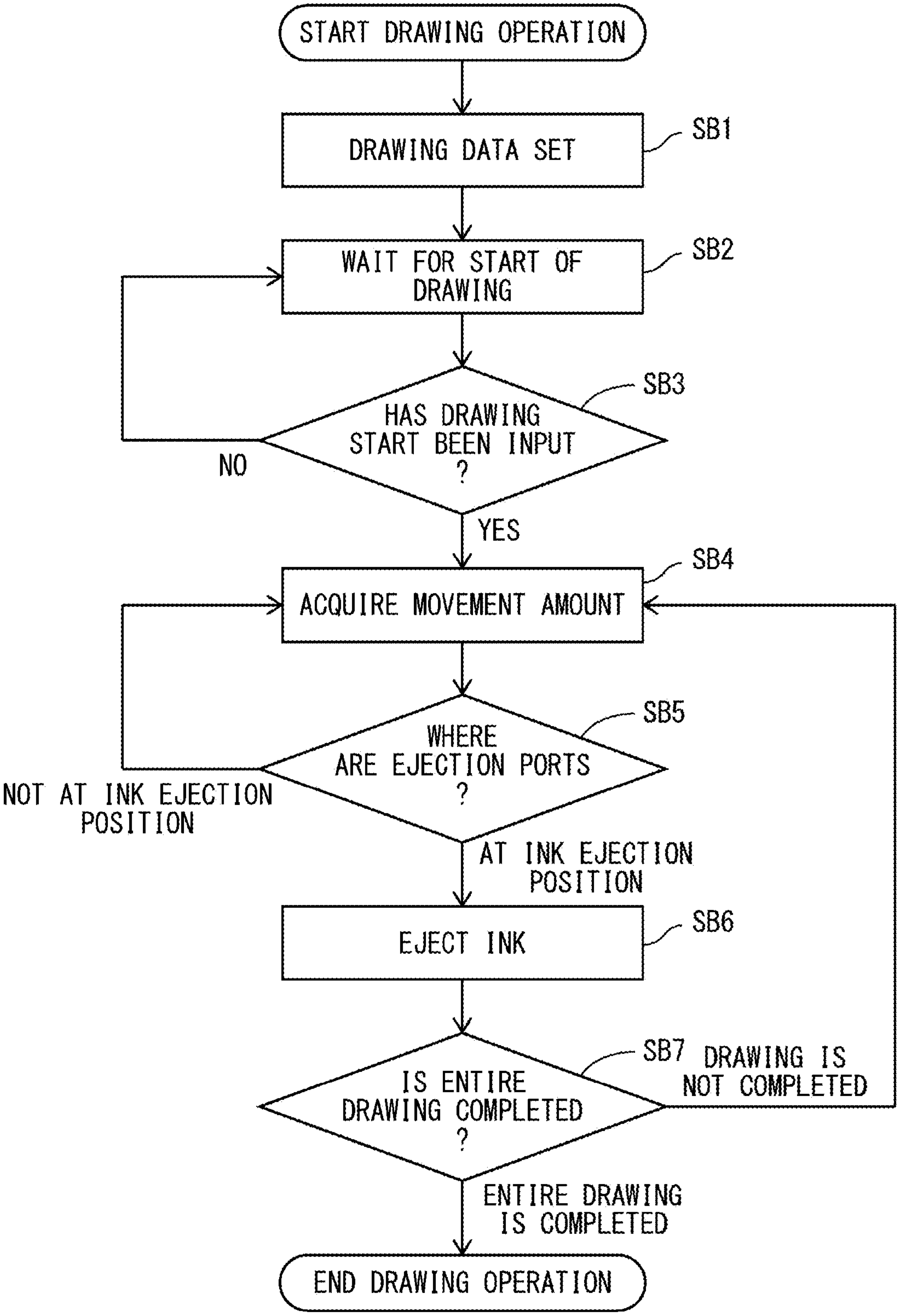
FIG. 9 is a flowchart illustrating an example of drawing control according to only a detection speed or a distance.
Figure 10:
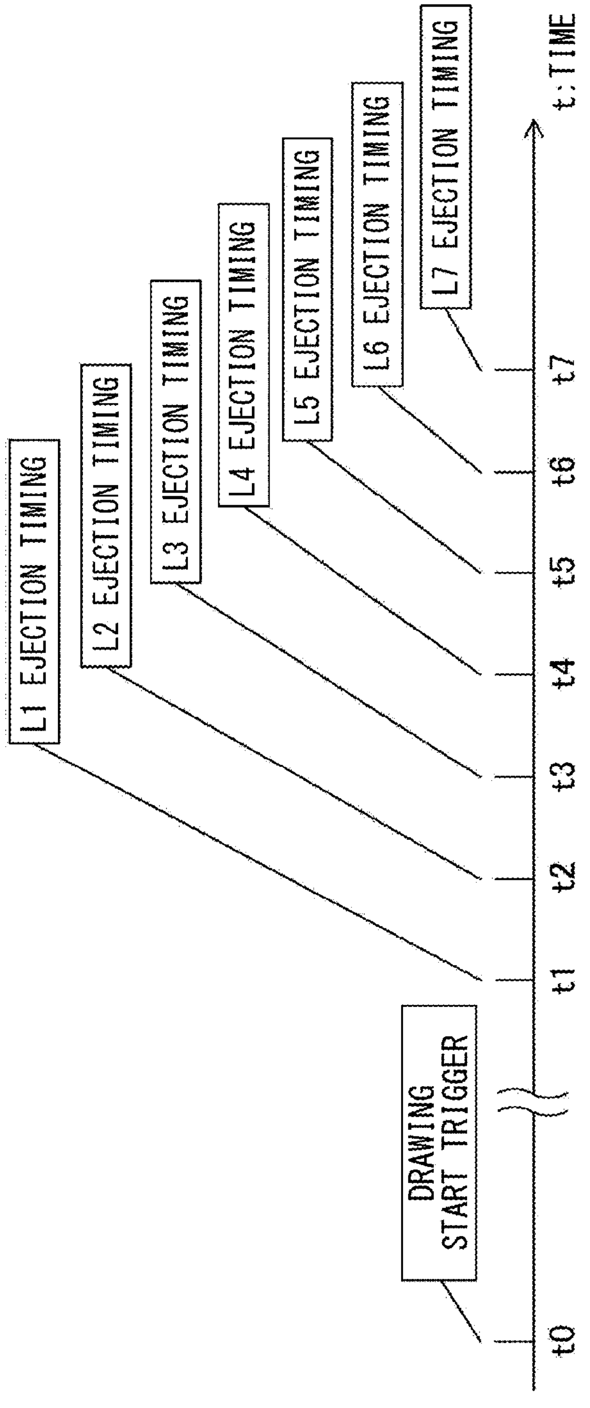
FIG. 10 is a timing chart illustrating a time relationship of ink ejection in a constant-speed drawing setting.
Figure 11:
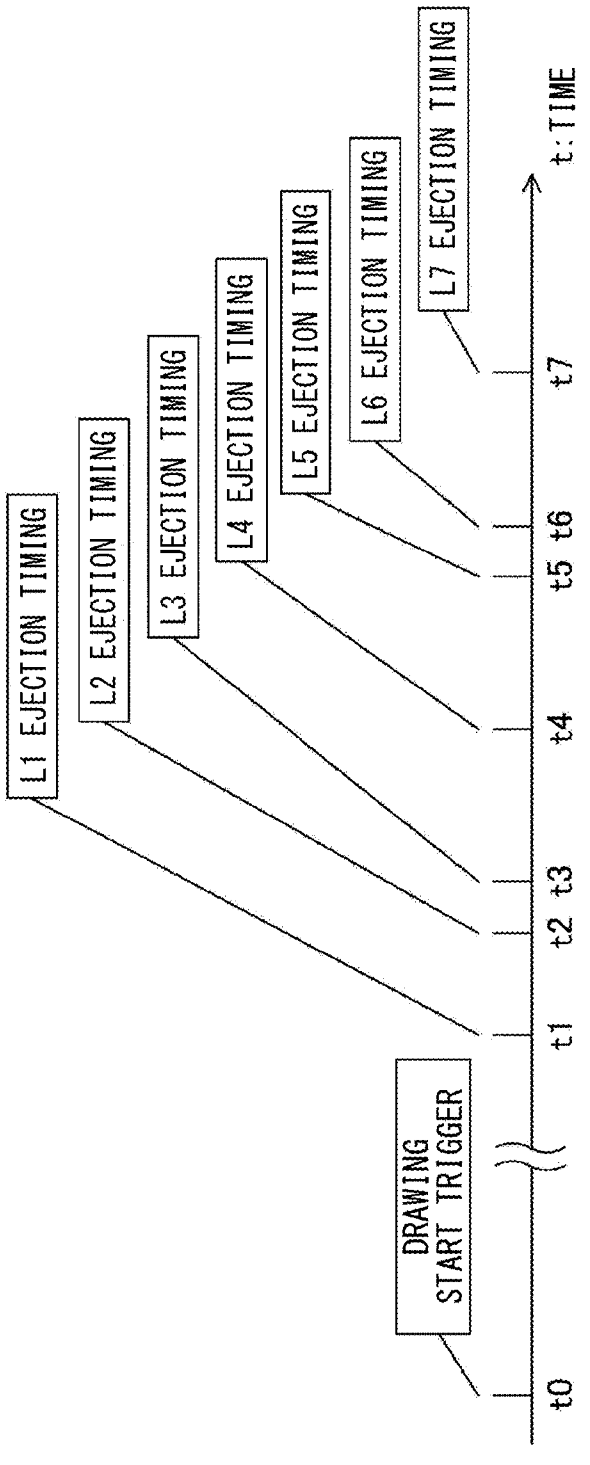
FIG. 11 is a timing chart illustrating a time relationship of ink ejection at a non-constant speed.

FIG. 9 is a flowchart illustrating an example of a procedure of drawing control according to only a detection speed or a distance detected by the sensor unit 3. This control is control executed when a conveyance speed (movement amount) of the workpiece W cannot be accurately acquired without the sensor unit 3. That is, in a case where the drawing data illustrated in FIG. 5 is drawn in the constant-speed drawing setting in which the drawing is performed assuming that the conveyance speed of the workpiece W is constant, all time intervals of the first to seventh timings L1 to L7 are equal as illustrated in FIG. 10. On the other hand, when the conveyance speed of the workpiece W is non-constant by control using the encoder 7 or the like, time intervals of the first to seventh timings L1 to L7 are unequal as illustrated in FIG. 11. In this manner, the drawing control unit 40*c* controls the ink ejection from the ejection ports 24*a* based on a current relative position from the ejection ports 24*a* of the print head 24 to each of a plurality of offset positions of drawing data and the drawing data.

Here, a case where a conveyance speed by the conveyor 10 is unstable or a conveyance speed detected by the encoder 7 is unstable is assumed. In addition, a case where the workpiece W is caught on a member such as the guide (not illustrated) in the middle of being conveyed by the conveyor 10, and the speed of the workpiece W is lower than the conveyance speed by the conveyor 10 is assumed. Further, there is an acceleration/deceleration region when the conveyor 10 is started and stopped, and the speed of the workpiece W becomes unstable in the acceleration/deceleration region.

In regard to these, in the present embodiment, the drawing control is executed based on the speed or the distance obtained by the sensor unit 3 capable of directly detecting the conveyance speed of the workpiece W, so that constant-speed drawing and non-constant-speed drawing can be performed by reflecting the actual conveyance speed of the workpiece W without depending on the unstable conveyance speed of the conveyor 10.

Hereinafter, description will be given based on a flowchart illustrated in FIG. 9. After the start of the drawing operation, in Step SB1, the drawing control unit 40*c* acquires the drawing data set included in the job stored in Step SA11 of the flowchart illustrated in FIG. 8A. In Step SB2, the drawing machine 2 waits for the start of drawing, waits for a predetermined time, and then proceeds to Step SB3. In Step SB3, the drawing machine 2 determines whether a timing signal has been input. In a state where there is no input of the timing signal, the process proceeds to Step SB2, and the drawing machine 2 continues to wait for the start of drawing.

A case where the timing signal is input indicates that the workpiece W has arrived at a predetermined position, and the process proceeds to Step SB4. In Step SB4, the workpiece movement amount acquisition unit 40*d* acquires a movement amount of the workpiece W based on a measurement value output from the optical movement measurement sensor 30 of the sensor unit 3. The drawing control unit 40*c* calculates a current offset position with respect to the reference position of the workpiece W based on the timing signal and the movement amount of the workpiece W. The movement amount of the workpiece W is always acquired.

In Step SB5, a position of the ejection ports 24*a* of the print head 24 with respect to a current position of the workpiece W is determined based on the current offset position with respect to the reference position of the workpiece W calculated in Step SB4 and the drawing data stored in the storage unit 42. When the position of the ejection ports 24*a* is not a position where ink should be ejected, the process proceeds to Step SB4, and a current offset position with respect to the reference position of the workpiece W is calculated. On the other hand, when the position of the ejection ports 24*a* is the position where ink should be ejected, the process proceeds to Step SB6, and the drawing control unit 40*c* controls the print head drive unit 23 to eject ink from the ejection ports 24*a*.

Thereafter, the process proceeds to Step SB7, and it is determined whether all pieces of drawing data have been drawn. When there remains drawing data that has not been drawn, the process proceeds to Step SB4. On the other hand, when all the pieces of drawing data have been drawn, the drawing operation is ended, and conveyance of the next workpiece W is awaited.

(Control when Detection Accuracy Decreases)

There may be a case where detection accuracy of the optical movement measurement sensor 30 of the sensor unit 3 is low due to certain causes. For example, when dirt adheres to a light receiving surface of the optical movement measurement sensor 30, there is a case where the amount of received light decreases so that a measurement value cannot be generated, and there is a case where the movement amount of the speckle pattern cannot be measured so that a measurement value cannot be generated. A flowchart illustrated in FIG. 12 illustrates control including processing assuming the case where the detection accuracy of the optical movement measurement sensor 30 is low.

Figure 12:
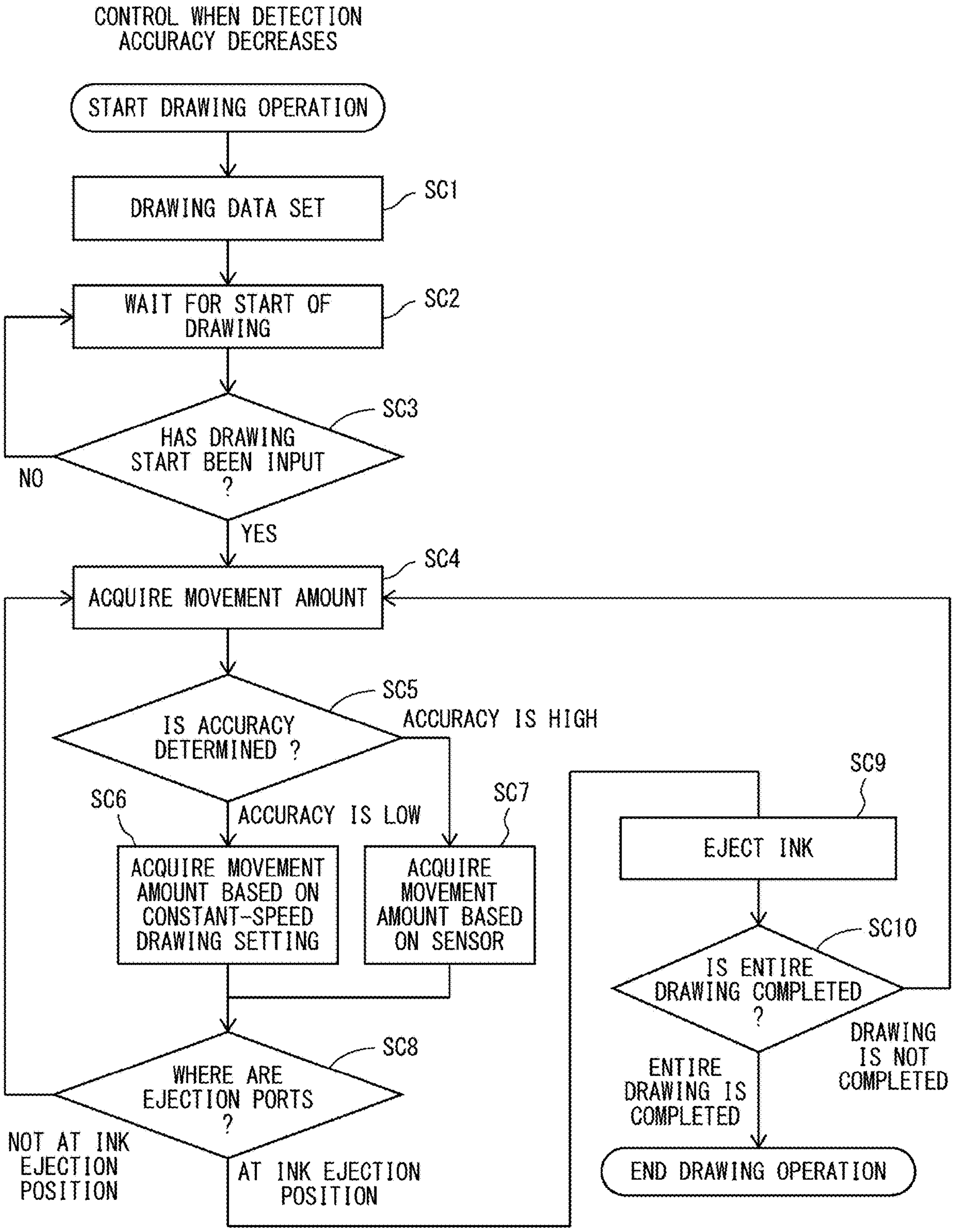
FIG. 12 is a flowchart illustrating an example of control when detection accuracy decreases.

Steps SC1 to SC4 illustrated in FIG. 12 are the same as Steps SB1 to SB4 illustrated in FIG. 9. In Step SC5, the detection accuracy of the optical movement measurement sensor 30 is determined. For example, in a case where the amount of received light of the optical movement measurement sensor 30 is equal to or less than a threshold, and in a case where the movement amount of the speckle pattern cannot be measured, it is determined as a situation in which accuracy of the measurement value generated by the optical movement measurement sensor 30 is equal to or lower than a predetermined value and a drawing failure is likely to occur, and the process proceeds to Step SC6. In the other cases, it is determined that the detection accuracy of the optical movement measurement sensor 30 is high and the drawing failure is unlikely to occur, and the process proceeds to Step SC7.

In Step SC6, the workpiece movement amount acquisition unit 40*d* acquires a movement amount based on the constant-speed drawing setting or the encoder 7. The movement amount can also be acquired regardless of the encoder 7. That is, the user can set a conveyance speed of the conveyor 10 according to the flowchart illustrated in FIG. 8A by operating the terminal-side operation unit 5*b* or the operation display unit 43, and calculate a movement amount of the workpiece W by the conveyor 10 based on the set conveyance speed. In this case, the terminal-side operation unit 5*b* or the operation display unit 43 is a movement amount acquisition unit that acquires the movement amount caused by the conveyor 10. After the workpiece movement amount acquisition unit 40*d* acquires the movement amount based on the constant-speed drawing setting or the encoder 7, the drawing control unit 40*c* calculates a current offset position with respect to the reference position of the workpiece W based on a timing signal and the movement amount of the workpiece W.

In addition, in Step SC6, processing for notifying the user of an error can also be performed. This error notification may include content prompting the user to perform maintenance such as removal of foreign matter adhering to the sensor unit 3.

On the other hand, when the detection accuracy of the optical movement measurement sensor 30 is high and the process proceeds to Step SC7, the workpiece movement amount acquisition unit 40*d* acquires a movement amount of the workpiece W based on the measurement value output from the optical movement measurement sensor 30 of the sensor unit 3. The drawing control unit 40*c* calculates a current offset position with respect to the reference position of the workpiece W based on the timing signal and the movement amount of the workpiece W.

After Step SC6 or Step SC7, in Step SC8, a position of the ejection ports 24*a* of the print head 24 with respect to a current position of the workpiece W is determined based on the current offset position with respect to the reference position of the workpiece W calculated in Step SC6 or Step SC7 and the drawing data stored in the storage unit 42. When the position of the ejection ports 24*a* is not a position where ink should be ejected, the process proceeds to Step SC4. On the other hand, when the position of the ejection ports 24*a* is the position where ink should be ejected, the process proceeds to Step SC9. Steps SC9 and SC10 are the same as Steps SB6 and SB7 in FIG. 9, respectively.

In this manner, when the accuracy of the measurement value generated by the optical movement measurement sensor 30 is equal to or lower than a predetermined value, the drawing control unit 40*c* can control the ink ejection from the ejection ports 24*a* based on the movement amount based on the constant-speed drawing setting or the encoder 7 and the drawing data, and thus can execute drawing based on the actual conveyance speed (movement amount) of the workpiece W.

In this control, due to the processing of Steps SC5 to SC7, switching occurs between the measurement value generated by the optical movement measurement sensor 30 and a value based on the constant-speed drawing setting or the encoder 7. In this switching, a discontinuous change in workpiece speed occurs due to a processing delay, and thus, in order to prevent a feeling of strangeness in a drawing result, complementary processing such as linear interpolation may be performed before and after the switching, and control to smoothly connect control speeds before and after the switching may be performed.

(Control when Detection Speed Exceeds Threshold)

Figure 13:
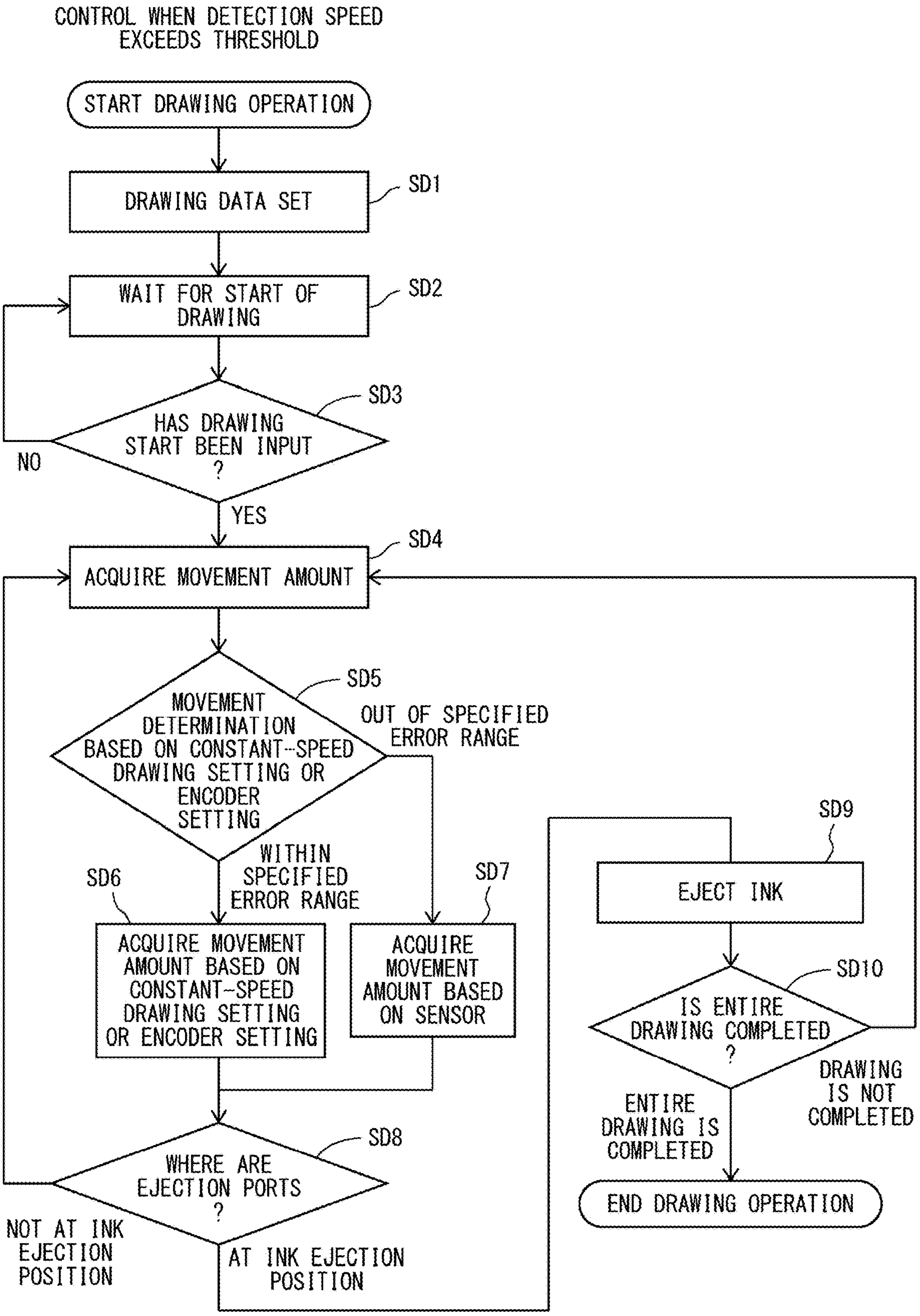
FIG. 13 is a flowchart illustrating an example of control when a detection speed exceeds a threshold.

FIG. 13 illustrates control including processing assuming a case where the detection speed detected by the sensor unit 3 may exceed a threshold. When a conveyance speed of the conveyor 10 is set in advance according to the flowchart illustrated in FIG. 8A, the normal drawing process is executed based on the constant-speed drawing setting or an output from the encoder 7. For example, a conveyance speed set based on the constant-speed drawing setting has higher accuracy than a speed detected by the optical movement measurement sensor 30, and thus, a favorable drawing state is obtained by executing the drawing process based on the constant-speed drawing setting or the output from the encoder 7 at the normal time.

However, for example, there may be a case where the workpiece W is caught on a certain member on the conveyance surface 10*a* so that the speed of the workpiece W cannot be detected. In such a case, the speed detected by the optical movement measurement sensor 30 exceeds a preset speed threshold, and drawing is executed according to the speed detected by the optical movement measurement sensor 30 regardless of the constant-speed drawing setting or the output from the encoder 7. Hereinafter, control when the speed detected by the optical movement measurement sensor 30 exceeds the threshold will be described with reference to a flowchart illustrated in FIG. 13.

Steps SD1 to SD4 illustrated in FIG. 13 are the same as Steps SB1 to SB4 illustrated in FIG. 9. In Step SD5, a movement amount based on the constant-speed drawing setting or the encoder 7 is acquired, and movement is determined based on the acquired movement amount. That is, the movement amount acquired in Step SD4 is compared with the movement amount acquired in Step SD5, and it is determined whether the measurement value generated by the optical movement measurement sensor 30 exceeds the preset speed threshold. This threshold can be set to, for example, about plus or minus 10% of the conveyance speed in the constant-speed drawing setting.

When it is determined in Step SD5 that the measurement value generated by the optical movement measurement sensor 30 does not exceed the threshold, it is estimated that the catch of the workpiece W or the like does not occur, and in this case, the process proceeds to Step SD6 with the determination that the movement is within a specified error range. On the other hand, when it is determined in Step SD5 that the measurement value generated by the optical movement measurement sensor 30 exceeds the threshold, it is estimated that the catch of the workpiece W or the like occurs, and in this case, the process proceeds to Step SD7 with the determination that the movement is out of the specified error range.

In Step SD6, the workpiece movement amount acquisition unit 40*d* acquires a movement amount based on the constant-speed drawing setting or an output from the encoder 7. After the workpiece movement amount acquisition unit 40*d* acquires the movement amount based on the constant-speed drawing setting or the output from the encoder 7, the drawing control unit 40*c* calculates a current offset position with respect to the reference position of the workpiece W based on a timing signal and the movement amount of the workpiece W.

In Step SD7, the workpiece movement amount acquisition unit 40*d* acquires a movement amount of the workpiece W based on a measurement value output from the optical movement measurement sensor 30 of the sensor unit 3. The drawing control unit 40*c* calculates a current offset position with respect to the reference position of the workpiece W based on the timing signal and the movement amount of the workpiece W. Steps SD8 to SD10 are the same as Steps SC8 to SC10 in FIG. 12.

Therefore, the drawing control unit 40*c* determines in Step SD5 whether the measurement value generated by the optical movement measurement sensor 30 exceeds the threshold, and controls the ink ejection from the ejection ports 24*a* based on the movement amount based on the constant-speed drawing setting or the output from the encoder 7 and the drawing data until the measurement value exceeds the threshold. On the other hand, when the measurement value generated by the optical movement measurement sensor 30 exceeds the threshold as a result of the determination in Step SD5, the drawing control unit 40*c* can control the ink ejection from the ejection ports 24*a* based on the current offset position acquired based on the measurement value generated by the optical movement measurement sensor 30 and the drawing data.

In this control, due to the processing of Steps SD5 to SD7, switching occurs between the measurement value generated by the optical movement measurement sensor 30 and a value based on the constant-speed drawing setting or the output from the encoder 7. At the time of switching, a step change occurs from a setting value to a control value, and thus, in order to prevent a feeling of strangeness in a drawing result, complementary processing such as linear interpolation may be performed before and after the switching, and control to smoothly connect control speeds before and after the switching may be performed.

In addition, the feeling of strangeness occurs in the drawing result if the measurement value generated by the optical movement measurement sensor 30 is chattering with respect to the threshold around the threshold serving as a determination reference for switching between the measurement value generated by the optical movement measurement sensor 30 and the value based on the constant-speed drawing setting or the output from the encoder 7. In order to suppress the occurrence of the feeling of strangeness, hysteresis may be provided for the threshold, and control may be performed such that the switching due to the chattering does not frequently occur.

In addition, when it is determined in Step SD5 that the measurement value generated by the optical movement measurement sensor 30 exceeds the threshold, control may be performed to notify the user that the measurement value generated by the optical movement measurement sensor 30 exceeds the threshold by warning or the like without proceeding to Step SC7.

(Bumping Correction)

For example, a conveyor having large vibration such as a roller conveyor may be used as the conveyor 10. The workpiece W conveyed by this conveyor 10 has a vibration component perpendicular to the conveyance direction of the workpiece W, and the workpiece W irregularly vibrates in the up-down direction with respect to the drawing machine 2 when it is assumed that the workpiece W is conveyed horizontally. If the workpiece W has the vibration component perpendicular to the conveyance direction, there is a possibility that the drawing quality greatly deteriorate. In the present embodiment, the vibration of the workpiece W in a direction perpendicular to the conveyance direction is referred to as “bumping”. Bumping includes both regular vibration and irregular vibration.

The ink jet printer 1 according to the present embodiment is configured to be capable of executing bumping correction in order to suppress the deterioration in the drawing quality due to the bumping of the workpiece W. In the bumping correction, the drawing control unit 40*c* controls the ink ejection from the ejection ports 24*a* of the print head 24 based on the movement amount of the workpiece W in the direction perpendicular to the conveyance direction measured by the optical movement measurement sensor 30. Hereinafter, details of the bumping correction will be described with reference to a flowchart illustrated in FIG. 14.

Figure 14:
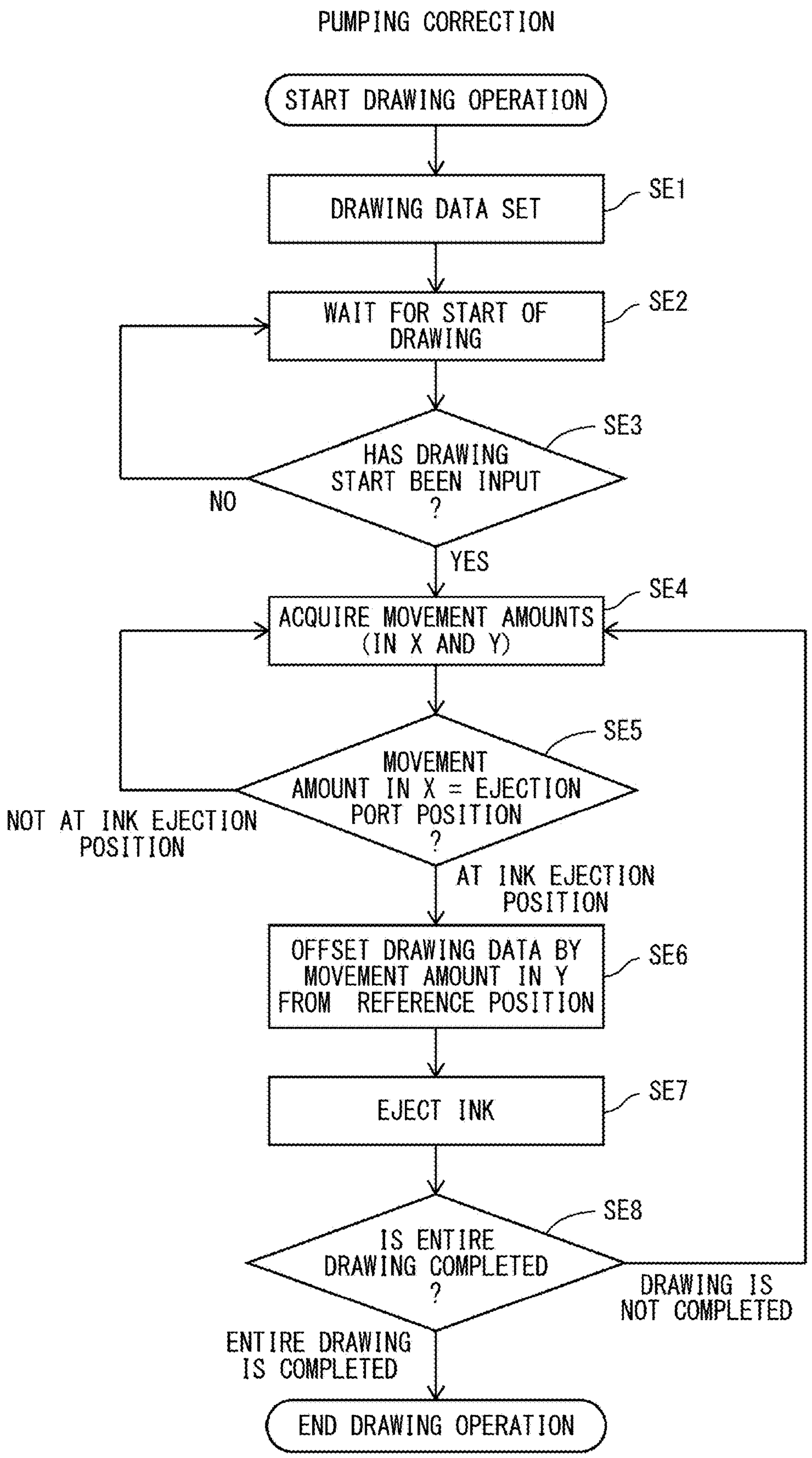
FIG. 14 is a flowchart illustrating an example of control of bumping correction.

Steps SE1 to SE3 illustrated in FIG. 14 are the same as Steps SB1 to SB3 illustrated in FIG. 9. In Step SE4, the workpiece movement amount acquisition unit 40*d* acquires a movement amount of the workpiece W in the conveyance direction (defined as an X direction) and a movement amount of the workpiece W in the direction (defined as a Y direction) perpendicular to the conveyance direction based on a measurement value output from the optical movement measurement sensor 30 of the sensor unit 3. When the measurement value output from the optical movement measurement sensor 30 includes a component in the X direction and a component in the Y direction, the movement amount in the X direction and the movement amount in the Y direction can be acquired by executing a process of separating the component in the X direction and the component in the Y direction.

The drawing control unit 40*c* calculates a current offset position of the workpiece W with respect to the reference position in the X direction based on a timing signal and the movement amount of the workpiece W in the X direction. At this time, a current offset position with respect to the reference position of the workpiece W is also calculated in the Y direction. Note that the X direction is a direction in which the plurality of ejection ports 24*a* are arrayed, and is the vertical direction in the case of horizontal conveyance. In addition, the Y direction can also be referred to as a direction orthogonal to the array direction of the plurality of ejection ports 24*a*.

In Step SE5, a position of the ejection ports 24*a* of the print head 24 with respect to a current position of the workpiece W is determined in the X direction of the workpiece W based on the current offset position of the workpiece W with respect to the reference position in the X direction calculated in Step SE4 and the drawing data stored in the storage unit 42. When the position of the ejection ports 24*a* in the X direction is not a position where ink should be ejected, the process proceeds to Step SE4, and a current offset position with respect to the reference position of the workpiece W in the X direction is calculated. On the other hand, when the position of the ejection ports 24*a* in the X direction is the position where ink should be ejected, the process proceeds to Step SE6.

Figure 15:
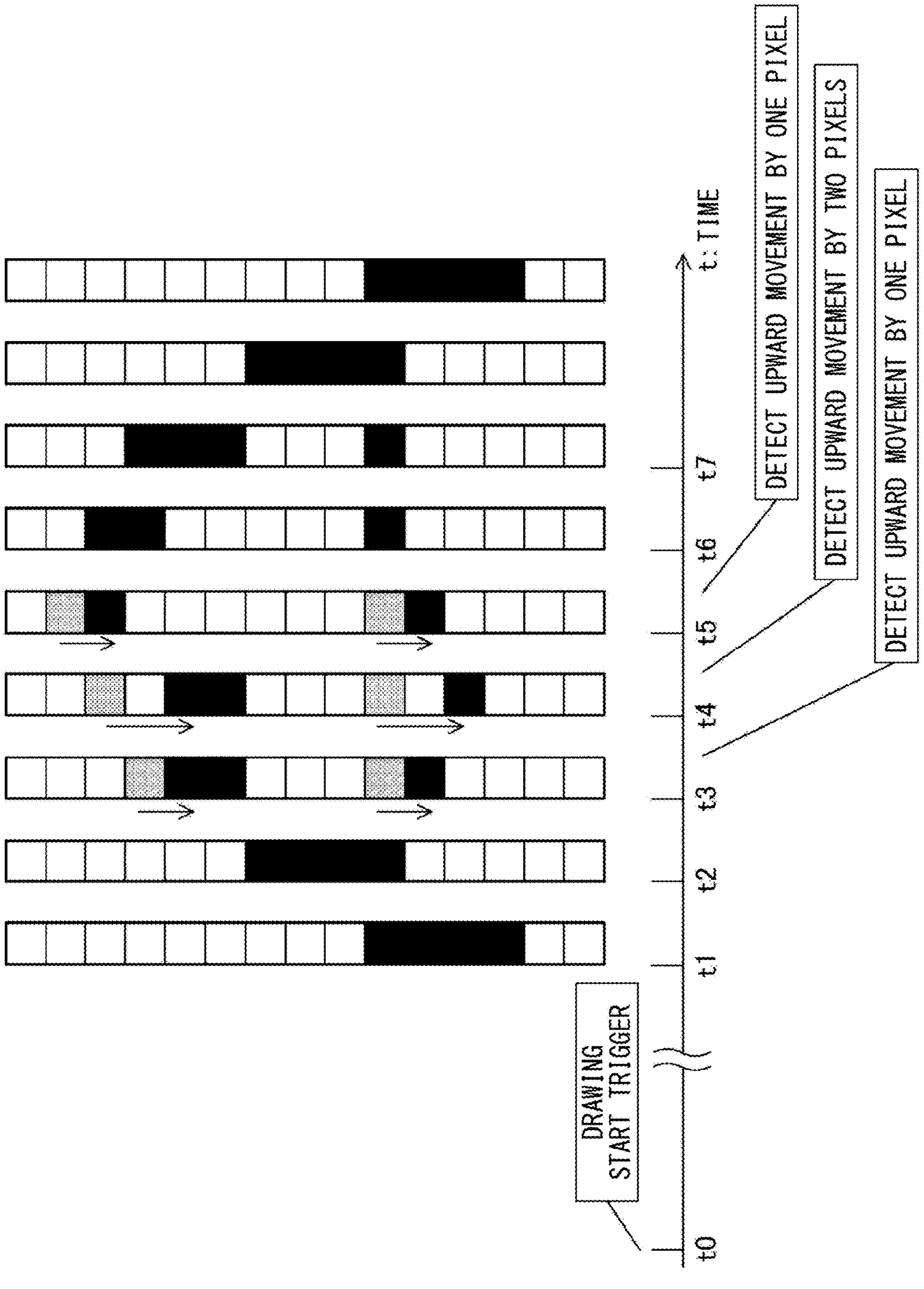
FIG. 15 is a view for describing a case where the drawing data is offset by the bumping correction.

In Step SE6, the drawing data is offset by the movement amount in the Y direction from the reference position. For example, original data of drawing data illustrated in FIG. 15 is the drawing data illustrated in FIG. 5. In FIG. 15, a case where it is detected that the workpiece W has moved upward by one pixel from the reference position is illustrated at an ejection timing t3 and an ejection timing t5. In this case, drawing data at each of the ejection timing t3 and the ejection timing t5 is offset downward by one pixel in a direction of canceling the upward movement of the workpiece W. In addition, a case where it is detected that the workpiece W has moved upward by two pixels from the reference position is illustrated at an ejection timing t4. In this case, drawing data at the ejection timing t4 is offset downward by two pixels in the direction of canceling the upward movement of the workpiece W.

An offset amount and an offset direction of drawing data can be accurately acquired based on the measurement value output from the optical movement measurement sensor 30. In addition, although not illustrated, in a case where it is detected that the workpiece W has moved downward from the reference position at a certain ejection timing, drawing data is offset upward so as to cancel the downward movement of the workpiece W. The offset of data can also be referred to as a shift of the data. Steps SE7 and SE8 in FIG. 14 are the same as Steps SB6 and SB7 in FIG. 9, respectively.

(Bumping Correction Including Rotational Direction)

It is assumed a case where the workpiece W is displaced in a rotational direction about the horizontal axis when the workpiece W being conveyed by the conveyor 10 is viewed from the print head 24 side. In such a case, with the ink jet printer 1 according to the present embodiment, bumping correction including the rotational direction of the workpiece W can be performed, and the favorable drawing quality can be obtained. Control content of the bumping correction including the rotational direction will be described with reference to a flowchart illustrated in FIG. 16. To perform the bumping correction including the rotational direction, a first optical movement measurement sensor 30A and a second optical movement measurement sensor 30B are provided as in a first example illustrated in FIG. 17. The first optical movement measurement sensor 30A and the second optical movement measurement sensor 30B are identical.

Figure 17:
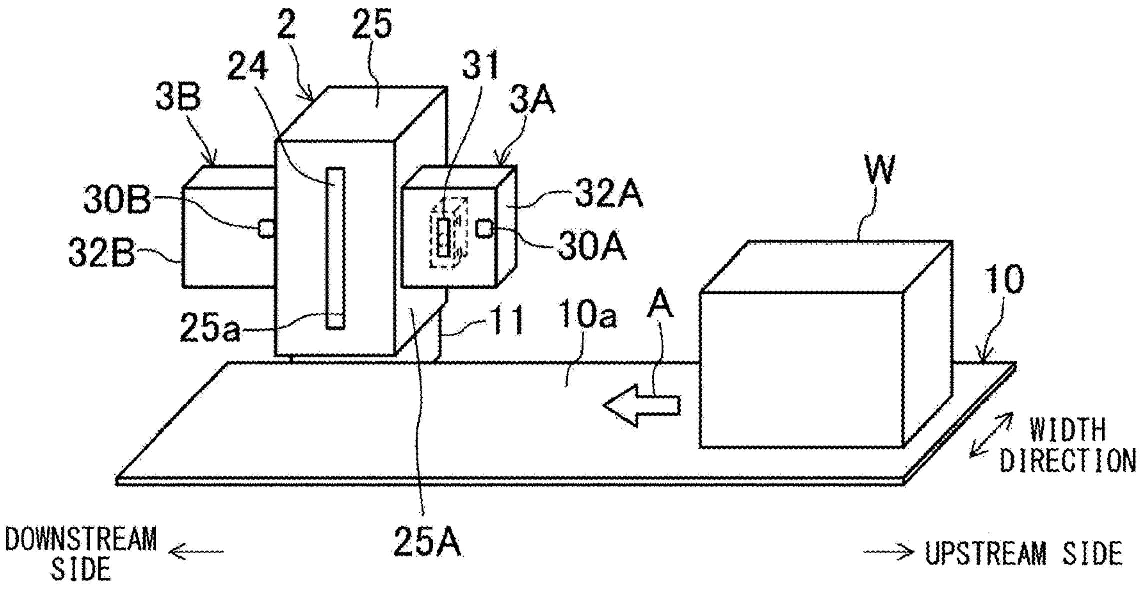
FIG. 17 is a view illustrating a first example in a case where two optical movement measurement sensors are provided.

In the first example illustrated in FIG. 17, a first sensor unit 3A including the first optical movement measurement sensor 30A, a first sensor housing 32A, and the distance sensor 31, and a second sensor unit 3B including the second optical movement measurement sensor 30B and a second sensor housing 32B are attached to the main housing 25 in a freely detachable manner. The first sensor housing 32A is arranged upstream of the print head 24 in the conveyance direction. On the other hand, the second sensor housing 32B is arranged downstream of the print head 24 in the conveyance direction. As a result, the first optical movement measurement sensor 30A and the second optical movement measurement sensor 30B can be installed in the state of being separated from each other in the conveyance direction.

Figure 18:
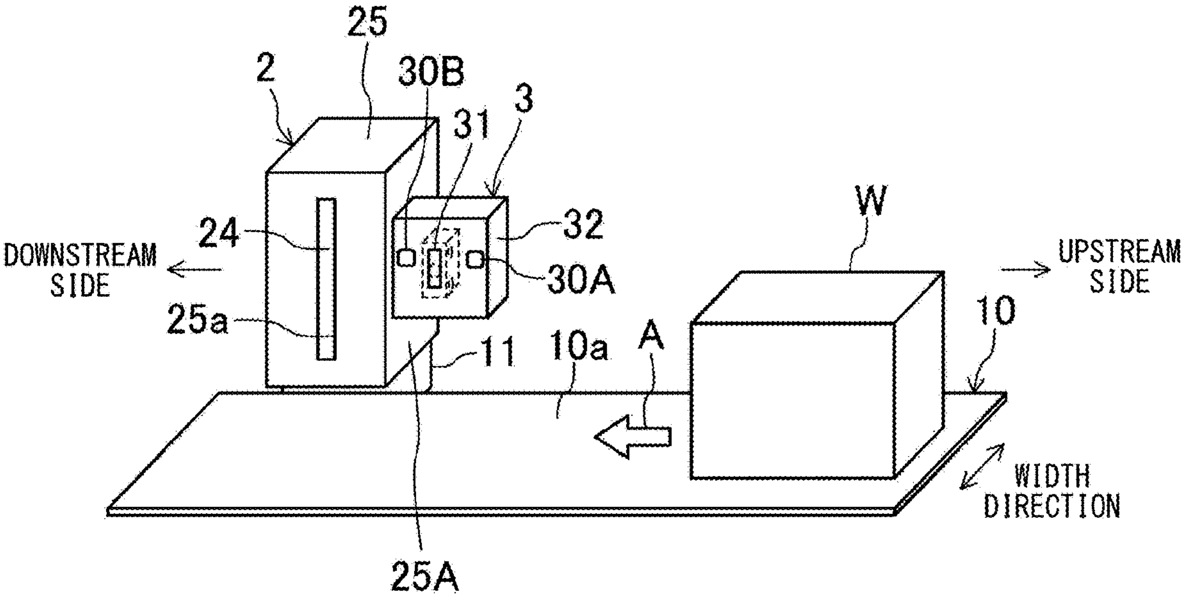
FIG. 18 is a view illustrating a second example in the case where the two optical movement measurement sensors are provided.

In a second example illustrated in FIG. 18, the first optical movement measurement sensor 30A and the second optical movement measurement sensor 30B are accommodated in one sensor housing 32. The first optical movement measurement sensor 30A is arranged upstream of the second optical movement measurement sensor 30B in the conveyance direction. Also in the second example, the first optical movement measurement sensor 30A and the second optical movement measurement sensor 30B can be installed in the state of being separated from each other in the conveyance direction as in the first example.

Figure 16:
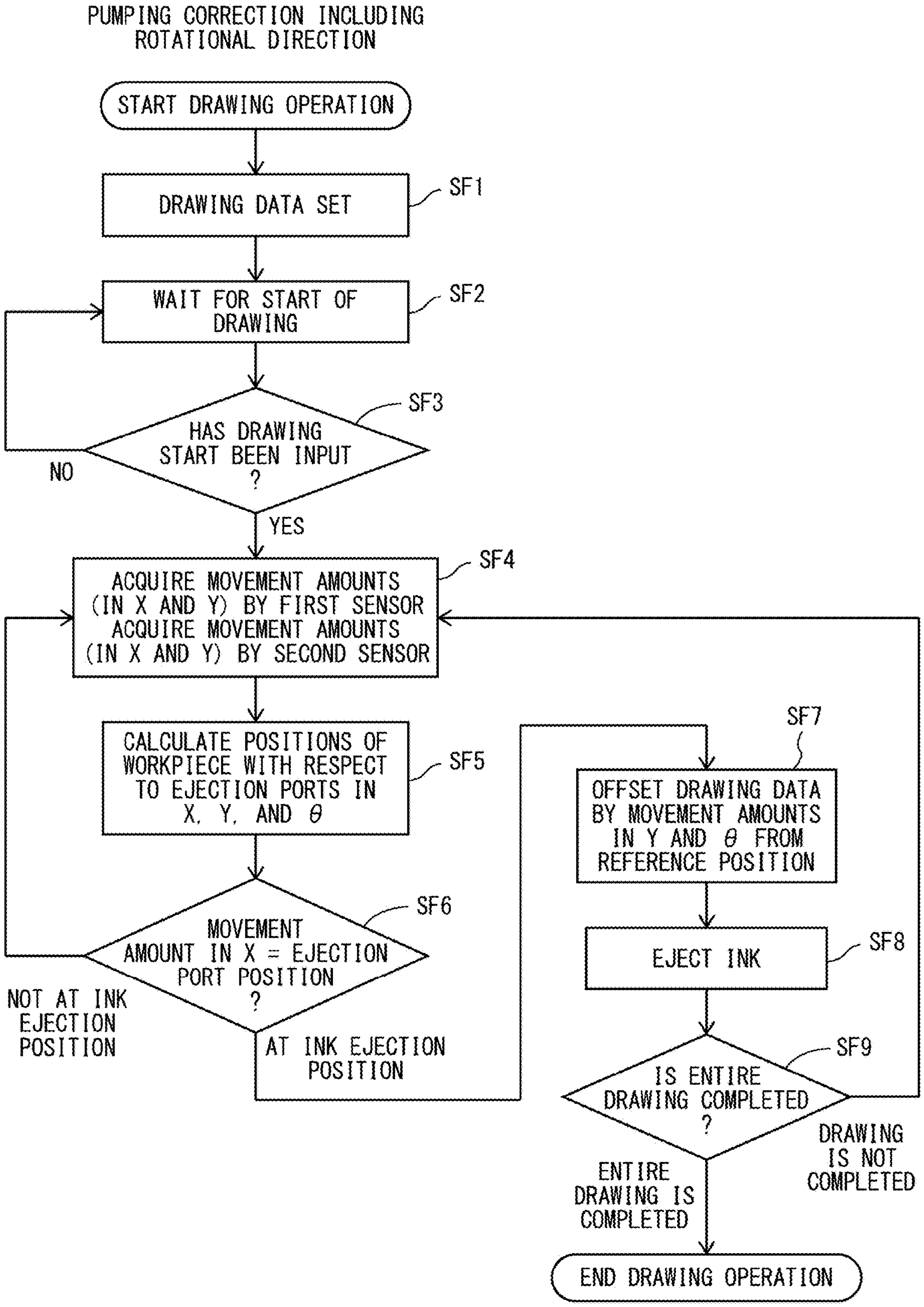
FIG. 16 is a flowchart illustrating an example of control of bumping correction including a rotational direction.

Steps SF1 to SF3 in FIG. 16 are the same as Steps SB1 to SB3 illustrated in FIG. 9. In addition, in Step SF4, the workpiece movement amount acquisition unit 40*d* acquires a movement amount of the workpiece W in the X direction and a movement amount of the workpiece W in the Y direction based on a measurement value output from the first optical movement measurement sensor 30A, and the workpiece movement amount acquisition unit 40*d* acquires a movement amount of the workpiece W in the X direction and a movement amount of the workpiece W in the Y direction based on a measurement value output from the second optical movement measurement sensor 30B. The drawing control unit 40*c* calculates a current offset position of the workpiece W with respect to the reference position in the X direction based on a timing signal and the movement amount of the workpiece W in the X direction.

In Step SF5, a position of the workpiece W with respect to the ejection ports 24*a* of the print head 24 is calculated in the X direction of the workpiece W based on the current offset position with respect to the reference position in the X direction of the workpiece W calculated in Step SF4 and drawing data. At this time, a position of the workpiece W with respect to the ejection ports 24*a* of the print head 24 is also calculated in the Y direction. Further, the rotational direction and a rotation amount (0) of the workpiece W about the horizontal axis are calculated based on the measurement value output from the first optical movement measurement sensor 30A and the measurement value output from the second optical movement measurement sensor 30B.

In Step SF6, a position of the ejection ports 24*a* of the print head 24 with respect to a current position of the workpiece W is determined in the X direction of the workpiece W based on the current offset position of the workpiece W with respect to the reference position in the X direction calculated in Step SF5 and the drawing data stored in the storage unit 42. In a case where the position of the ejection ports 24*a* in the X direction is not a position where ink should be ejected, the process proceeds to Step SF4. On the other hand, when the position of the ejection ports 24*a* in the X direction is the position where ink should be ejected, the process proceeds to Step SF7.

In Step SF7, the drawing data is offset by the movement amount in the Y direction and the rotation amount from the reference position. The offset in the Y direction is performed as described above. It is sufficient to perform the offset in the rotational direction in the same manner as the offset in the Y direction, and the drawing data is offset in a direction of canceling the rotation of the workpiece W. In Step SF7, control is executed so as not to draw the drawing data that has been drawn again. Steps SF8 and SF9 in FIG. 16 are the same as Steps SB6 and SB7 in FIG. 9, respectively.

In a case where the movement amount in the X direction and the movement amount in the Y direction (vibration speed) exceed correctable critical speed, a process of not performing the bumping correction or a process of notifying the user of an error may be performed.

For example, among the plurality of ejection ports 24*a* arrayed in the up-down direction of the print head 24, a predetermined number of the ejection ports 24*a* on the upper side and a predetermined number of the ejection ports 24*a* on the lower side can be set as the ejection ports 24*a* for correction margins. In this case, when the bumping correction is not performed, the drawing process is executed only by the ejection ports 24*a* other than the ejection ports 24*a* for correction margins, that is, the ejection ports 24*a* at an intermediate portion in the up-down direction. On the other hand, when the bumping correction is necessary, drawing can be performed so as to cancel the vibration of the workpiece W using the predetermined number of the upper ejection ports 24*a* (an upper correction margin) including an upper end and the predetermined number of the lower ejection ports 24*a* (a lower correction margin) including a lower end. In this case, when large vibration exceeding the upper and lower correction margins occurs in the workpiece W, the process of not performing the bumping correction or the process of notifying the user of an error is performed.

In addition, the user may be allowed to set a vibration amount to be subjected to the bumping correction. Since there is a response delay due to the bumping correction, it is assumed a case where a vibration amount is increased by performing the bumping correction, contrary to expectation, when a measured vibration amount is small. Thus, a cancellation process of canceling the bumping correction may be executed when the measured vibration amount is equal to or less than a predetermined value.

(Coping with Inclined Line)

The ink jet printer 1 of the present embodiment is configured to supply ink to the print head 24 using the hydraulic head pressure. As a result, the structure can be simplified, but the ink liquid level in the sub tank 21*a* needs to fall within a predetermined tilt range with respect to the horizontal plane (have a tilt with respect to the horizontal plane within several degrees), and the installation of the drawing machine 2 is restricted. In addition, a posture of the sub tank 21*a* supplying the ink to the print head 24 has a tilt tolerance in a positional relationship with a supply port to the print head 24 side.

Meanwhile, there is a case where the conveyance direction by the conveyor 10 is inclined. Examples thereof include an inclination that descends toward the downstream side in the conveyance direction and an inclination that ascends toward the downstream side in the conveyance direction. In a case where the drawing machine 2 is to be installed on such an inclined line, if a tilt of the inclined line exceeds a specified tilt of the drawing machine 2, the drawing machine 2 cannot be installed, and an application range of the drawing machine 2 is limited.

Figure 19:
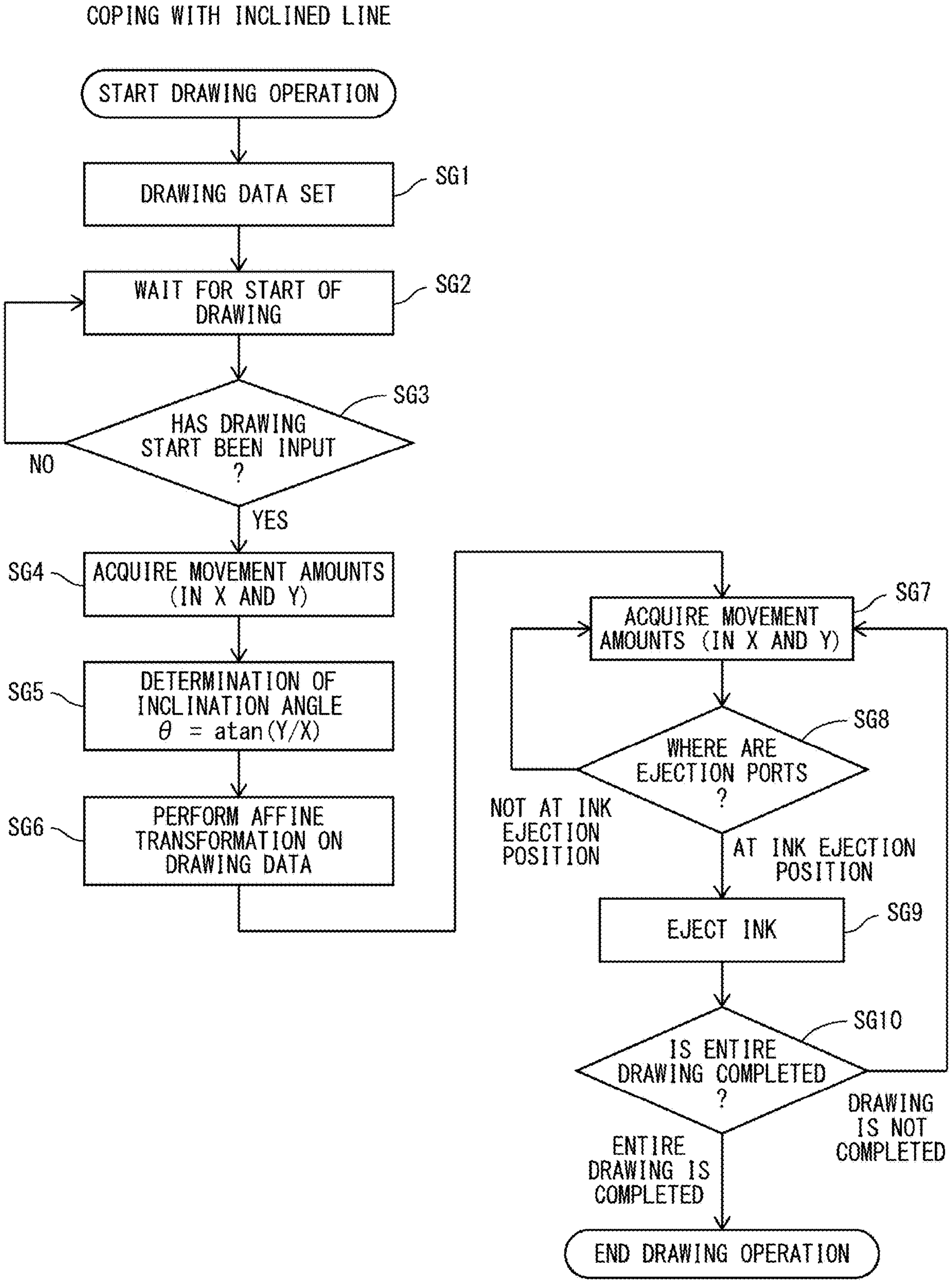
FIG. 19 is a flowchart illustrating an example of inclined line coping control.

On the other hand, in the ink jet printer 1 according to the present embodiment, the drawing machine 2 can be installed within the specified tilt and can cope with the inclined line, so that inclined line coping control can be executed. Details of the inclined line coping control will be described based on a flowchart illustrated in FIG. 19.

Steps SG1 to SG4 are the same as Steps SE1 to SE4 illustrated in FIG. 14. In Step SG5, the conveyance direction identifying unit 40*g* determines an inclination direction and an inclination angle θ of the conveyance surface 10*a* of the conveyor 10 based on a movement amount in the X direction and a movement amount in the Y direction of the workpiece W acquired in Step SG4. The inclination direction and the inclination angle θ of the conveyance surface 10*a* of the conveyor 10 match the conveyance direction of the workpiece W. The inclination direction and the inclination angle θ can be calculated by a tan(Y/X), and the calculated inclination direction and inclination angle θ are temporarily stored. As the inclination angle θ, a measurement value in previous drawing may be used. In addition, the calculated inclination angle θ may be corrected later.

In Step SG6, drawing data is configured such that drawing in a direction parallel to the inclination, that is, drawing as intended is performed on the workpiece W by performing an affine transformation on the drawing data based on the conveyance direction identified by the conveyance direction identifying unit 40*g*.

In Step SG7, similarly to Step SG4, the workpiece movement amount acquisition unit 40*d* acquires a movement amount of the workpiece W in the X direction and a movement amount of the workpiece W in the Y direction based on a measurement value output from the optical movement measurement sensor 30.

In Step SG8, a position of the ejection ports 24*a* of the print head 24 with respect to a current position of the workpiece W is determined based on a current offset position with respect to the reference position of the workpiece W calculated in Step SG7 and the drawing data. When the position of the ejection ports 24*a* is not a position where ink should be ejected, the process proceeds to Step SG7. On the other hand, when the position of the ejection ports 24*a* is the position where ink should be ejected, the process proceeds to Step SG9. In Step SG9, when the conveyance direction identified by the conveyance direction identifying unit 40*g* is tilted with respect to the horizontal plane, the drawing control unit 40*c* controls the ink ejection from the ejection ports 24*a* such that information such as a character string or an image is drawn in parallel with the conveyance direction. Step SG10 is the same as Step SB7 in FIG. 9. This example is suitable when installation reliability of the drawing machine 2 with respect to the conveyor 10 is low.

(Acquisition of Inclination Angle of Workpiece at Time of Installation)

Figure 20:
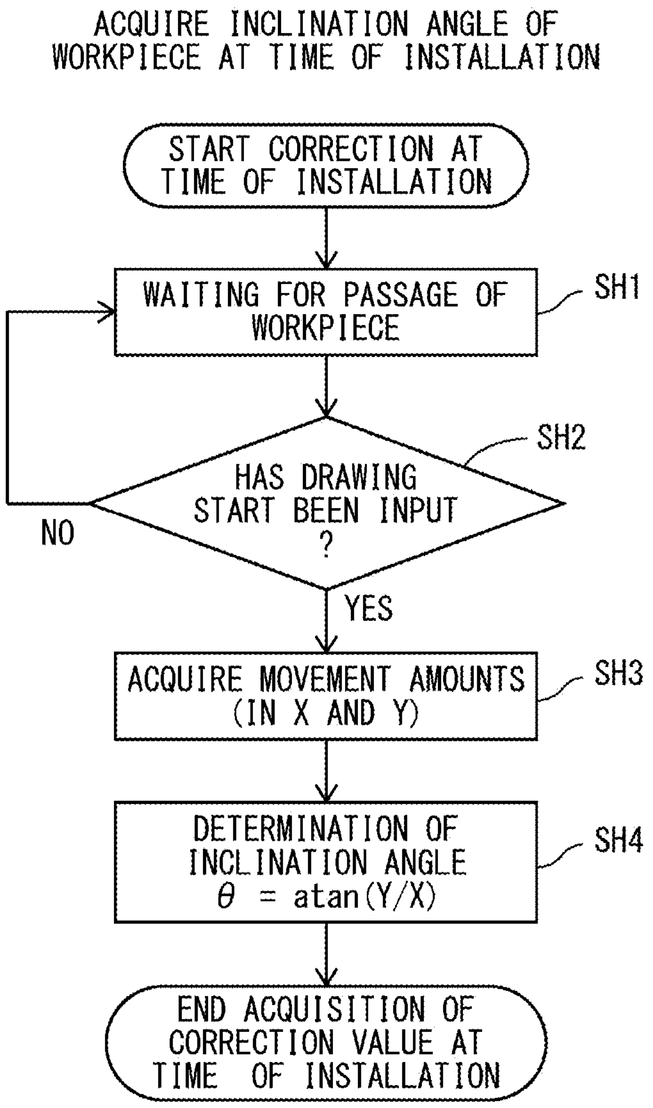
FIG. 20 is a flowchart illustrating an example of a procedure for acquiring an inclination angle of the workpiece with respect to the drawing machine at the time of installation of the drawing machine.

An inclination angle of the workpiece W during conveyance by the conveyor 10 can also be acquired at the time of installation of the drawing machine 2. This example is suitable when it is desired to avoid a measurement error of the sensor unit 3 or when the installation reliability of the drawing machine 2 with respect to the conveyor 10 is high. Hereinafter, a procedure for acquiring the inclination angle of the workpiece W with respect to the drawing machine 2 at the time of installation of the drawing machine 2 will be described with reference to FIG. 20.

In Step SH1, the control section 40 waits for the workpiece W to pass the front of the sensor unit 3. The passage of the workpiece W can be detected by the optical movement measurement sensor 30 of the sensor unit 3 or can be detected by the encoder 7. In Step SH2, it is determined whether a drawing start trigger has been input. The process returns to Step SH1 when the drawing start trigger is not input, and the process proceeds to Step SH3 when the drawing start trigger has been input.

In Step SH3, the workpiece movement amount acquisition unit 40*d* acquires a movement amount of the workpiece W in the X direction and a movement amount of the workpiece W in the Y direction based on a measurement value output from the optical movement measurement sensor 30. In Step SH4, the conveyance direction identifying unit 40*g* determines an inclination direction and an inclination angle θ of the conveyance surface 10*a* of the conveyor 10 based on the movement amount in the X direction and the movement amount in the Y direction of the workpiece W acquired in Step SH3. As a result, the inclination direction of the workpiece W during conveyance can be acquired as a correction value at the time of installation and stored in the storage unit 42 or the like. The inclination angle acquired in this flow is used when an affine transformation is performed on the drawing data.

(Case where Inclination Angle of Workpiece During Conveyance Exceeds Allowable Value)

Figure 21:
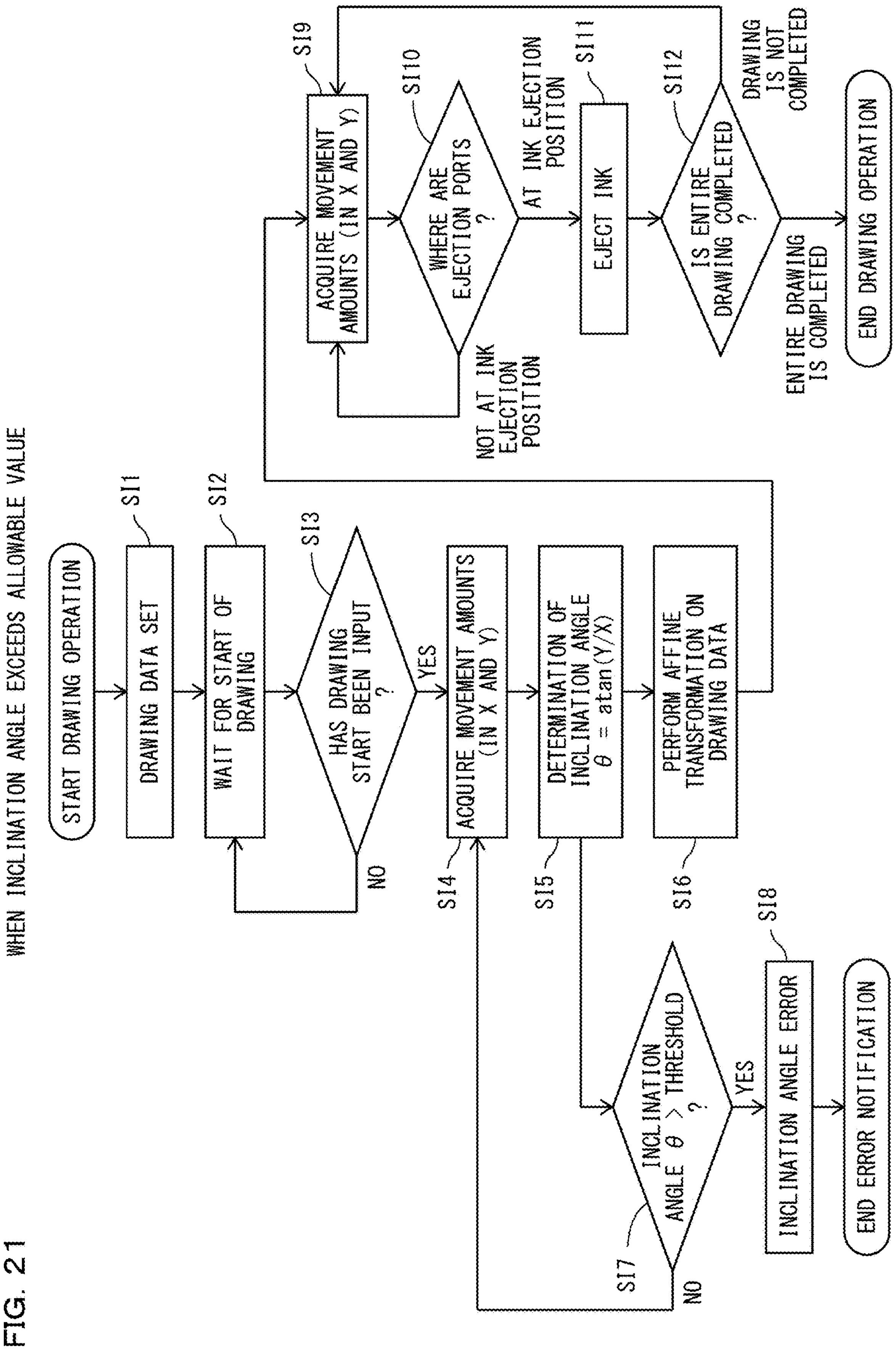
FIG. 21 is a flowchart illustrating an example of a procedure of processing in a case where the inclination angle of the workpiece during conveyance exceeds an allowable value.

FIG. 21 illustrates a procedure of processing in a case where an inclination angle θ of the workpiece W exceeding a preset allowable value of the inclination angle is detected. Steps SI1 to SI6 are the same as Steps SG1 to SG6 in FIG. 19, respectively.

In Step SI7, an inclination angle θ determined in Step SI5 is acquired, and it is determined whether the acquired inclination angle θ exceeds a threshold (allowable value). When it is determined in Step SI7 that the inclination angle θ exceeds the threshold, the process proceeds to Step SI8, and the user is notified of an inclination angle error. When the inclination angle error is notified, drawing may be continued or stopped. On the other hand, when it is determined in Step SI7 that the inclination angle θ does not exceed the threshold, the process proceeds to Step SI4. Steps SI9 to SI12 are the same as Steps SG7 to SG10 in FIG. 19, respectively.

(Installation Examples)

In the first example illustrated in FIG. 17, the print head 24 is arranged between the first optical movement measurement sensor 30A and the second optical movement measurement sensor 30B as described above. That is, the second optical movement measurement sensor 30B is additionally provided on the downstream side of the print head 24 in the conveyance direction of the workpiece W, so that it is possible to eliminate the dead space at the final end of the workpiece W in the conveyance direction. However, there is a possibility that a detection failure of the second optical movement measurement sensor 30B is likely to occur due to the influence of ink mist or droplets of splashed ink on the downstream side in the conveyance direction of the workpiece W, and thus, the influence of the ink mist or the droplets of splashed ink can be reduced by setting a detection surface of the second optical movement measurement sensor 30B to positive pressure using, for example, a positive pressure generator such as an air purge.

In the second example illustrated in FIG. 18, the first optical movement measurement sensor 30A, the distance sensor 31, the second optical movement measurement sensor 30B, and the print head 24 are arrayed in this order from the upstream side in the conveyance direction of the workpiece W. With such an array, it is possible to start measuring a movement amount of the workpiece W in a state where the first optical movement measurement sensor 30A outputs a valid measurement value, and it is possible to minimize the dead space (a portion that cannot be measured by the optical movement measurement sensor) at the final end of the workpiece W in the conveyance direction.

Figure 22:
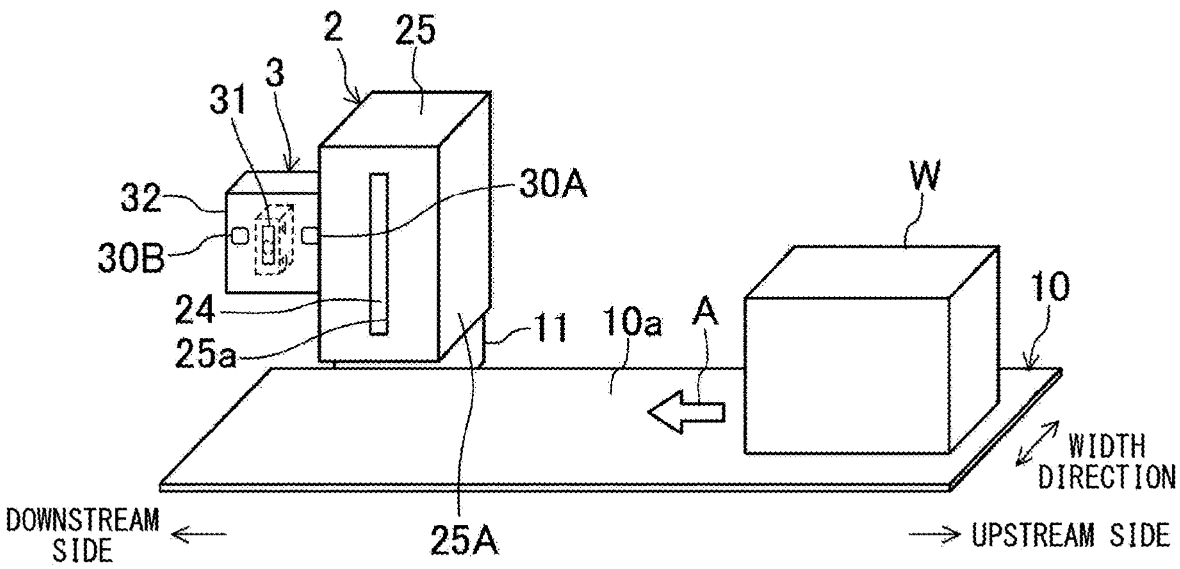
FIG. 22 is a view illustrating a third example in the case where the two optical movement measurement sensors are provided.

FIG. 22 is a view illustrating a third example in a case where the first optical movement measurement sensor 30A and the second optical movement measurement sensor 30B are provided. In the third example, the first optical movement measurement sensor 30A and the second optical movement measurement sensor 30B are accommodated in one sensor housing 32. The first optical movement measurement sensor 30A is arranged upstream of the second optical movement measurement sensor 30B in the conveyance direction. The sensor housing 32 is attached to the downstream side of the main housing 25 in the conveyance direction of the workpiece W. Therefore, the first optical movement measurement sensor 30A and the second optical movement measurement sensor 30B are arranged downstream of the print head 24 in the conveyance direction of the workpiece W.

When the first optical movement measurement sensor 30A, the second optical movement measurement sensor 30B, and the distance sensor 31 are arranged on the downstream side of the print head 24 as in the third example, drawing can be performed without generating the dead space to the final end of the workpiece W in the conveyance direction. However, in order to suppress the detection failure due to the ink droplets or the like, it is preferable to set detection surfaces of the first optical movement measurement sensor 30A, the second optical movement measurement sensor 30B, and the distance sensor 31 to a positive pressure using the positive pressure generator.

In the case illustrated in FIG. 22, the sensor housing 32 is detachably attached to the main housing 25 at a position offset to the downstream side (one side) along the conveyance direction of the workpiece W. On the other hand, in the cases illustrated in FIGS. 3 and 18, the sensor housing 32 is detachably attached to the main housing 25 at a position offset to the upstream side (the other side) along the conveyance direction of the workpiece W. In this manner, the sensor housing 32 according to the present embodiment is detachably attached to the main housing 25 at a first position offset to the one side along the conveyance direction of the workpiece W and a second position offset to the other side. It is sufficient that the user freely selects either the first position or the second position to which the sensor housing 32 is to be attached in accordance with the workpiece W, drawing content, a structure of the conveyor 10, a line configuration, and the like. It is possible to adjust a height of the sensor housing 32 at the first position and the second position.

Figure 23:
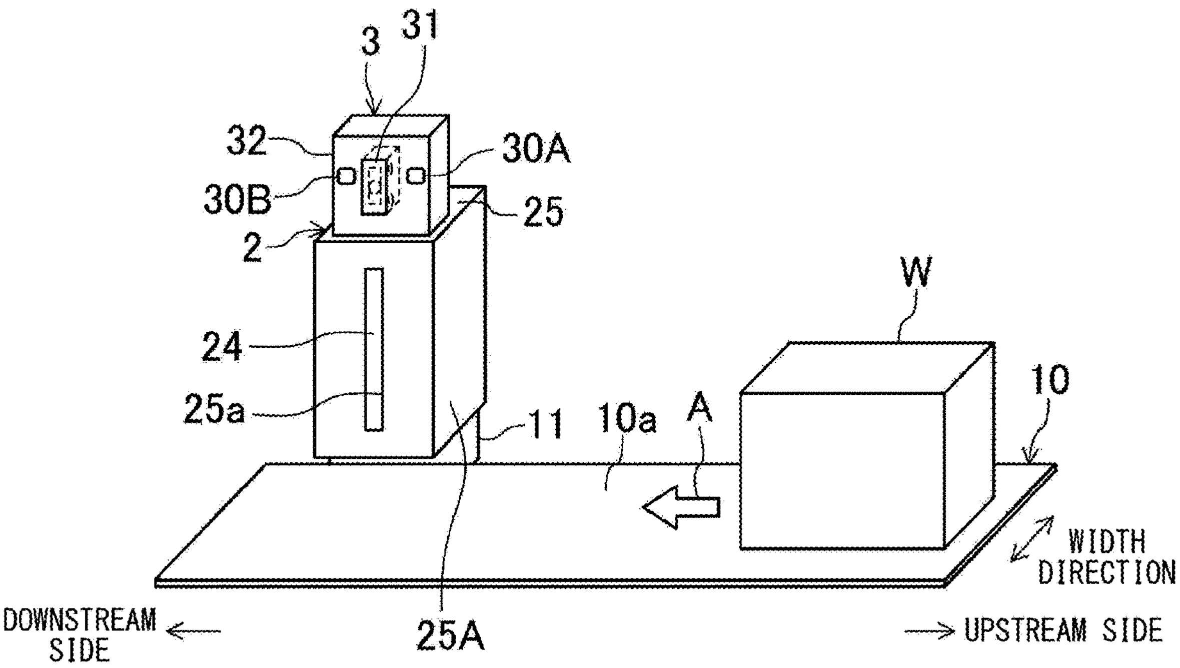
FIG. 23 is a view illustrating a fourth example in the case where the two optical movement measurement sensors are provided.

FIG. 23 is a view illustrating a fourth example in the case where the first optical movement measurement sensor 30A and the second optical movement measurement sensor 30B are provided. In this fourth example, the first optical movement measurement sensor 30A, the second optical movement measurement sensor 30B, and the distance sensor 31 are attached on the upper side of the print head 24. As a result, dead spaces at both downstream and upstream ends of the workpiece W in the conveyance direction can be minimized.

In addition, although not illustrated, the first optical movement measurement sensor 30A, the second optical movement measurement sensor 30B, and the distance sensor 31 may be attached on the lower side of the print head 24. Also in this case, the dead spaces at both the downstream and upstream ends of the workpiece W in the conveyance direction can be minimized. In addition, the optical movement measurement sensor and the distance sensor may be attached on all of the upstream, downstream, upper, and lower sides of the print head 24, or may be attached on any two or three of the upstream, downstream, upper, and lower sides of the print head 24. In addition, both or one of the optical movement measurement sensor and the distance sensor may be embedded in the print head 24. In addition, one of the measurement sensor and the distance sensor may be embedded in the print head 24, and the other may be provided outside the print head 24.

In addition, although FIG. 3 and the like illustrate an example in which drawing is performed on a side surface of the workpiece W, the invention is not limited thereto and can also be applied to a case where drawing is performed on a top surface of the workpiece W and a case where drawing is performed on a lower surface of the workpiece W. In the case of the drawing on the top surface or the lower surface of the workpiece W, it is sufficient to install the drawing machine 2 such that the ejection ports 24*a* of the print head 24 oppose the face on which drawing is to be performed.

Figure 24:
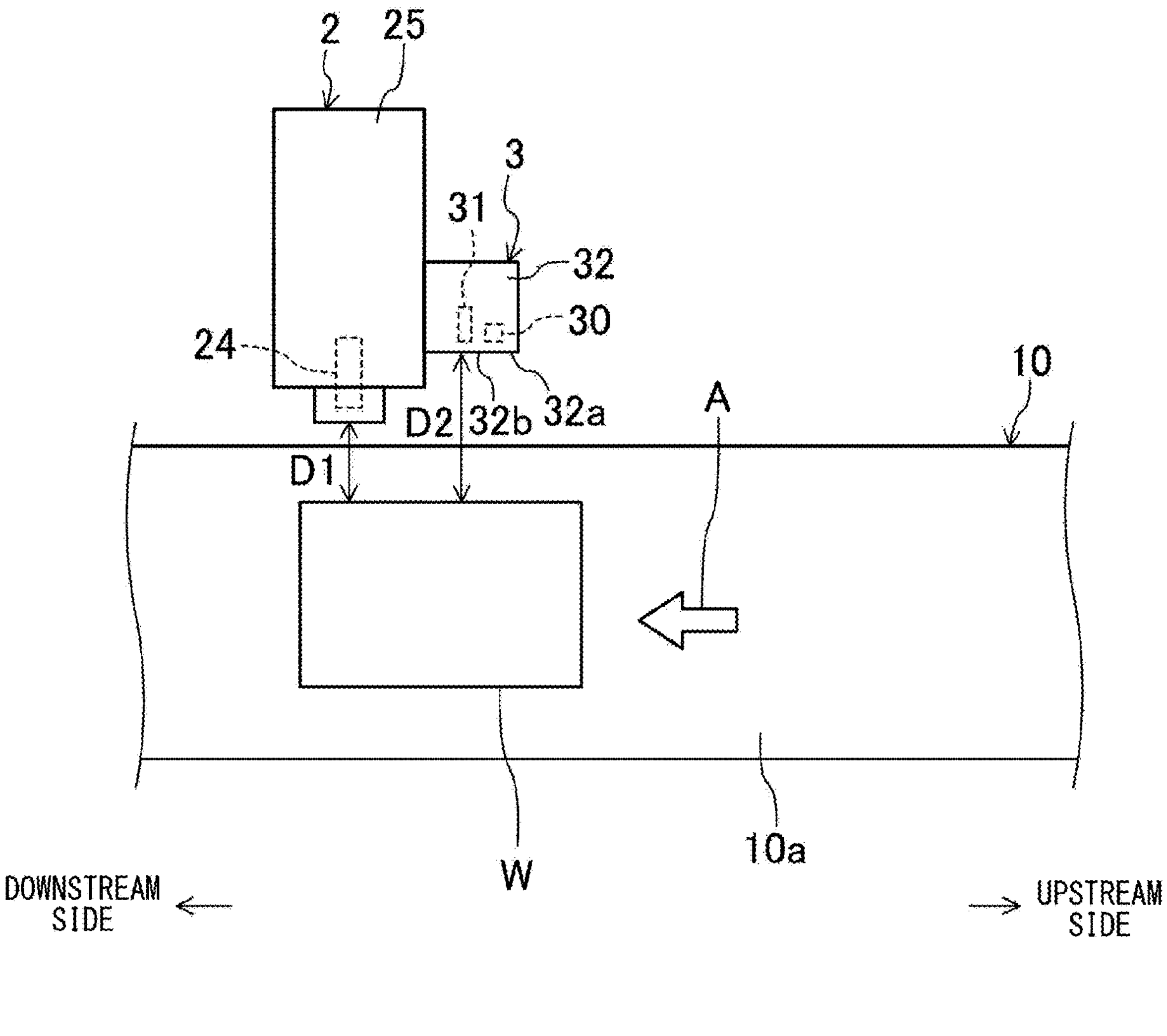
FIG. 24 is a plan view illustrating the ink jet printer during operation.

FIG. 24 is a plan view illustrating the ink jet printer 1 during operation. As illustrated in this drawing, the sensor housing 32 is positioned and fixed with respect to the print head 24 such that the front surface 32*a* and the window 32*b* of the sensor housing 32 are at positions retracted from the print head 24 (positions away from the workpiece W) in a distance direction from the print head 24 (an up-down direction in FIG. 24). That is, the optical movement measurement sensor 30 is positioned and fixed with respect to the print head 24 such that the window 32*b* is at the position retracted from the print head 24, and the optical movement measurement sensor 30 is positioned and fixed with respect to the print head 24 by the sensor housing 32. Note that the window 32*b* may be positioned on the same plane as a distal end of the main housing 25.

Here, the case of the drawing on the side surface of the workpiece W is assumed. In the case of the drawing on the side surface of the workpiece W, a distance D2 between the side surface of the workpiece W and the front surface 32*a* (window 32*b*) of the sensor housing 32 is set to be longer than a distance D1 between the side surface of the workpiece W and a distal end of the print head 24 by retracting the front surface 32*a* and the window 32*b* of the sensor housing 32 from the print head 24. As a result, since the front surface 32*a* of the sensor housing 32 can be separated from a face the workpiece W on which particulate ink lands, droplets of ink splashed from the workpiece W and droplets due to the satellites are less likely to adhere to the front surface 32*a* of the sensor housing 32. In addition, the workpiece W is less likely to collide with the sensor housing 32, and the distance between the print head 24 and the workpiece W is not affected by an installation position of the sensor housing 32, so that a throw distance (drawing distance range) of the drawing machine 2 can be secured to the maximum.

Note that the sensor housing 32 may be positioned and fixed with respect to the print head 24 such that the front surface 32*a* and the window 32*b* of the sensor housing 32 are at positions advanced from the print head 24 (positions closer to the workpiece W). In addition, the front surface 32*a* and the window 32*b* of the sensor housing 32 and the print head 24 may be at the same position in the distance direction from the print head 24.

Figure 25:
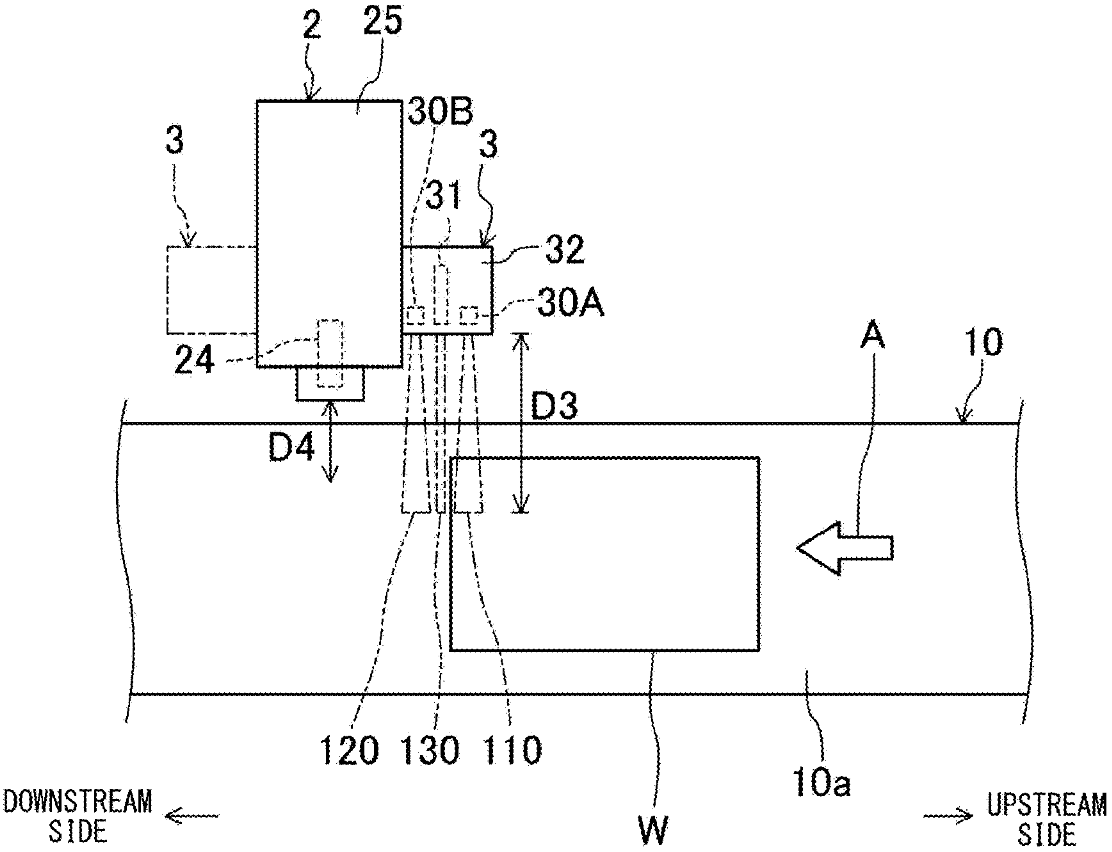
FIG. 25 is a view corresponding to FIG. 24 in the case where the two optical movement measurement sensors are provided.

FIG. 25 is a plan view illustrating the ink jet printer 1 provided with the first optical movement measurement sensor 30A and the second optical movement measurement sensor 30B during operation. The first optical movement measurement sensor 30A and the second optical movement measurement sensor 30B are identical. A measurement range of the first optical movement measurement sensor 30A is indicated as a first measurement range 110, and a measurement range of the second optical movement measurement sensor 30B is indicated as a second measurement range 120. In addition, measurement light projected from the distance sensor 31 is denoted by reference sign 130.

A depth of field of the light receiving unit 30*b* included in each of the first optical movement measurement sensor 30A and the second optical movement measurement sensor 30B is indicated by reference sign D3. A lower limit (side close to the sensor) of a movement amount measurable range of the first optical movement measurement sensor 30A is determined by a measurable distance with respect to a white workpiece having a high reflectance, and an upper limit (side far from the sensor) is determined by a measurable distance with respect to a black workpiece having a low reflectance. At a distance equal to or shorter than the lower limit of the movement amount measurable range of the first optical movement measurement sensor 30A, an amount of light on the light receiving unit 30*b* is saturated with respect to the white workpiece, speckle contrast cannot be sufficiently obtained, and the movement amount cannot be measured. In addition, at a distance equal to or longer than the upper limit or of the movement amount measurable range of the first optical movement measurement sensor 30A, the amount of light on the light receiving unit 30*b* is insufficient due to the amount of received light is small, the speckle contrast is buried in a noise component, and the movement amount cannot be measured. Here, as the white workpiece and the black workpiece, a code number D250 (color name: white) is used for the white workpiece and a code number D260 (color name: black) is used for the black workpiece based on JCS M001:2000.

In FIG. 25, a drawing distance range of the print head 24 is indicated by reference sign D4. The depth of field D3 of the light receiving unit 30*b* is wider than the drawing distance range D4 of the print head 24, and the depth of field D3 of the light receiving unit 30*b* includes the drawing distance range D4 of the print head 24.

That is, since the light receiving unit 30*b* is fixed to the sensor housing 32, a position of the light receiving unit 30*b* is determined by attaching the sensor housing 32 to the main housing 25. In this example, the optical movement measurement sensor 30 is fixed to the print head 24 by the sensor housing 32 such that the depth of field of the light receiving unit 30*b* in the distance direction from the print head 24 includes the drawing distance range of the print head 24, and the sensor housing 32 serves as a fixing portion configured to position and fix the optical movement measurement sensor 30 with respect to the print head 24. Note that the fixing portion may be a bracket or the like configured separately from the sensor housing 32, or may include a fastening member such as a bolt or a screw.

In addition, the distance sensor 31 is positioned and fixed with respect to the print head 24 such that a measurement range (indicated by the same reference sign D3 as that of the light receiving unit 30*b* for convenience) of the distance sensor 31 includes the drawing distance range of the print head 24 in the distance direction from the ejection ports 24*a* of the print head 24. When the distance between the print head 24 and the workpiece W is set to the drawing distance range, favorable drawing can be performed without disturbance of drawing. That is, a distance between the print head 24 and the workpiece W for preventing the disturbance of drawing from exceeding an allowable value in the drawing quality is the drawing distance range. Note that the measurement range of the distance sensor 31 and the depth of field of the light receiving unit 30*b* may be different.

As illustrated in this drawing, the first optical movement measurement sensor 30A and the second optical movement measurement sensor 30B are arranged to be spaced apart from each other in the conveyance direction of the workpiece W, and the distance sensor 31 is arranged between the first optical movement measurement sensor 30A and the second optical movement measurement sensor 30B, whereby a failure in measurement of ends of the workpiece W in the conveyance direction can be prevented. That is, in a case where the first optical movement measurement sensor 30A measures the workpiece W and the second optical movement measurement sensor 30B does not measure the workpiece Was illustrated in FIG. 25, it can be discerned that the upstream end of the workpiece W in the conveyance direction is measured by the distance sensor 31. On the other hand, in a case where the first optical movement measurement sensor 30A does not measure the workpiece W and the second optical movement measurement sensor 30B measures the workpiece W, it can be discerned that the downstream end of the workpiece W in the conveyance direction is measured by the distance sensor 31.

In FIG. 25, as indicated by virtual lines, the sensor housing 32 accommodating the first optical movement measurement sensor 30A and the second optical movement measurement sensor 30B can be attached to the downstream side of the main housing 25. The sensor housing 32 is configured to be detachably attached to the print head 24 on both the upstream side and the downstream side in the conveyance direction of the workpiece W. The sensor housing 32 is positioned and fixed to the print head 24 on both the upstream side and the downstream side in the conveyance direction of the workpiece W. Note that the sensor housing 32 may be positioned and fixed to the print head 24 only on the upstream side or only on the downstream side in the conveyance direction of the workpiece W without being limited thereto.

Figure 26:
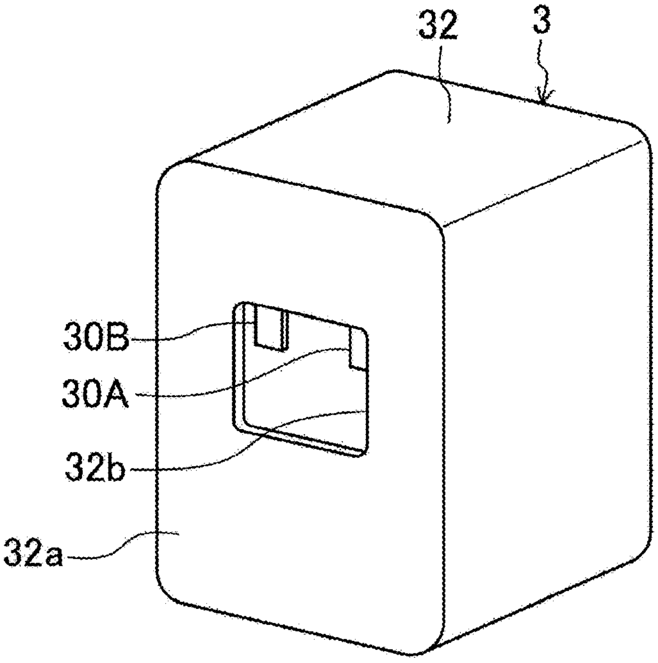
FIG. 26 is a perspective view of the sensor unit including the two optical movement measurement sensors.
Figure 27:
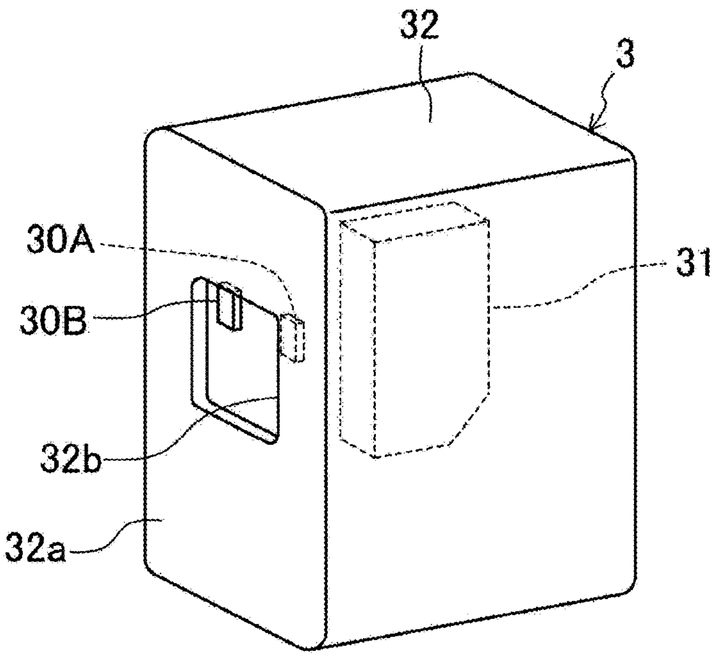
FIG. 27 is a view illustrating an internal structure of the sensor unit including the two optical movement measurement sensors.
Figure 28:
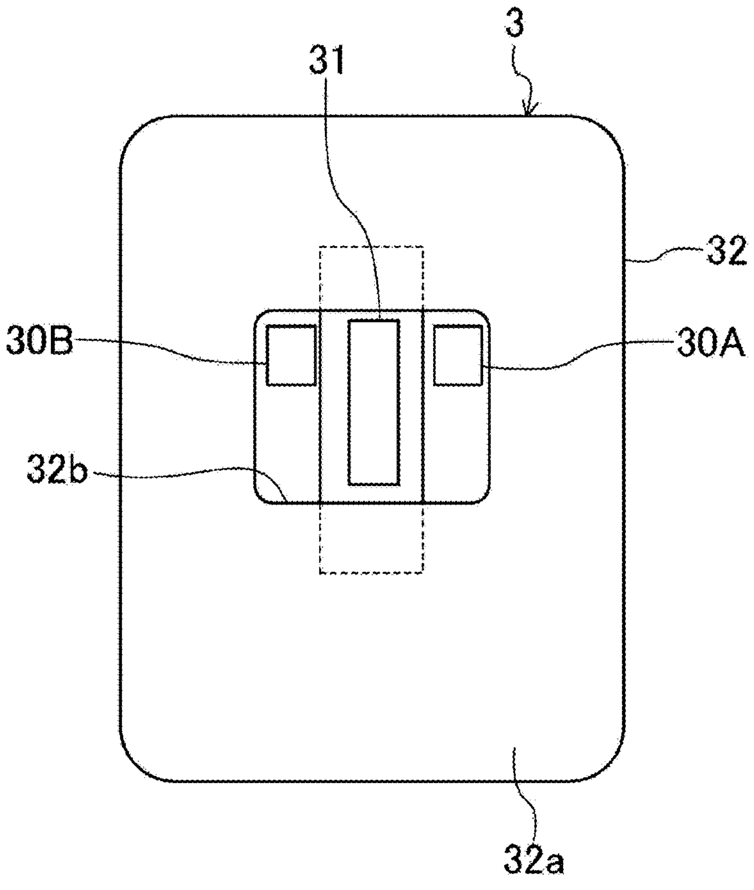
FIG. 28 is a front view of the sensor unit including the two optical movement measurement sensors.
Figure 29:
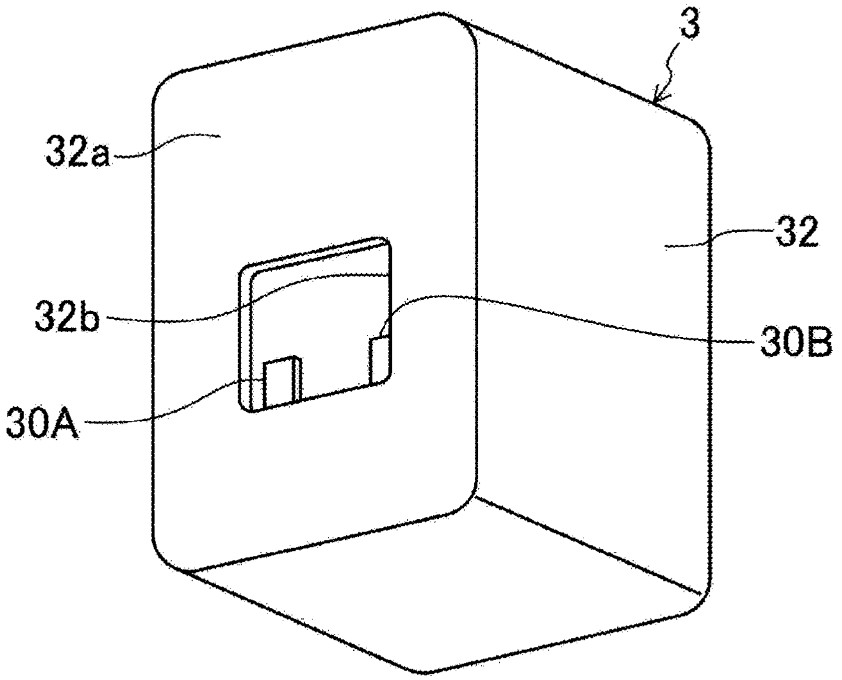
FIG. 29 is a view illustrating an internal structure in a case where the sensor unit including the two optical movement measurement sensors is upside down.
Figure 30:
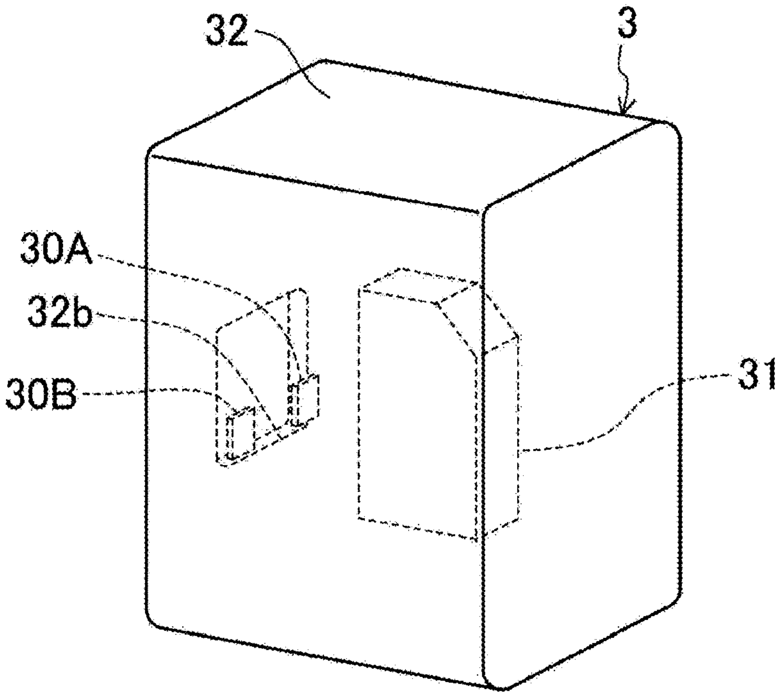
FIG. 30 is a perspective view in the case where the sensor unit including the two optical movement measurement sensors is upside down.

FIGS. 26 to 28 illustrate specific examples of the sensor unit 3 including the first optical movement measurement sensor 30A and the second optical movement measurement sensor 30B. The sensor unit 3 is attached to the upstream side of the main housing 25 in a posture illustrated in FIGS. 26 to 28, that is, a posture in which the top in FIGS. 26 to 28 is the top at the time of attachment. As illustrated in FIGS. 29 and 30, the sensor housing 32 of the sensor unit 3 is detachably attached to the print head 24 in an upside-down posture.

Figure 31:
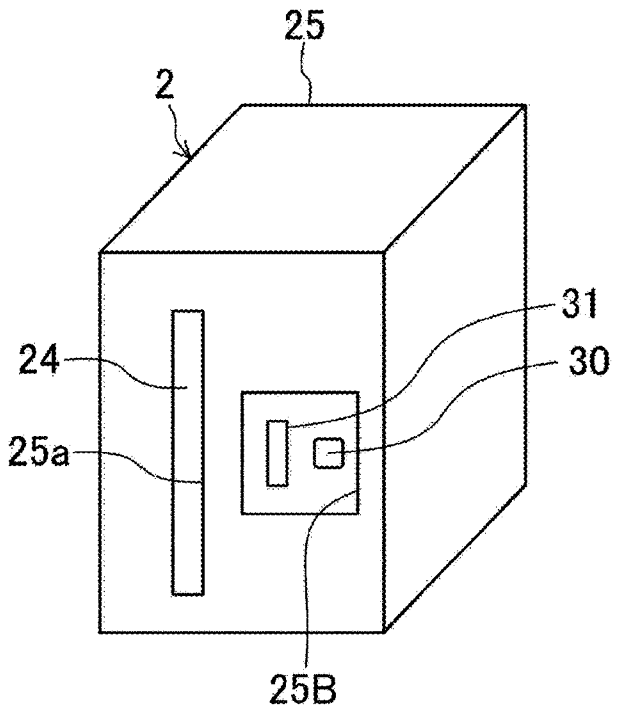
FIG. 31 is a view illustrating an example in which the sensors are accommodated in a main housing.

In addition, as illustrated in FIG. 31, the optical movement measurement sensor 30 and the distance sensor 31 may be accommodated in the main housing 25 without providing the sensor housing 32 accommodating the optical movement measurement sensor 30 and the distance sensor 31 outside the main housing 25. For example, it is possible to provide a region for accommodating the optical movement measurement sensor 30 and the distance sensor 31 inside the main housing 25 and accommodate the optical movement measurement sensor 30 and the distance sensor 31 or the sensor housing 32 in this region. Further, measurement by the optical movement measurement sensor 30 and the distance sensor 31 is possible when a light-transmissive portion 25B that transmits measurement light of the optical movement measurement sensor 30 and measurement light of the distance sensor 31 is provided in a portion of the main housing 25 opposing the workpiece W that is being conveyed.

Figure 32:
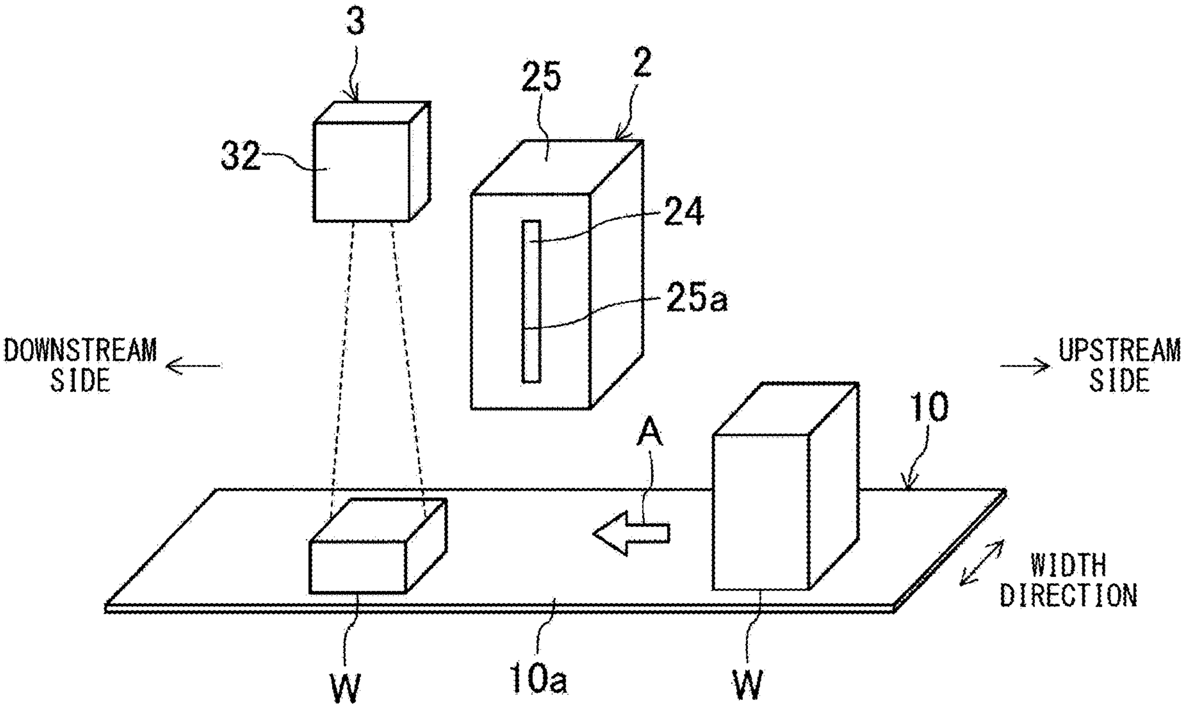
FIG. 32 is a view illustrating an example in which a sensor housing is installed at a location different from the main housing.

As illustrated in FIG. 32, the sensor housing 32 may be installed at a location different from the main housing 25. In the example illustrated in FIG. 32, the sensor housing 32 is installed above the workpiece W, and the workpiece W can be measured from above. When the sensor housing 32 is installed above the workpieces W in a line where a workpiece W having a high height and a workpiece W having a low height exist together, both the workpiece W having the high height and the workpiece W having the low height can be accurately measured using the optical movement measurement sensor 30 having a large depth of field. Note that, in the case of such an attachment pattern, the distance between the workpiece W and the print head 24 cannot be measured by the distance sensor 31, and thus, the distance sensor 31 is separately attached to the print head 24 side.

Figure 33:
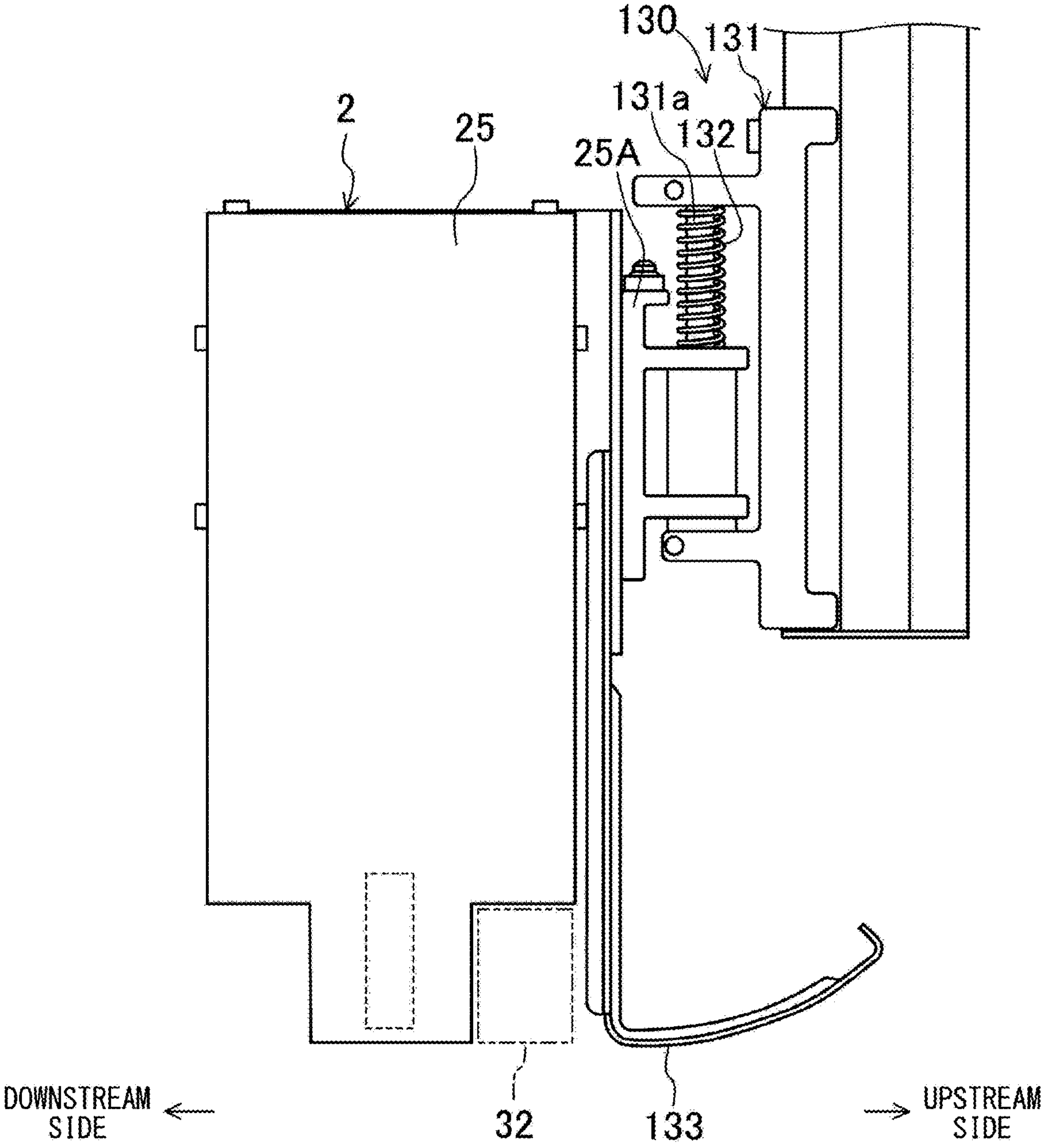
FIG. 33 is a plan view illustrating an example including a pressing mechanism of a print head.

FIG. 33 is a plan view illustrating an example in which a pressing mechanism 130 of the print head 24 is provided. Although the sensor housing 32 is illustrated by a virtual line, a position of the sensor housing 32 is not limited to the illustrated position, and may be, for example, on the upstream side or the upper side of the main housing 25.

The attachment portion 25A is provided on the upstream side of the main housing 25. The pressing mechanism 130 includes a positioning member 131 positioned and fixed to the conveyor 10 and a coil spring 132 as an elastic body. The positioning member 131 is provided with a rod 131*a* extending in the horizontal direction perpendicular to the conveyance direction. The attachment portion 25A of the main housing 25 is supported by the rod 131*a* to be slidable in the horizontal direction perpendicular to the conveyance direction.

The rod 131*a* is inserted into the coil spring 132, and a contraction direction of the coil spring 132 coincides with an axial direction of the rod 131*a*. The attachment portion 25A of the main housing 25 is arranged on the side closer to the workpiece W than the coil spring 132, whereby the coil spring 132 always presses the attachment portion 25A of the main housing 25 in a direction in which ink is ejected.

A workpiece guide 133 is provided on the upstream side of the main housing 25. If the workpiece W is conveyed closer to the upper side in FIG. 33, the workpiece W abuts on the workpiece guide 133, and an upward force in FIG. 33 acts on the workpiece guide 133. When the coil spring 132 is contracted by this force, the print head 24 moves upward in FIG. 33, but the distance between the print head 24 and the workpiece W is kept to a predetermined distance. Therefore, even if the workpiece W is conveyed closer to the upper side of FIG. 33, drawing without disturbance can be executed.

(Form Including Plural Nozzles)

Although the above-described ink jet printer 1 includes one print head 24, the number of print heads 24 is not limited to one, and the ink jet printer 1 including a plurality of the print heads 24 is also included in the embodiment of the invention.

That is, although not illustrated, the ink jet printer 1 includes, for example, a first print head (first nozzle) and a second print head (second nozzle). The first print head has a plurality of ejection ports arrayed in a predetermined direction. In addition, the second print head also has a plurality of ejection ports arrayed in a predetermined direction. The number of the ejection ports of the first print head and the number of the ejection ports of the second print head may be the same or different.

The first print head is provided in a first housing. The second print head is provided in a second housing that can be arranged apart from the first housing. That is, the first housing and the second housing are separated, and thus, can be arranged at mutually different spots, and so that it is possible to perform drawing on different portions of the workpiece W.

The drawing data stored in the storage unit 42 includes drawing data for the first nozzle and drawing data for the second nozzle. The drawing data for the first nozzle and the drawing data for the second nozzle may be different or the same. The drawing control unit 40*c* controls ink ejection from the plurality of ejection ports formed in the first nozzle based on a current offset position and the drawing data for the first nozzle, and controls ink ejection from the plurality of ejection ports formed in the second nozzle based on the current offset position and the drawing data for the second nozzle. As a result, drawing can be performed on a plurality of spots of the workpiece W using one ink jet printer 1.

(Control in Case where Optical Movement Measurement Sensor is Used as Timing Sensor)

The optical movement measurement sensor 30 can be used as a timing sensor to detect that the workpiece W conveyed by the conveyor 10 has arrived at a predetermined position. Hereinafter, control in a case where the optical movement measurement sensor 30 is used as the timing sensor will be described in detail based on a flowchart illustrated in FIG. 34.

Figure 34:
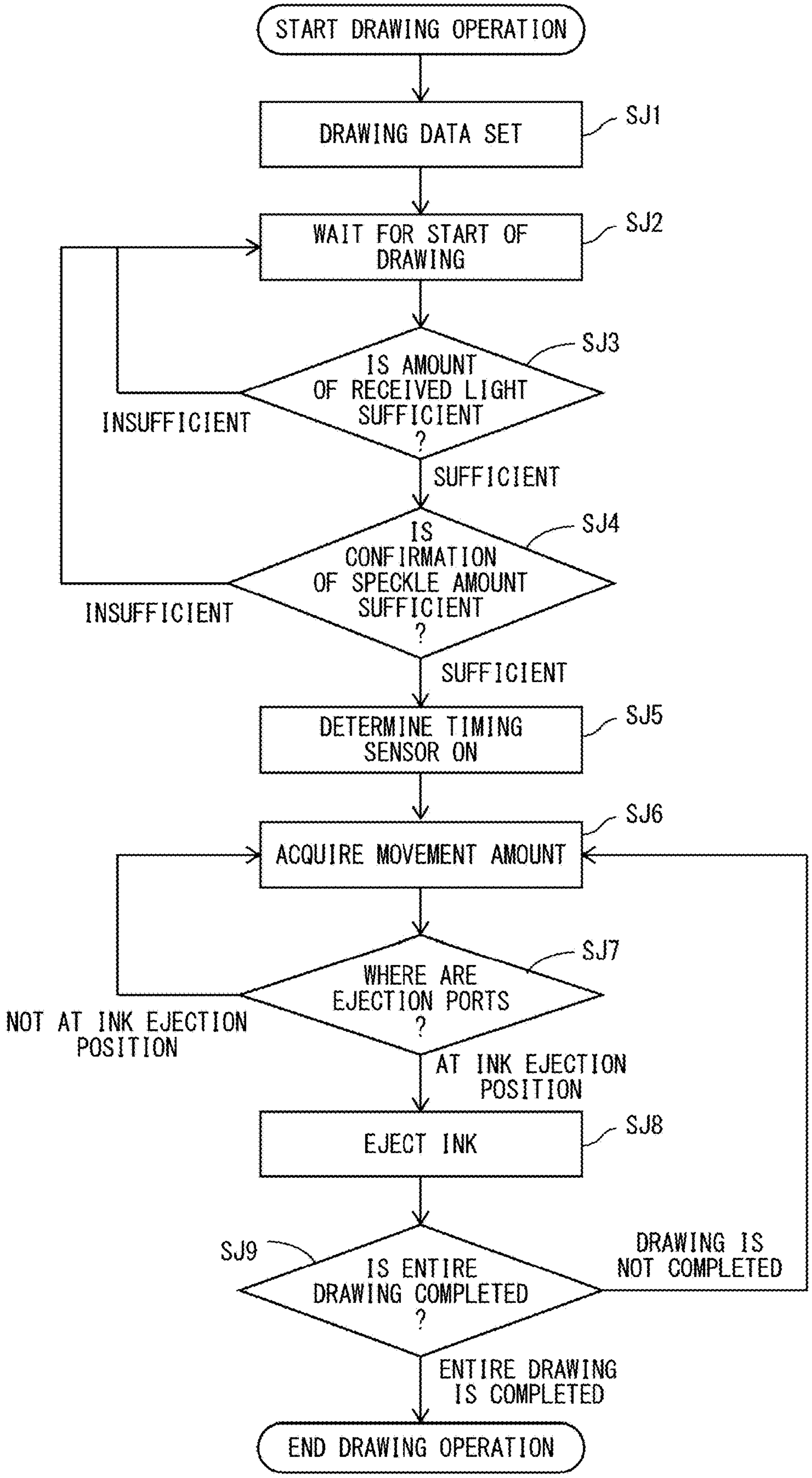
FIG. 34 is a flowchart illustrating an example of control in a case where the optical movement measurement sensor is used as a timing sensor.

Steps SJ1 and SJ2 illustrated in FIG. 34 are the same as Steps SB1 and SB2 illustrated in FIG. 9. In Step SJ3, the drawing start timing acquisition unit 40*f* determines whether the amount of received light of the optical movement measurement sensor 30 is sufficient. A situation in which “the amount of received light is sufficient” is a situation in which the optical movement measurement sensor 30 can generate a highly accurate measurement value (normal measurement value) to the extent that it can be used as the timing sensor. When it is determined in Step SJ3 that the amount of received light of the optical movement measurement sensor 30 is sufficient, the process proceeds to Step SJ4. On the other hand, in a situation in which the amount of received light of the optical movement measurement sensor 30 is insufficient and the use as the timing sensor is impossible, the process proceeds to Step SJ2.

In Step SJ4, the drawing start timing acquisition unit 40*f* determines whether an amount of the speckle pattern generated by the optical movement measurement sensor 30 is sufficient. A situation in which “the amount of the speckle pattern is sufficient” is a situation in which the optical movement measurement sensor 30 can generate a highly accurate measurement value to the extent that it can be as the timing sensor. In Step SJ4, when it is determined that the amount of the speckle pattern generated by the optical movement measurement sensor 30 is sufficient, the process proceeds to Step SJ5. On the other hand, in a situation where the amount of the speckle pattern generated by the optical movement measurement sensor 30 is insufficient and the use as the timing sensor is impossible, the process proceeds to Step SJ2.

In Step SJ5, since the amount of received light of the optical movement measurement sensor 30 is sufficient and the amount of the speckle pattern is also sufficient, the drawing start timing acquisition unit 40*f* determines a measurement value output from the optical movement measurement sensor 30 as a signal of timing sensor ON. Thereafter, the process proceeds to Step SJ6. Steps SJ6 to SJ9 are the same as Steps SB4 to SB7 illustrated in FIG. 9.

That is, a timing at which the optical movement measurement sensor 30 detects the workpiece W and starts to generate a normal measurement value is set as a pseudo timing sensor ON timing, and the drawing operation is started. Note that detection noise is generated when both edges of the workpiece W in the conveyance direction are detected by the optical movement measurement sensor 30, and it is sufficient to apply noise removal processing if the noise is likely to be a problem.

(Abnormality Process)

As described above, the drawing machine 2 executes drawing on the workpiece W being conveyed in front of the drawing machine 2 in accordance with the conveyance speed of the workpiece W. In a case where the conveyance speed of the workpiece W is a constant speed, constant-speed drawing can be performed. In a case where the conveyance speed is not constant, drawing (encoder drawing) can be performed by acquiring a conveyance speed using the encoder 7 and calculating a workpiece speed from such an encoder signal. In any of these systems, the drawing start timing can be determined by the timing sensor 8, the optical movement measurement sensor 30, or the like.

However, there is no way to know whether the conveyance speed of the workpiece W is actually constant when the constant-speed drawing is executed, and thus, even if disturbance has occurred in drawing as a result of executing the constant-speed drawing, a cause of the disturbance has not been found. In addition, in the case of the encoder drawing, even if disturbance occurs in drawing due to a slip of the encoder 7, the catch of the workpiece W, or the like, it is difficult to detect the disturbance of the drawing. In addition, when a detection surface of the timing sensor 8 is contaminated with dust or particulate ink, it is difficult to determine the reliability of the timing sensor 8, and periodic maintenance of the timing sensor 8 is required. In addition, when bumping of the workpiece W has occurred, there is no problem in a case where the bumping correction is performed, but there is no way to evaluate whether the bumping of the workpiece W affects the drawing quality in a case where the bumping correction is not performed. In addition, when an angle deviation occurs between the drawing machine 2 and the conveyor 10, there is no problem if tilt correction is performed, but there is no way to know the angle deviation if the tilt correction is not performed. Further, in a case where the workpiece W is corrugated cardboard, when a flapper of the corrugated cardboard is peeled off or the like, there is a possibility that the timing sensor 8 that has detected the flapper erroneously operates by considering it as the arrival of the workpiece W, resulting in an error of the drawing start position. Although there are various causes of the drawing failure in this manner, it is difficult to prevent the drawing failure in advance in the conventional constant-speed drawing and encoder drawing, and thus, it is necessary to confirm the drawing quality with a camera or a person, which takes time and effort.

In the ink jet printer 1 according to the present embodiment, reliability of measurement by the optical movement measurement sensor 30 is evaluated, and an abnormality process is executed when the reliability of the measurement by the optical movement measurement sensor 30 is low based on a result of the evaluation, so that the occurrence of the drawing failure due to various causes as described above can be suppressed.

Details will be described hereinafter. The control section 40 of the controller 4 includes the evaluation unit 40*h* and the abnormality processing unit 40*i* configured by hardware and software. The evaluation unit 40*h* and the abnormality processing unit 40*i* are separated for convenience, but may be integrated in terms of hardware.

The evaluation unit 40*h* is a portion that evaluates the reliability of the measurement by the optical movement measurement sensor 30. Specifically, the evaluation unit 40*h* can evaluate the reliability based on the amount of received light received by the optical movement measurement sensor 30. Since a highly accurate measurement value can be generated if the amount of received light received by the optical movement measurement sensor 30 is sufficient, in this case, the evaluation unit 40*h* evaluates that the reliability of the measurement by the optical movement measurement sensor 30 is high. On the other hand, if the amount of received light received by the optical movement measurement sensor 30 is insufficient, accuracy of a measurement value decreases, or no measurement value can be generated. In this case, the evaluation unit 40*h* evaluates that the reliability of the measurement by the optical movement measurement sensor 30 is low. When the amount of received light received by the optical movement measurement sensor 30 is out of a predetermined range (for example, less than a predetermined value), the abnormality processing unit 40*i* determines that the reliability does not satisfy a predetermined criterion and executes the abnormality process. Examples of a cause of an insufficient amount of light received by the optical movement measurement sensor 30 can include a case where the detection surface of the optical movement measurement sensor 30 is contaminated with dust or particulate ink.

In addition, the evaluation unit 40*h* can evaluate the reliability based on whether the measurement by the optical movement measurement sensor 30 is possible. When the measurement by the optical movement measurement sensor 30 is possible, the evaluation unit 40*h* evaluates that the reliability of the measurement by the optical movement measurement sensor 30 is high. On the other hand, when the measurement by the optical movement measurement sensor 30 is impossible, the evaluation unit 40*h* evaluates that the reliability of the measurement by the optical movement measurement sensor 30 is low. When the measurement by the optical movement measurement sensor 30 is impossible, the abnormality processing unit 40*i* determines that the reliability does not satisfy a predetermined criterion and executes the abnormality process. In this manner, the abnormality processing unit 40*i* is a portion that executes the abnormality process when the reliability evaluated by the evaluation unit 40*h* does not satisfy the predetermined criterion.

Evaluation elements of the evaluation unit 40*h* are not limited to the amount of received light of the optical movement measurement sensor 30 and the possibility of the measurement of the amount of received light by the optical movement measurement sensor 30, and examples thereof can include a distance to the workpiece W in the ejection direction of the print head 24, a movement of the workpiece W in the conveyance direction, the movement amount of the workpiece W in the direction perpendicular to the conveyance direction, a movement amount in a direction inclined with respect to the conveyance direction of the workpiece W, an amount of received light of the distance sensor 31, a recognition rate of the speckle pattern of the optical movement measurement sensor 30, contrast of a drawing target generated according to an amount of light received from the workpiece W as the drawing target, quality of the speckle pattern generated according to the characteristic of the surface shape of the workpiece W, a distance by which the workpiece W is conveyed between ON and OFF of a drawing start timing signal, and a difference from an input of the encoder 7.

When the reliability is evaluated based on the distance to the workpiece W in the ejection direction of the print head 24, the reliability of printing is evaluated to be low in a case where it can be determined that the workpiece W is located at a place farther than a drawable distance, and the reliability is evaluated to be high in a case where it can be determined that the workpiece W is located within the drawable distance. When the reliability is evaluated based on the movement of the workpiece W in the conveyance direction, it can be determined whether the workpiece W is in acceleration/deceleration or is stopped. For example, the reliability is evaluated to be high in a case where it can be determined that the workpiece W is in acceleration/deceleration, and the reliability is evaluated to be low in a case where it can be determined that the workpiece W is stopped.

When the reliability is evaluated based on the movement amount of the workpiece W in the direction perpendicular to the conveyance direction, it can be estimated that bumping occurs in a case where the movement amount of the workpiece W in the direction perpendicular to the conveyance direction is equal to or more than a predetermined value, and in this case, the reliability is evaluated to be low. In a case where the movement amount of the workpiece W in the direction perpendicular to the conveyance direction is less than the predetermined value, the reliability is evaluated to be high.

When the reliability is evaluated based on the movement amount of the workpiece W in the direction inclined with respect to the conveyance direction, it can be determined whether an angle deviation occurs between the drawing machine 2 and the conveyor 10, and the reliability is evaluated to be low in a case where the angle deviation occurring between the drawing machine 2 and the conveyor 10 is equal to or greater than a predetermined value, and the reliability is evaluated to be high in a case where the angle deviation occurring between the drawing machine 2 and the conveyor 10 is less than the predetermined value. In addition, when the reliability is evaluated based on the amount of received light of the distance sensor 31, the reliability can be evaluated as in the case of the optical movement measurement sensor 30.

When the reliability is evaluated based on the recognition rate and contrast distribution of the speckle pattern of the optical movement measurement sensor 30, the reliability can be evaluated based on reliability of the measurement value and presence or absence of the influence of disturbance. For example, when the influence of disturbance light is great and the recognition rate of the speckle pattern is low, the reliability is evaluated to be low. In this case, in a case where the recognition rate of the speckle pattern is lower than a predetermined value, the abnormality processing unit 40*i* determines that the reliability does not satisfy the predetermined criterion and executes the abnormality process.

When the reliability is evaluated based on the distance by which the workpiece W is conveyed between ON and OFF of the drawing start timing signal, it is possible to cope with the peeling of the flapper of the corrugated cardboard as the workpiece W, and the reliability is evaluated to be low in a case where the distance is equal to or longer than a predetermined value.

When the reliability is evaluated based on the difference from the input of the encoder 7, it is possible to detect the slip or the catch of the workpiece W, and the reliability is evaluated to be low in a case where the difference is equal to or more than a predetermined value.

Examples of the abnormality process executed by the abnormality processing unit 40*i* can include a notification process of notifying the user of an abnormality, an interruption process of interrupting drawing, and a reset process of resetting a drawing start trigger. The abnormality processing unit 40*i* may execute only one of the notification process and the interruption process, or may execute both the notification process and the interruption process. When both the notification process and the interruption process are executed, the notification process and the interruption process may be executed at the same time, or one may be executed first and then the other may be executed.

The notification process includes both warning of performing notification at a stage where there is a possibility that an abnormality has occurred, and notification performed at a stage where the abnormality has occurred, and only one of these or the both may be executed as the notification process.

In addition, a log of the drawing process may be stored as the abnormality process executed by the abnormality processing unit 40*i*. The log to be stored includes a drawing time, drawing content, a drawing result, a measurement result by the optical movement measurement sensor 30, and the like. The log can be stored in the storage unit 42, for example.

If it is determined that the reliability evaluated by the evaluation unit 40*h* does not satisfy the predetermined criterion in a case where drawing is executed based on the optical movement measurement sensor 30, the abnormality processing unit 40*i* may execute a switching process to switch to drawing based on the output of the encoder 7 as the abnormality process. In addition, the abnormality processing unit 40*i* may execute a switching process to switch to the constant-speed drawing as the abnormality process if it is determined that the reliability evaluated by the evaluation unit 40*h* does not satisfy the predetermined criterion in the case where drawing is executed based on the optical movement measurement sensor 30. That is, if the reliability evaluated by the evaluation unit 40*h* does not satisfy the predetermined criterion, the drawing control unit 40*c* controls the ink ejection from the ejection ports 24*a* based on the movement amount acquired by the encoder 7 and the drawing data.

In addition, in a case where the movement amount of the workpiece W in the direction perpendicular to the conveyance direction is equal to or more than the predetermined value when drawing is performed in a state where the bumping correction is not performed, the abnormality processing unit 40*i* may execute the bumping correction as the abnormality process.

Figure 35:
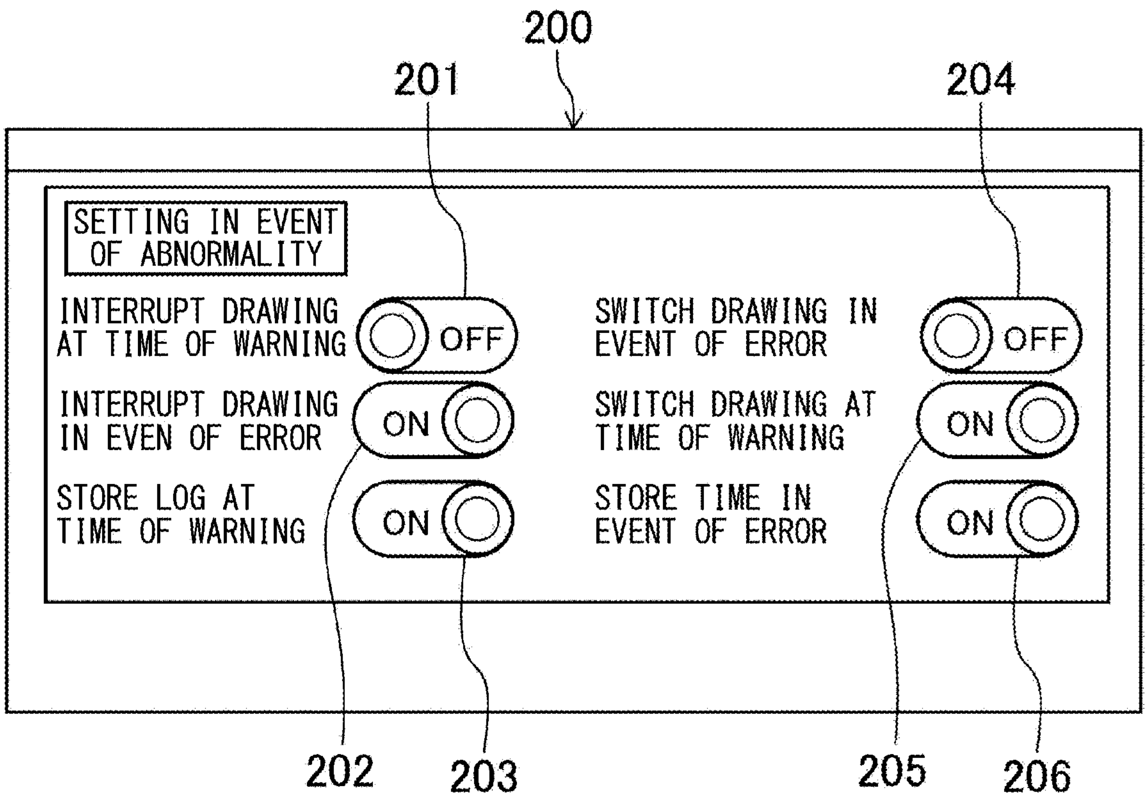
FIG. 35 is a view illustrating an abnormality process setting screen.

In the present embodiment, the user can make settings of the abnormality process. The abnormality processing unit 40*i* generates an abnormality process setting screen 200 as illustrated in FIG. 35 and displays the abnormality process setting screen 200 on the drawing-machine-side display unit 43*a* or the terminal-side display unit 5*a*. The user can make settings of the abnormality process by operating the drawing-machine-side operation unit 43*b* or the terminal-side operation unit 5*b* while viewing the abnormality process setting screen 200.

The abnormality process setting screen 200 includes a first selection area 201 for selecting whether to interrupt drawing at the time of warning, a second selection area 202 for selecting whether to interrupt drawing at the stage where the abnormality has occurred, a third selection area 203 for selecting whether to store a log at the time of warning, a fourth selection area 204 for selecting whether to execute the switching process at the stage where the abnormality has occurred, a fifth selection area 205 for selecting whether to execute the switching process at the time of warning, and a sixth selection area 206 for selecting whether to store the time when the abnormality has occurred.

The drawing can be interrupted at the time of warning if the user operates the first selection area 201 to ON, and the drawing can be continued at the time of warning if the user operates the first selection area 201 to OFF. That is, the drawing-machine-side operation unit 43*b* or the terminal-side operation unit 5*b* is an example of a reception unit that receives selection of execution or non-execution of the interruption process. The abnormality processing unit 40*i* is configured to execute the interruption process when the execution of the interruption process is received, and not to execute the interruption process when the non-execution of the interruption process is received.

The drawing can be interrupted at the stage where the abnormality has occurred if the user operates the second selection area 202 to ON, and the drawing can be continued even when the abnormality has occurred if the user operates the second selection area 202 to OFF. In addition, the log can be stored at the time of warning if the user operates the third selection area 203 to ON, and the log is not stored at the time of warning if the user operates the third selection area 203 to OFF. In addition, the switching process can be executed at the stage where the abnormality has occurred if the user operates the fourth selection area 204 to ON, and the switching process is not executed even when the abnormality has occurred if the user operates the fourth selection area 204 to OFF. In addition, the switching process can be executed at the time of warning if the user operates the fifth selection area 205 to ON, and the switching process is not executed at the time of warning if the user operates the fifth selection area 205 to OFF. In addition, the time when the abnormality has occurred can be stored if the user operates the sixth selection area 206 to ON, and the time when the abnormality has occurred is not stored if the user operates the sixth selection area 206 to OFF.

In this manner, in a case where a plurality of abnormality processes can be executed, the user can perform the operation of selecting execution or non-execution for each abnormality process, and such a selection operation can be received by the drawing-machine-side operation unit 43*b* or the terminal-side operation unit 5*b*. Note that the number of executable abnormality processes may be one.

Figure 36:
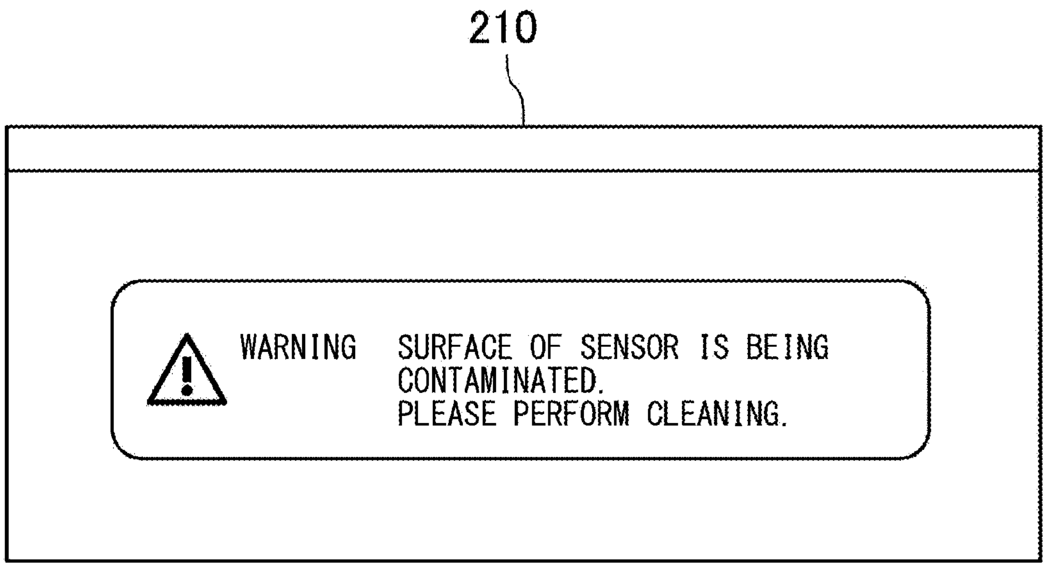
FIG. 36 is a view illustrating a first warning screen.

FIG. 36 illustrates a first warning screen 210 displayed on the drawing-machine-side display unit 43*a* or the terminal-side display unit 5*a* by execution of the notification process. The first warning screen 210 displays a cause of a decrease in the reliability and also displays a method for removing the cause. In this example, a cause of a decrease in the amount of received light of the optical movement measurement sensor 30 and a method for solving the decrease in the amount of received light are displayed. By execution of the notification process, the abnormality processing unit 40*i* displays the first warning screen 210 to be superimposed on an already displayed screen and to be displayed on the forefront. As a result, the visibility for the user is improved.

Figure 37:
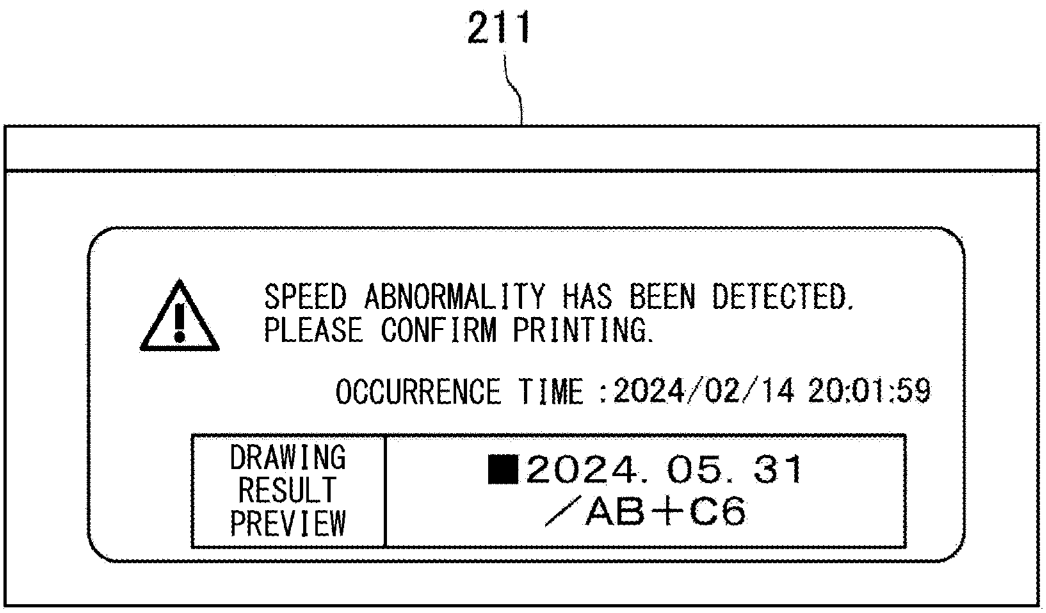
FIG. 37 is a view illustrating a second warning screen.

FIG. 37 illustrates a second warning screen 211 displayed on the drawing-machine-side display unit 43*a* or the terminal-side display unit 5*a* by execution of the notification process. The second warning screen 211 displays a cause of a decrease in the reliability, the time when the cause has occurred, and a preview of a drawing result. In this example, it is displayed that the conveyance speed of the workpiece W is abnormal as the cause of the decrease in the reliability.

Figure 38:
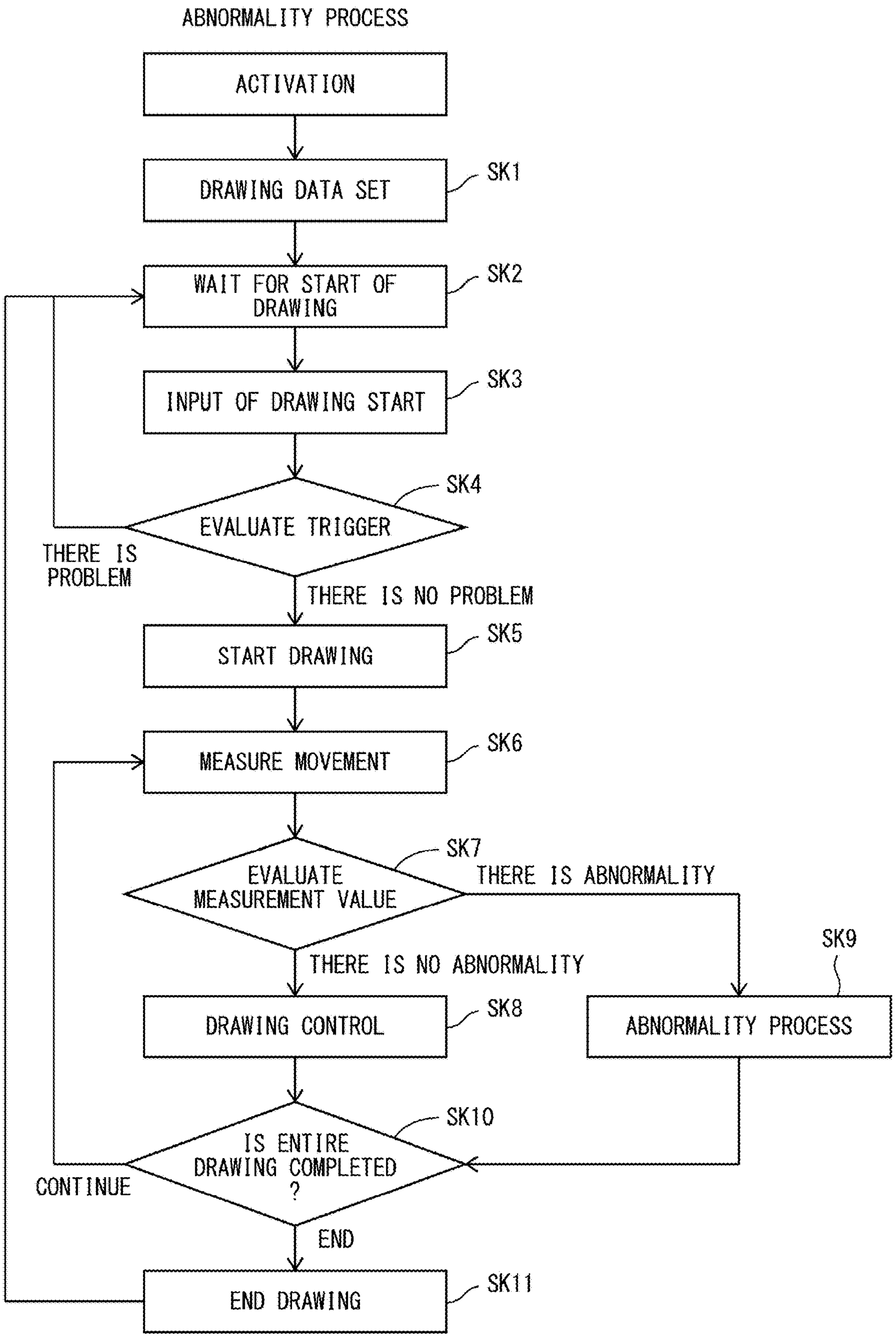
FIG. 38 is a flowchart illustrating an example of an abnormality process.

FIG. 38 is a flowchart illustrating a series of operations of the abnormality process. Steps SK1 and SK2 are the same as Steps SB1 and SB2 illustrated in FIG. 9, respectively. In Step SK3, a drawing start trigger is input. In Step SK4, the drawing start trigger input in Step SK3 is evaluated, and the process proceeds to Step SK5 if there is no problem or returns to Step SK2 if there is a problem.

In Step SK5, the drawing process is started. In Step SK6, movement of the workpiece W is measured by the optical movement measurement sensor 30. In Step SK7, the evaluation unit 40*h* evaluates reliability of a measurement value generated by the optical movement measurement sensor 30 in Step SK6. When the reliability evaluated by the evaluation unit 40*h* satisfies the predetermined criterion, the process proceeds to Step SK8, and the drawing control unit 40*c* controls the ink ejection from the ejection ports 24*a* to execute the drawing process. On the other hand, when the reliability evaluated by the evaluation unit 40*h* does not satisfy the predetermined criterion, the process proceeds to Step SK9, and the abnormality processing unit 40*i* executes the abnormality process. Step SK10 is the same as Step SB7 illustrated in FIG. 9. When the entire drawing has been completed, the process proceeds to Step SK11 and waits for the input of the next drawing start trigger.

Figure 39:
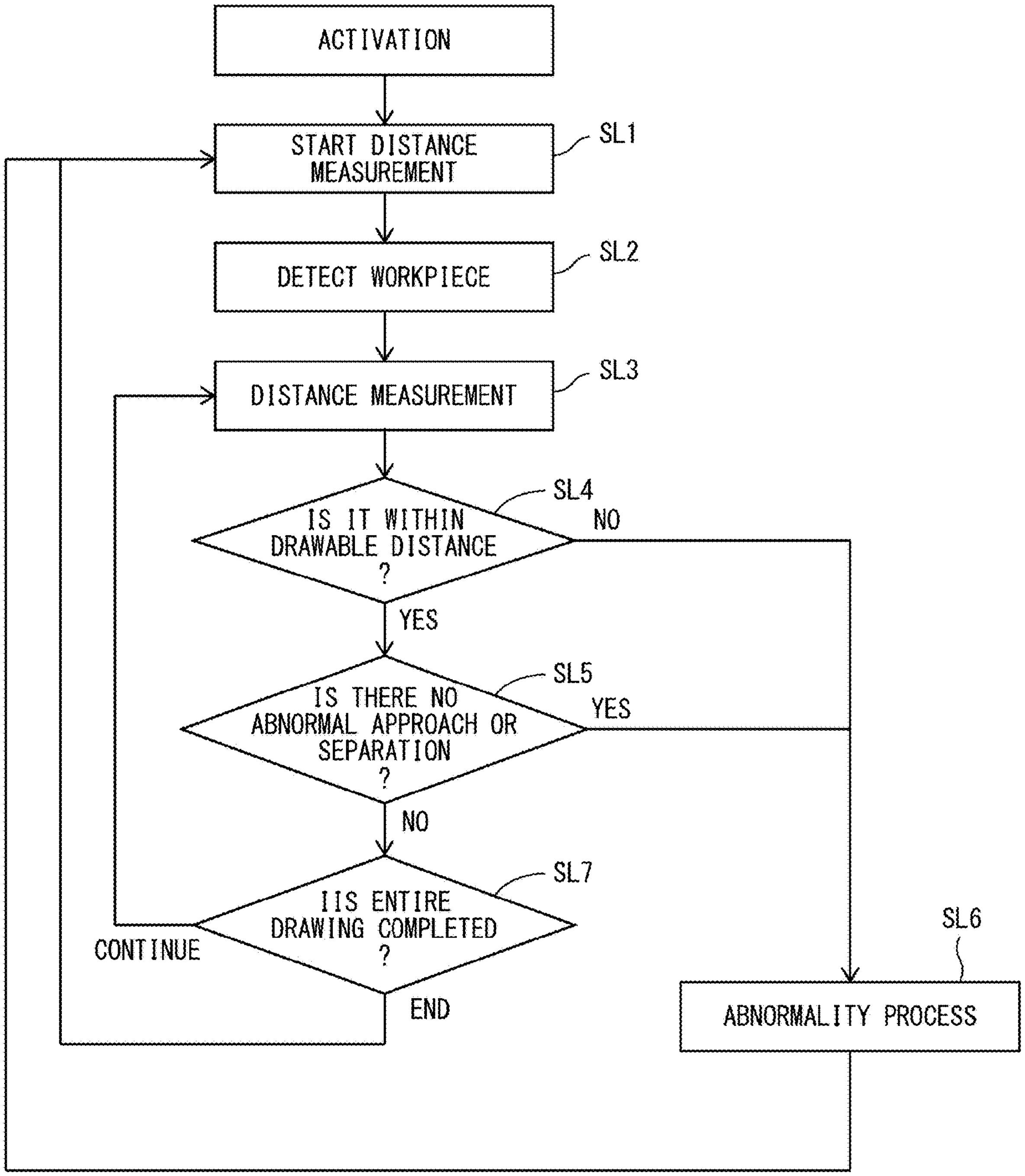
FIG. 39 is a flowchart illustrating an example of the abnormality process in a case where distance measurement is performed.

FIG. 39 is a flowchart illustrating an example of the abnormality process in a case where distance measurement is performed. In Step SL1, measurement of a distance to the workpiece W in the ejection direction of the print head 24 is started by the distance sensor 31. In Step SL2, the workpiece W conveyed by the conveyor 10 is detected. In Step SL3, the distance to the workpiece W in the ejection direction of the print head 24 is measured by the distance sensor 31, and the evaluation unit 40*h* acquires a measurement value. In Step SL4, it is determined whether the measurement value acquired in Step SL3 is within the drawable distance. When the workpiece W is within the drawable distance, the process proceeds to Step SL5. When the workpiece W is farther than the drawable distance, the process proceeds to Step SL6, and the abnormality processing unit 40*i* executes the abnormality process.

In Step SL5, it is determined whether the workpiece W has not abnormally approached or moved away from the print head 24 based on the measurement value acquired in Step SL3. When the workpiece W has abnormally approached or moved away from the print head 24, it is considered that some abnormality has occurred, and thus, the process proceeds to Step SL6, and the abnormality processing unit 40*i* executes the abnormality process. When there is no abnormal approach or separation, the process proceeds to Step SL7. In Step SL7, it is determined whether the entire drawing has been completed, and the process proceeds to Step SL3 if not completed or proceeds to Step SL1 if completed and waits for arrival of the next workpiece W.

Figure 40:
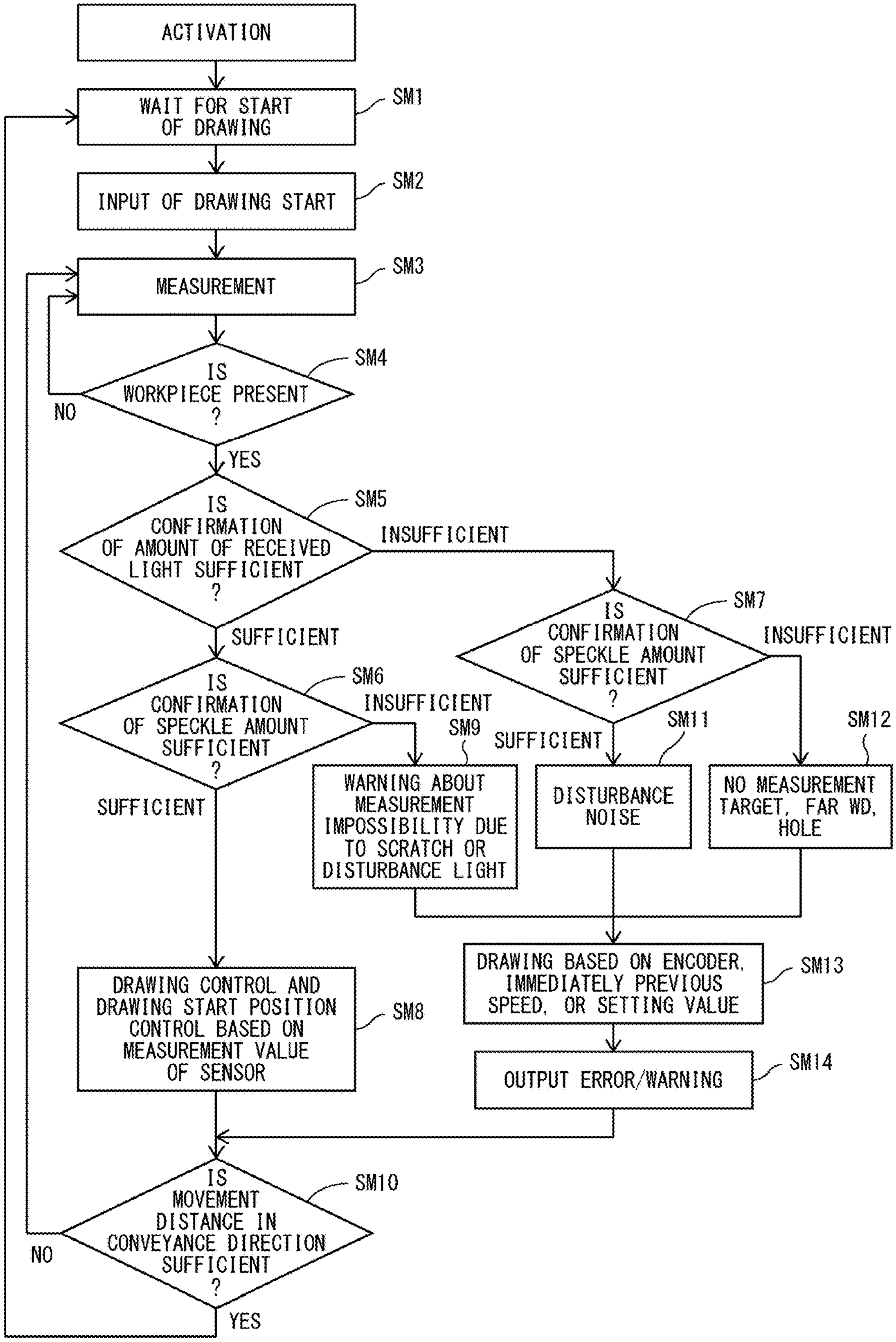
FIG. 40 is a flowchart illustrating an example of a process of evaluating reliability of a sensor value.

FIG. 40 is a flowchart illustrating an example of a process of evaluating reliability of a sensor value. Steps SM1 and SM2 are the same as Steps SK2 and SK3 in FIG. 38, respectively. In Step SM3, measurement by the optical movement measurement sensor 30 is started. In Step SM4, it is determined whether the workpiece W is present within the measurable range of the optical movement measurement sensor 30. The process proceeds to Step SM3 if the workpiece W is not present, or proceeds to Step SM5 if the workpiece W is present.

In Step SM5, it is determined whether the amount of received light of the optical movement measurement sensor 30 is sufficient. The process proceeds to Step SM6 if it is determined in Step SM5 that the amount of received light of the optical movement measurement sensor 30 is sufficient, or proceeds to Step SM7 if it is determined that the amount of received light of the optical movement measurement sensor 30 is insufficient.

In Step SM6, it is determined whether the amount of the speckle pattern generated by the optical movement measurement sensor 30 is sufficient. The process proceeds to Step SM8 when it is determined in Step SM6 that the amount of the speckle pattern generated by the optical movement measurement sensor 30 is sufficient, or proceeds to Step SM9 when it is determined that the amount of the speckle pattern generated by the optical movement measurement sensor 30 is insufficient.

In Step SM8, the drawing control unit 40*c* performs drawing control based on a measurement value of the optical movement measurement sensor 30. Thereafter, the process proceeds to Step SM10, and it is determined whether the movement distance of the workpiece W in the conveyance direction is sufficient. The process proceeds to Step SM3 if the movement distance of the workpiece W in the conveyance direction is insufficient, or proceeds to Step SM1 if sufficient.

In Step SM9 reached after it is determined in Step SM6 that the amount of the speckle pattern is insufficient, the abnormality processing unit 40*i* notifies the user that the workpiece W cannot be measured due to a scratch or disturbance light.

On the other hand, in Step SM7, it is determined whether the amount of the speckle pattern generated by the optical movement measurement sensor 30 is sufficient. The process proceeds to Step SM11 when it is determined in Step SM7 that the amount of the speckle pattern generated by the optical movement measurement sensor 30 is sufficient, or proceeds to Step SM12 when it is determined that the amount of the speckle pattern generated by the optical movement measurement sensor 30 is insufficient.

In Step SM11, the abnormality processing unit 40*i* notifies the user that disturbance noise has occurred. In addition, in Step SM12, the abnormality processing unit 40*i* notifies the user that there is no measurement target, that a working distance (WD) is different, that there is a hole, and the like.

After Steps SM9, SM11, and SM12, the process proceeds to Step SM13, and the abnormality processing unit 40*i* switches to any one of the drawing based on the output of the encoder 7, drawing based on a conveyance speed of the immediately previous workpiece W, and drawing based on a preset setting value. In Step SM14, the abnormality processing unit 40*i* executes error output or warning output to notify the user. Thereafter, the process proceeds to Step SM10.

Figure 41:
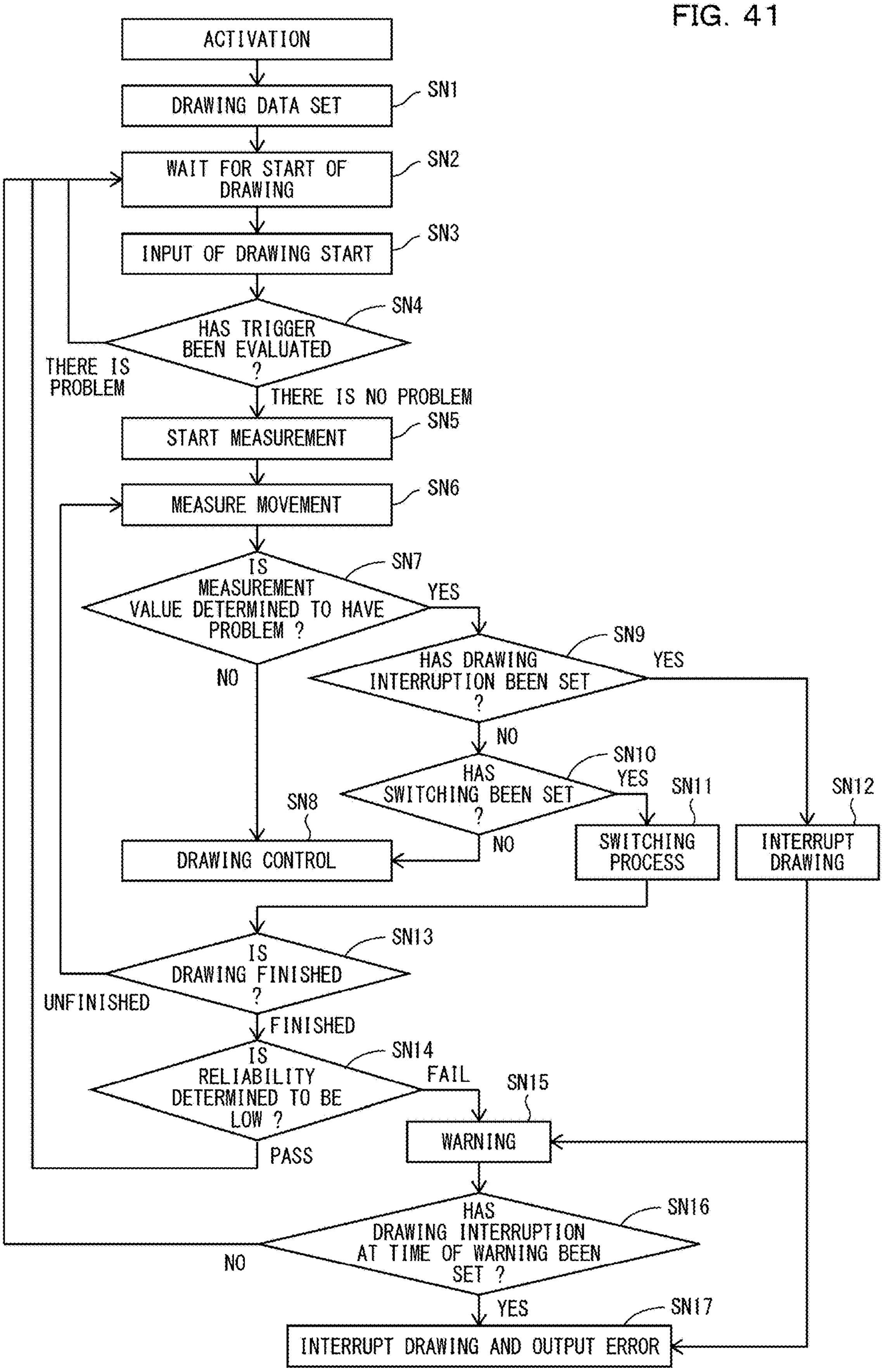
FIG. 41 is a flowchart illustrating an example of control including a drawing interruption process as the abnormality process.

FIG. 41 is a flowchart illustrating an example of control including the drawing interruption process. Steps SN1 to SN4 are the same as SK1 to SK4 in FIG. 38, respectively. In Step SN5, measurement by the optical movement measurement sensor 30 is started. In Step SN6, movement of the workpiece W is measured by the optical movement measurement sensor 30. In Step SN7, it is determined whether there is a problem in a measurement value generated by the optical movement measurement sensor 30 due to an insufficient amount of received light of the optical movement measurement sensor 30 or an insufficient amount of the speckle pattern. When there is no problem in the measurement value generated by the optical movement measurement sensor 30, the process proceeds to Step SN8, and the drawing control unit 40*c* executes drawing control based on the measurement value of the optical movement measurement sensor 30.

In a case where there is a problem in the measurement value generated by the optical movement measurement sensor 30, the process proceeds to Step SN9, and it is determined whether execution of the drawing interruption process has been selected. The process proceeds to Step SN10 if the execution of the drawing interruption process has not been selected, or proceeds to Step SN12 if the execution of the drawing interruption process has been selected, and the drawing process is interrupted.

In Step SN10, it is determined whether execution of the switching process to switch to the drawing based on the output of the encoder 7 or based on the preset setting value has been selected. The process proceeds to Step SN8 if the execution of the switching process has not been selected, or proceeds to Step SN11 if the execution of the switching process has been selected, and the abnormality processing unit 40*i* switches drawing to the drawing based on the output of the encoder 7.

In Step SN13, it is determined whether the drawing is finished, and if the drawing is unfinished, the process proceeds to Step SN14 to evaluate reliability of the measurement value. If the reliability of the measurement value does not satisfy the criterion, the process proceeds to Step SN15 to warn the user. In Step SN16, it is determined whether a setting to interrupt drawing at the time of warning has been made, and if the setting to interrupt drawing has been made, the process proceeds to Step SN17 to interrupt the drawing and output an error. When an abnormality is detected, printing may be finally performed based on a movement amount that satisfies a predetermined criterion.

(Control Based on Distance Between Print Head and Workpiece)

The drawing accuracy of the drawing machine 2 is determined by whether the distance (also referred to as Throw Distance (TD), Paper Gap (PG), or the like) between the print head 24 and the workpiece W satisfies a predetermined criterion. That is, when the distance between the print head 24 and the workpiece W is large and does not satisfy the predetermined criterion, a landing position of particulate ink on the workpiece W deviates from an ideal position defined by the drawing data, so that disturbance of drawing increases.

When this drawing disturbance exceeds an allowable value in the drawing quality, the drawing failure occurs and a product defect occurs during manufacturing. For example, in the case of drawing of a character, the drawing is disturbed to such an extent that it cannot be recognized visually or by OCR inspection of a printing inspection machine in a subsequent process, and in the case of drawing of a barcode or a two-dimensional code, the drawing is disturbed to such an extent that reading by a code reader is impossible or to such an extent that a specified grade of a code quality standard cannot be satisfied.

In the ink jet printer 1 of the present embodiment, a cause of the drawing disturbance can be inferred by directly measuring the distance between the print head 24 and the workpiece W. That is, it is configured such that the distance sensor 31 of the sensor unit 3 measures the distance (TD) to the workpiece W in the ejection direction of the print head 24, and the drawing control unit 40*c* controls the ink ejection based on a determination result as to whether the distance to the workpiece W in the ejection direction of the print head 24 measured by the distance sensor 31 satisfies the predetermined criterion. In the ink ejection control, the drawing control unit 40*c* acquires a timing signal generated based on a change in the distance to the workpiece W in the ejection direction of the print head 24 measured by the distance sensor 31.

Figure 42:
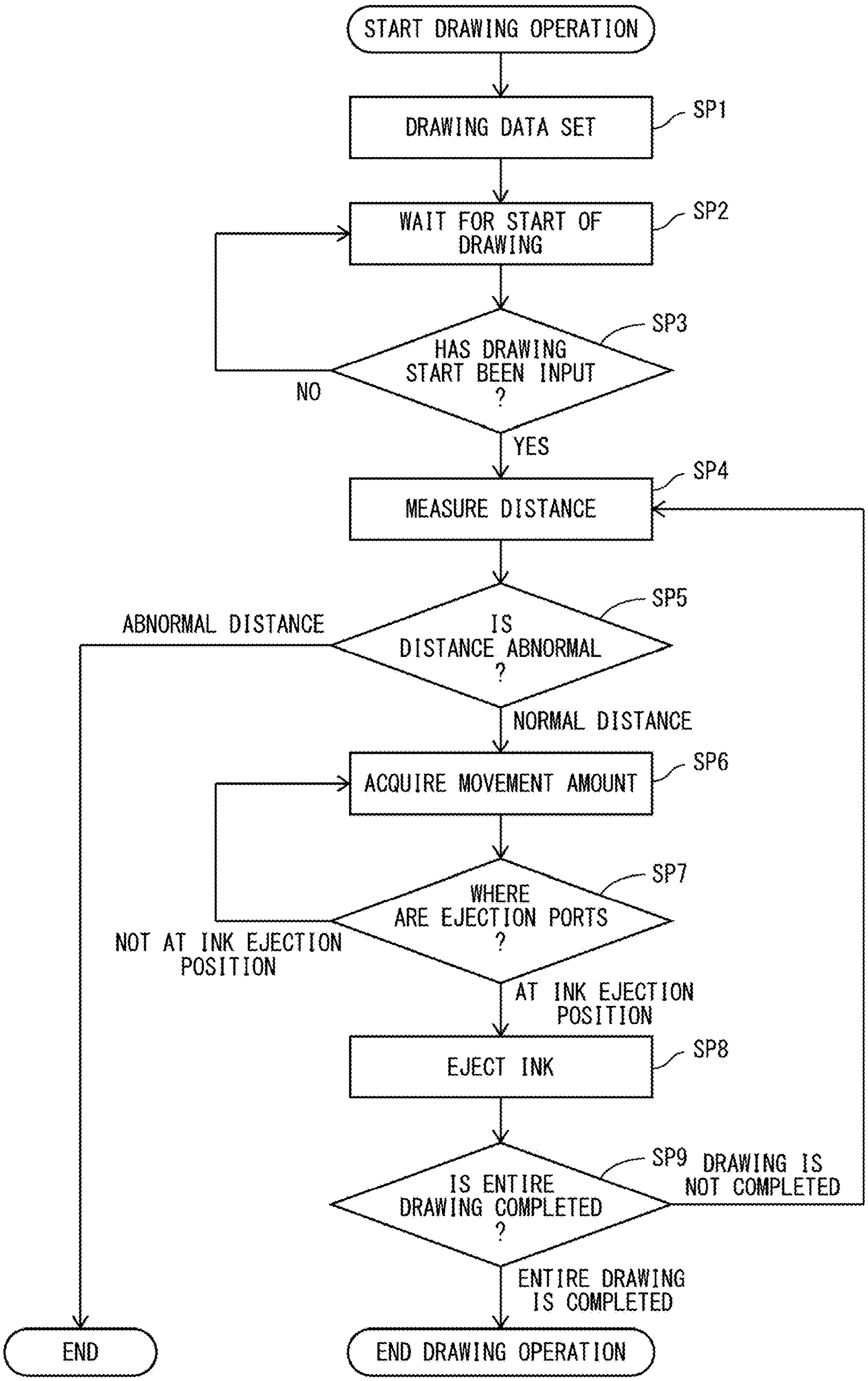
FIG. 42 is a flowchart illustrating an example of control to execute the drawing interruption process based on a result of the distance measurement.

For example, FIG. 42 is a flowchart of control to execute the drawing interruption process based on a result of the distance measurement by the distance sensor 31. Steps SP1 to SP3 are the same as Steps SB1 to SB3 in FIG. 9, respectively. In Step SP4, the distance sensor 31 measures a distance to the workpiece W in the ejection direction of the print head 24 to generate a measurement value. In Step SP5, it is determined whether the measurement value generated in Step SP4 is abnormal. It is determined to be abnormal in a case where the distance to the workpiece W in the ejection direction of the print head 24 measured by the distance sensor 31 does not satisfy a predetermined criterion. Here, the predetermined criterion is a distance by which particulate ink ejected from the ejection ports 24*a* can land on an ideal position on the workpiece W. The ideal position has a range, and when the distance to the workpiece W in the ejection direction of the print head 24 satisfies the predetermined criterion, the recognition by the OCR inspection of the printing inspection machine in the subsequent process is possible, and the reading by the code reader is possible in the case of drawing of a barcode or a two-dimensional code is drawn. On the other hand, when drawing is performed in the case where the distance to the workpiece W in the ejection direction of the print head 24 does not satisfy the predetermined criterion, there is a possibility that it cannot be recognized by the OCR inspection, and the barcode or the two-dimensional code cannot be read by the code reader.

When it is determined in Step SP5 that the distance is a normal distance, the process proceeds to Step SP6, and the workpiece movement amount acquisition unit 40*d* acquires a movement amount of the workpiece W based on the measurement value output from the optical movement measurement sensor 30. Steps SP7 to SP9 are the same as Steps SB5 to SB7 in FIG. 9, respectively.

When it is determined in Step SP5 that the distance is an abnormal distance, since the distance to the workpiece W in the ejection direction of the print head 24 measured by the distance sensor 31 does not satisfy the predetermined criterion in that situation, the drawing interruption process is executed without executing the drawing process, and this flow is ended. Note that a timing for executing the drawing interruption process may be any timing from the start of drawing to immediately before the end. In particular, when the drawing interruption process is executed before the start of drawing, it is possible to avoid a loss caused by the drawing failure of the workpiece W.

Figure 43:
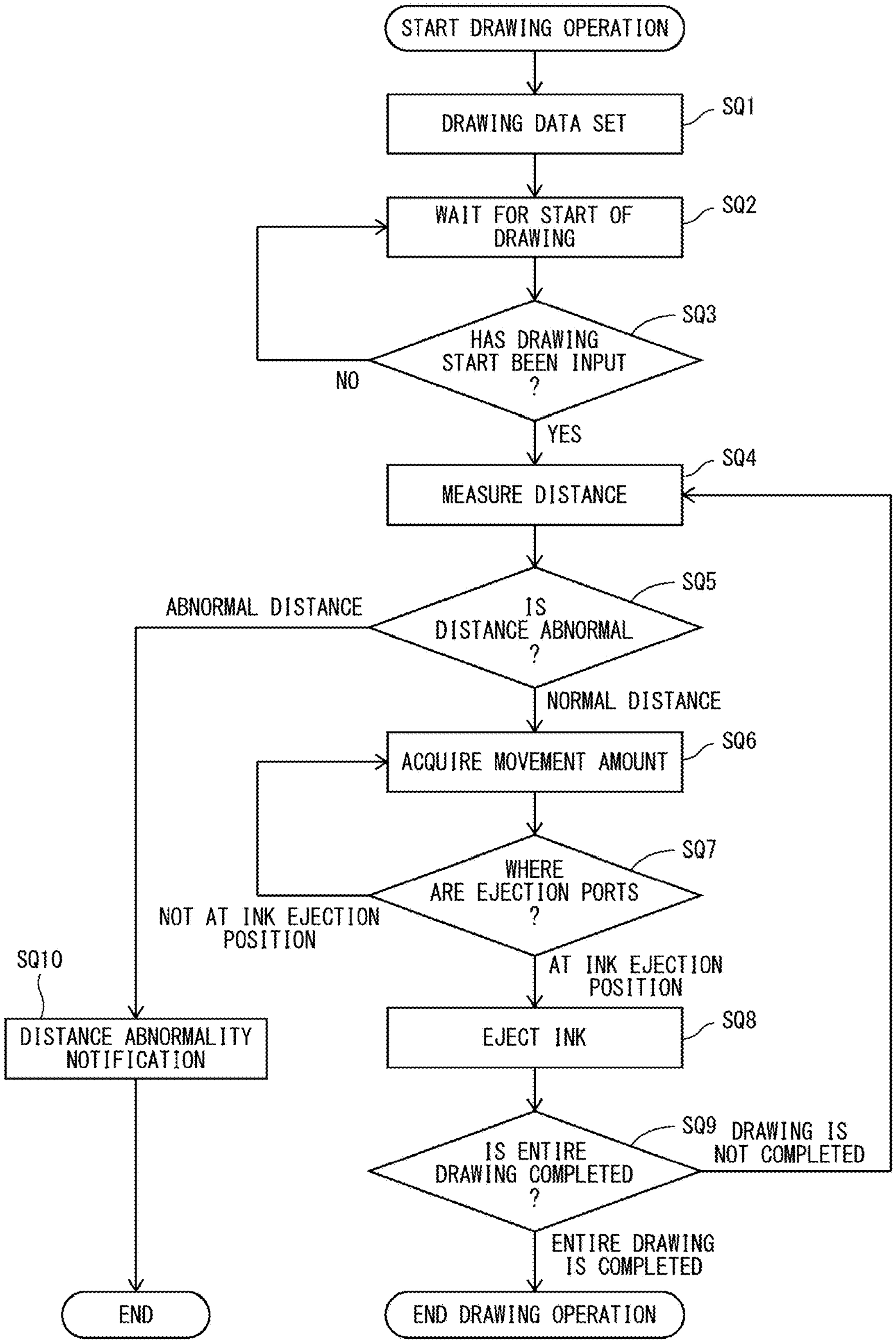
FIG. 43 is a flowchart illustrating an example of control to notify a distance abnormality based on the result of the distance measurement.

FIG. 43 is a flowchart illustrating an example of control to notify a distance abnormality based on the result of the distance measurement. Steps SQ1 to SQ9 are the same as Steps SP1 to SP99 illustrated in FIG. 42, respectively. In a case where it is determined in Step SQ5 that the distance is an abnormal distance, the process proceeds to Step SQ10, and for example, the abnormality processing unit 40*i* executes distance abnormality notification. The distance abnormality notification is a process of notifying the user that the distance to the workpiece W in the ejection direction of the print head 24 measured by the distance sensor 31 is abnormal, and the abnormality processing unit 40*i* generates a screen for the notification and displays the screen on the drawing-machine-side display unit 43*a* or the terminal-side display unit 5*a*. In the example illustrated in FIG. 43, the distance abnormality notification is executed, and the drawing interruption process is executed. For example, when the distance to the workpiece W in the ejection direction of the print head 24 measured by the distance sensor 31 is the same as the drawable distance, drawing is continued after a distance abnormality is notified, and the drawing quality is determined visually or by an inspection machine in a subsequent process.

Figure 44:
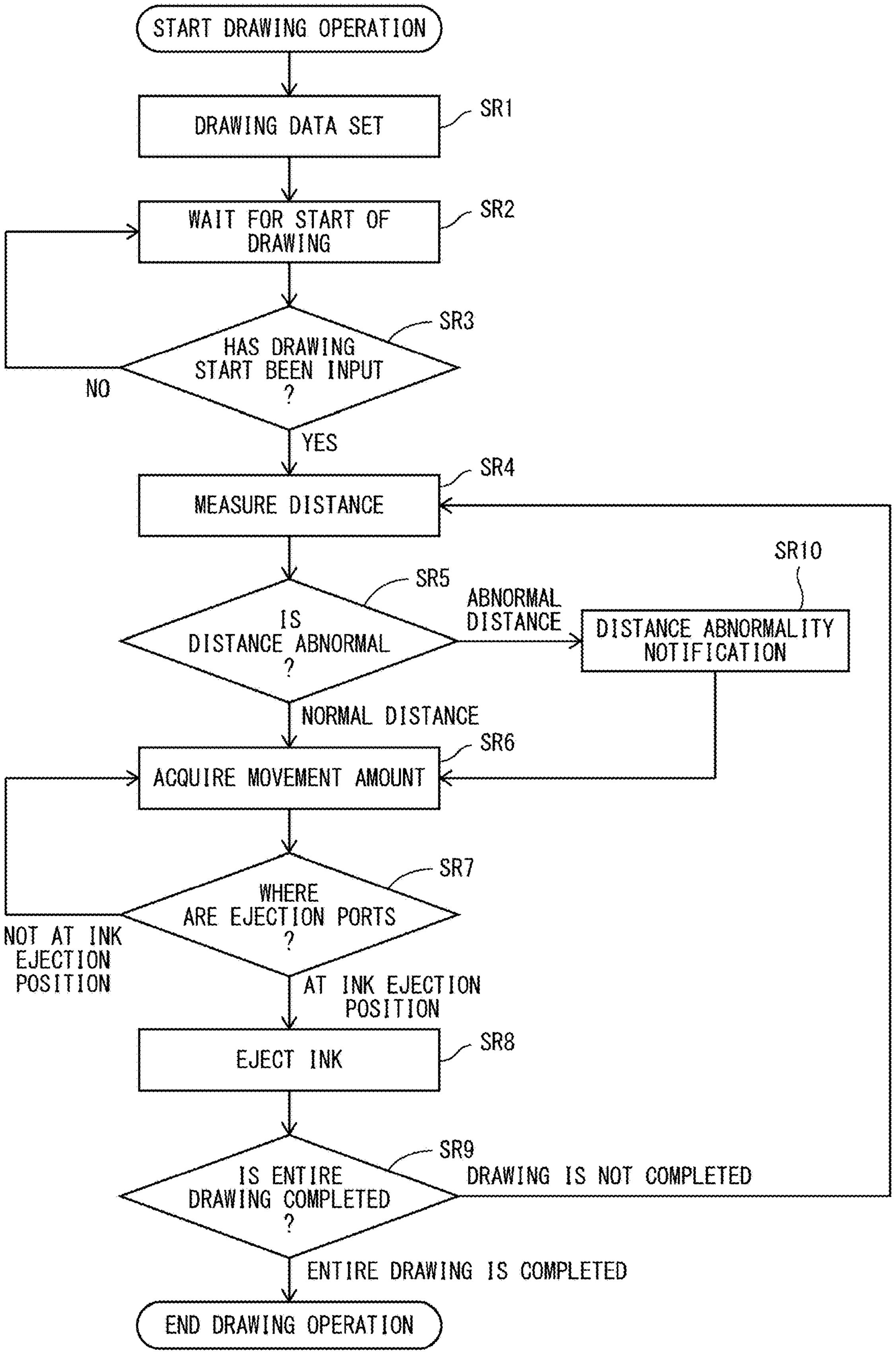
FIG. 44 is a flowchart illustrating an example of control to notify the distance abnormality and continue drawing.

FIG. 44 is a flowchart illustrating an example of control to notify the distance abnormality based on the result of the distance measurement and continue drawing. Steps SR1 to SR9 are the same as Steps SQ1 to SQ9 illustrated in FIG. 43, respectively. In Step SR10, the distance abnormality notification is executed similarly to Step SQ10 illustrated in FIG. 43, and then the process proceeds to Step SR6 to continue drawing.

For example, when the distance to the workpiece W in the ejection direction of the print head 24 measured by the distance sensor 31 is the same as the drawable distance, the drawing is interrupted after a distance abnormality is notified, and the user is caused to perform processing in the event of the drawing abnormality. For example, the workpiece W whose distance abnormality has been notified is excluded by an excluding device in a subsequent process, or is excluded manually by an operator after the conveyor 10 is stopped.

The distance abnormality notification illustrated in FIG. 43 may be executed with different notification names between a case where the distance is determined to be abnormal before the drawing start position and a case where the distance is determined to be abnormal after the drawing start position. When the distance is determined to be abnormal before the drawing start position, it is possible to notify the user that there is no defective drawing on the workpiece W and the workpiece W can be reused. On the other hand, when the distance is determined to be abnormal after the drawing start position, it is possible to notify the user that there is a possibility of the drawing failure in the workpiece W. Therefore, different processes can be performed in the subsequent stage.

In addition, a distance serving as a threshold for determining whether the distance is abnormal may be a fixed value of a device at the time of factory shipment, or may be a user-settable value in consideration of dependency on a user installation environment. In addition, the distance serving as the threshold for determining whether the distance is abnormal is not necessarily the single value, and a plurality of distance thresholds may be used to determine an abnormality and differentiate between a case where drawing is to be interrupted and a case where drawing is continued. That is, the abnormality may be determined using a distance threshold for drawing interruption and a distance threshold for continuation. In addition, the user may be allowed to set whether to continue or interrupt drawing after the distance is determined to be abnormal. In addition, when the distance is determined to be abnormal, some notification may be given to the user to optimize the work distance.

Figure 45:
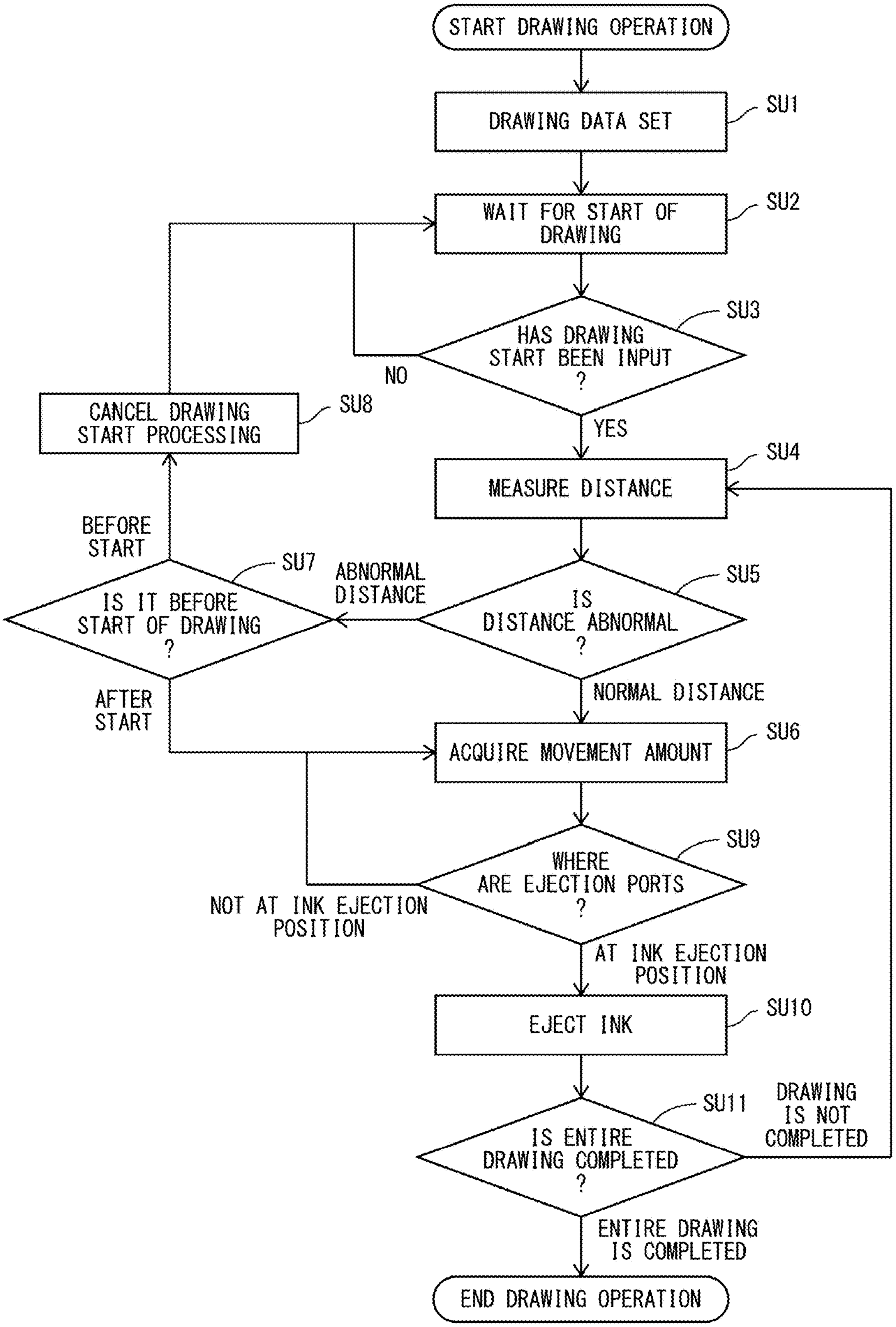
FIG. 45 is a flowchart illustrating an example of control to disable a drawing start trigger in the event of the distance abnormality.

FIG. 45 is a flowchart illustrating an example of control to disable a drawing start trigger in the event of the distance abnormality and enable a drawing start trigger input next. Steps SU1 to SU6 are the same as Steps SR1 to SR6 in FIG. 44, respectively. In a case where the distance to the workpiece W in the ejection direction of the print head 24 measured by the distance sensor 31 is an abnormal distance, the process proceeds to Step SU7, and it is determined whether it is before the start of drawing. If it is before the start of drawing, the process proceeds to Step SU8, and drawing start processing is canceled, that is, a drawing start trigger is invalidated. If it is after the start of drawing, the process proceeds to Step SU6. Steps SU9 to SU11 are the same as Steps SR7 to SR9 in FIG. 44, respectively.

For example, in a case where the workpiece W is corrugated cardboard, a drawing start point in the timing sensor 8 may be incorrect in a line in which a defect in which flaps of the corrugated cardboard are half-opened frequently occurs due to a box production failure or the like, or movement amount measurement cannot be correctly performed when the optical movement measurement sensor 30 is used due to a deviation from the measurable distance or a decrease in measurement accuracy. In such a case, the drawing start trigger is temporarily invalidated, and then the point at which the distance measurement is stable is used as the trigger, so that the drawing can be performed on the workpiece W based on the correct end face.

(Event Detection and Log File Storage Process)

At a site where the workpiece W is conveyed, a variation in the conveyance speed by the conveyor 10 and a variation in a position of the workpiece W in the width direction on the conveyance surface 10*a* occur, and the error due to the slip of the workpiece W on the conveyance surface 10*a* also occur in principle. If the above-described variation or error exceeds a preset landing accuracy tolerance of particulate ink, the drawing failure occurs as a result.

The drawing failure includes various events such as a miss or an omission of a character, a segmentation and contamination of a character, and the like. When the drawing failure occurs on the conveyor 10, it is necessary to collect information such as a drawing execution time and a drawing interval, identify a cause of the drawing failure, and execute a countermeasure, but it may be difficult to identify the cause.

Figure 46:
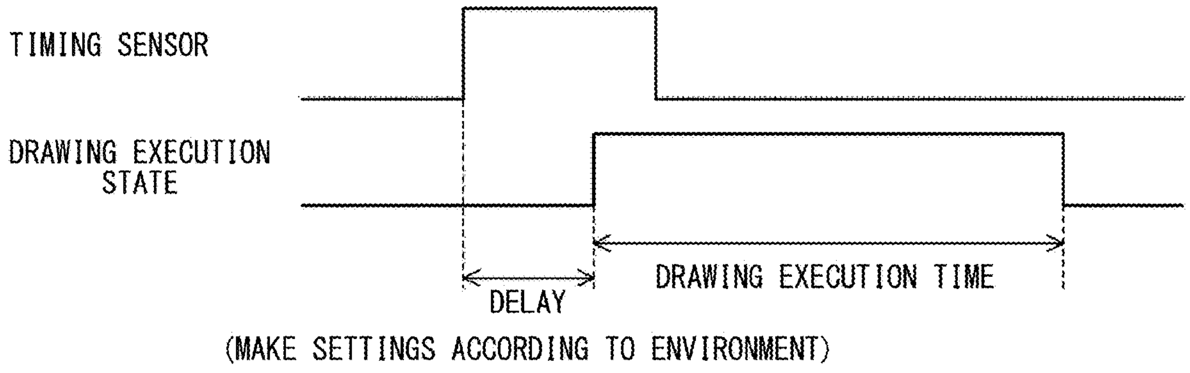
FIG. 46 is a timing chart of an input of the timing sensor and execution of drawing.
Figure 47:
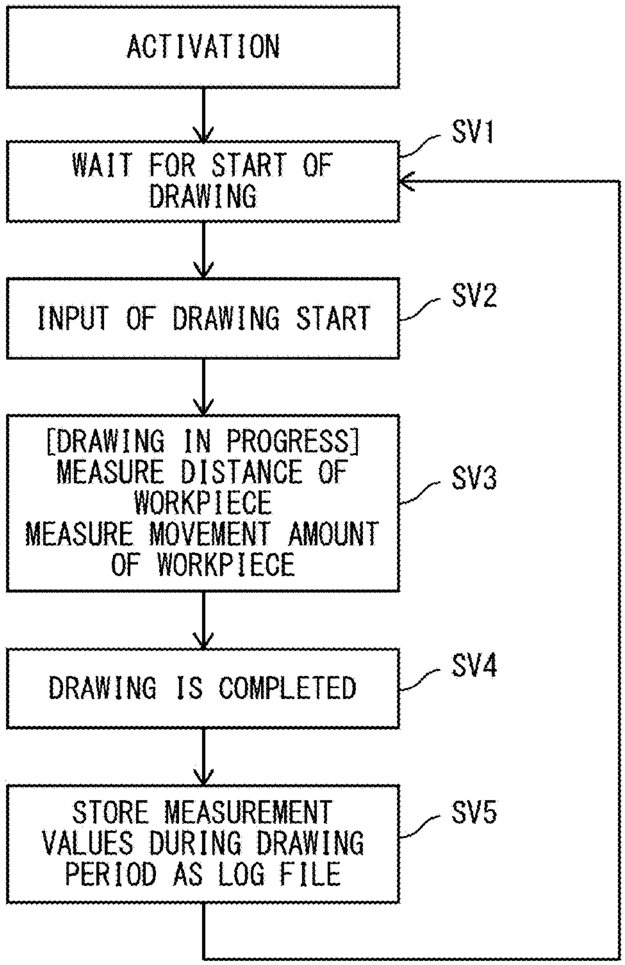
FIG. 47 is a flowchart illustrating an example of a log file storage process during a drawing period.

FIG. 46 is a timing chart of an input of a drawing start trigger output from the timing sensor 8 and execution of drawing. As illustrated in this drawing, the drawing machine 2 executes drawing in accordance with the conveyance speed of the workpiece W when the workpiece W passes the front thereof. In the case of such a drawing system, conventionally, only the drawing time and the drawing interval are information that can be left when drawing is executed. It is extremely difficult to estimate the cause of the drawing failure described above based on the information only on the drawing time and the drawing interval.

The ink jet printer 1 of the present embodiment has a recorder function that makes it possible to easily analyze a cause of occurrence of some event when the event occurs during operation, such as occurrence of the drawing failure, in a posterior manner. This makes it possible to solve the conventional problem related to identification of the cause of the drawing failure.

As illustrated in FIG. 2, the ink jet printer 1 includes an event detection unit 45 and a storage processing unit 46 as portions that implement the recorder function. The event detection unit 45 is a portion that detects an event related to a drawing state based on the optical movement measurement sensor 30 and the distance sensor 31 of the sensor unit 3. The storage processing unit 46 is a portion that stores information regarding measurement values generated by the optical movement measurement sensor 30 and the distance sensor 31 and information regarding the event in association with at least a part of the drawing data in the storage unit 42 or the like as a log file in response to detection of the event by the event detection unit 45. For example, the conveyance speed of the workpiece W, the movement amount of the workpiece W in the direction perpendicular to the conveyance direction, the movement speed of the workpiece W in the direction perpendicular to the conveyance direction, and the like generated by the optical movement measurement sensor 30 can be stored as the log file. In addition, the distance between the print head 24 and the workpiece W generated by the distance sensor 31 can also be stored as the log file. In addition, for example, a variety of types of information, such as a temperature of the print head 24 and a remaining amount of ink, may be stored as the log file. A storage destination of the log file is not limited to the storage unit 42, and may be another storage device or the like.

Figure 49:
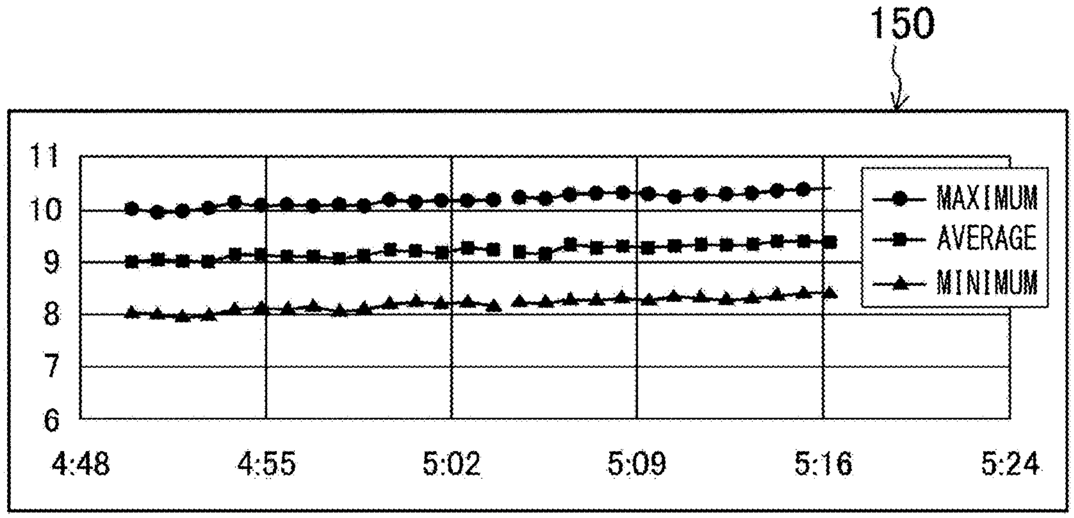
FIG. 49 is a view illustrating a screen for displaying time-series data.

FIG. 49 is a flowchart illustrating a log file storage process during a drawing period. In Step SV1, the drawing machine 2 waits for the start of drawing, waits for a predetermined time, and then proceeds to Step SV2. In Step SV2, a timing signal is input, and the process proceeds to Step SV3. If the timing signal is not input, the process remains in Step SV1.

In Step SV3, the drawing process is executed, the distance sensor 31 measures a distance between the print head 24 and the workpiece W to generate a measurement value, and the optical movement measurement sensor 30 measures a movement amount of the workpiece W to generate a measurement value. If the process proceeds to Step SV4 and the drawing process is completed, the process proceeds to Step SV5, and the measurement values during the drawing period are stored in the storage unit 42 as a log file.

The event detection unit 45 detects that the measurement value measured by the distance sensor 31 is out of a predetermined range as an event related to the drawing state. That is, since it can be estimated that the workpiece W has collided with the print head 24 when the distance between the print head 24 and the workpiece W is negative, this is detected by the event detection unit 45 as the event related to the drawing state.

When the distance between the print head 24 and the workpiece W exceeds the drawing distance range of the drawing machine 2 and the print head 24 and the workpiece W are greatly far from each other, it is assumed that the measurement value measured by the distance sensor 31 is out of the predetermined range. Since drawing is disturbed if the distance between the print head 24 and the workpiece W exceeds the drawing distance range of the drawing machine 2, this is detected by the event detection unit 45 as an event related to the drawing state.

When the distance between the print head 24 and the workpiece W greatly varies during drawing, it can be estimated that, for example, the workpiece W meanders out of the guide of the conveyor 10. Since the drawing is disturbed in this case, this is detected by the event detection unit 45 as an event related to the drawing state.

The event detection unit 45 detects that the measurement value generated by the optical movement measurement sensor 30 is out of a predetermined range as an event related to the drawing state. The predetermined range is a range in which the favorable drawing quality can be maintained. When the conveyance speed of the workpiece W generated by the optical movement measurement sensor 30 is not constant, it can be estimated that, for example, the workpiece W is clogged in contact with the guide of the conveyor 10 or the like. Since drawing is disturbed when the conveyance speed of the workpiece W is not constant, this is detected by the event detection unit 45 as an event related to the drawing state.

In a case where there is a period in which the conveyance speed of the workpiece W generated by the optical movement measurement sensor 30 is zero, it can be estimated that, for example, the conveyor 10 is suddenly stopped or the like. Since the case where there is a period in which the conveyance speed of the workpiece W is zero is not a normal state and causes disturbance of drawing, this is detected by the event detection unit 45 as an event related to the drawing state.

When the movement of the workpiece W in the direction perpendicular to the conveyance direction is intermittently measured by the optical movement measurement sensor 30, it can be estimated that the workpiece W is bumping. Since drawing is disturbed unless a bumping correction process is performed when the workpiece W is bumping, this is detected by the event detection unit 45 as an event related to the drawing state.

The event detection unit 45 detects that the measurement value related to the movement of the workpiece W in the direction perpendicular to the conveyance direction measured by the optical movement measurement sensor 30 is out of a predetermined range as an event related to the drawing state. In addition, since the optical movement measurement sensor 30 can generate the measurement values related to the movement of two axes orthogonal to each other, the event detection unit 45 detects that the measurement value related to the movement in the conveyance direction determined from the measurement values of the two axes measured by the optical movement measurement sensor 30 is out of a predetermined range as an event regarding the drawing state.

For example, when the optical movement measurement sensor 30 measures that the workpiece W is moving at a substantially constant speed in the direction perpendicular to the conveyance direction, it can be estimated that a line of the conveyor 10 is tilted or the drawing machine 2 is tilted with respect to the conveyance direction of the workpiece W. Since drawing is disturbed if the workpiece W moves at a constant speed in the direction perpendicular to the conveyance direction, this is detected by the event detection unit 45 as an event related to the drawing state.

FIG. 48 illustrates a drawing result confirmation screen 140 that allows the user to confirm the content of log files stored by the storage processing unit 46. As illustrated in FIG. 2, the ink jet printer 1 includes a presentation unit 47 that presents information regarding the measurement values generated by the optical movement measurement sensor 30 and the distance sensor 31. The presentation unit 47 generates the drawing result confirmation screen 140 illustrated in FIG. 48 and displays the drawing result confirmation screen 140 on the drawing-machine-side display unit 43*a* or the terminal-side display unit 5*a*, or outputs data necessary for the drawing to be displayed on an external device.

The drawing result confirmation screen 140 is provided with a number display area 141 in which a number (drawing number) is displayed as an example of information for identifying the drawing process, a distance display area 142 in which the distance between the print head 24 and the workpiece W is displayed, a speed display area 143 in which the conveyance speed of the workpiece W is displayed, and a perpendicular direction display area 144 in which the movement amount of the workpiece W in the direction perpendicular to the conveyance direction and the movement speed of the workpiece W in the direction perpendicular to the conveyance direction are displayed. A drawing number, a distance, a speed, and a movement amount are displayed side by side in the lateral direction such that the distance, the speed, the movement amount, and the like in a drawing process identified by the drawing number are associated with the drawing number. The array direction thereof may be the longitudinal direction. In addition, any one or two of the distance, the speed, and the movement amount may be displayed.

Each of the distance, the speed, and the movement amount is compared with a predetermined range (also referred to as a threshold), and a numerical value exceeding the predetermined range is displayed in a manner distinguishable from the other numerical values. The numerical value exceeding the predetermined range can be easily understood, for example, by highlighting, bolding, or changing a color of the numerical value exceeding the predetermined range. In this manner, the storage processing unit 46 can store a comparison result between the measurement value generated by the distance sensor 31 and the threshold. The presentation unit 47 can present the comparison result between the measurement value generated by the distance sensor 31 and the threshold to the user in various manners.

In addition, a real-time clock may be built in the drawing machine 2 or the controller 4. When the real-time clock is built in the drawing machine 2 or the controller 4, the storage processing unit 46 can store the drawing number and time in association with each other. This makes it possible to associate the time when an event has occurred with a log. In addition, it is also possible to selectively display only a log file in which an event has occurred.

Since the storage processing unit 46 collects the log files, the presentation unit 47 can generate statistical information and present the generated statistical information to the user through the drawing-machine-side display unit 43*a* or the terminal-side display unit 5*a*.

Here, in general, there is a concept of a job in the drawing machine 2 for industrial use. For example, there is a job for each type of the workpiece W, and in this case, the job is one in which drawing data for each type is set.

When the presentation unit 47 generates the statistical information, the log files collected by the storage processing unit 46 are read and sorted on the basis of a predetermined period. Examples of the predetermined period include "day", "shift", "week", and "job". For example, only log files of a certain job can form one set.

The statistical information includes maximum, minimum, and average values of distances between the print head 24 and the workpiece W during a predetermined period, maximum, minimum, and average values of conveyance speeds of the workpiece W, maximum, minimum, and average values of movement amounts of the workpiece W in the direction perpendicular to the conveyance direction, the number of times the distance between the print head 24 and the workpiece W is out of the predetermined range, the number of times the conveyance speed of the workpiece W is out of the predetermined range, the number of times the movement amount of the workpiece W in the direction perpendicular to the conveyance direction is out of the predetermined range, and the like. The presentation unit 47 presents some or all of these pieces of statistical information in a table format as illustrated in FIG. 48.

The presentation unit 47 can present not only the statistical information but also time-series data to the user. The time-series data can include a plurality of pieces of data, such as distances between the print head 24 and the workpiece W, conveyance speeds of the workpiece W, and movement amounts of the workpiece W in the direction perpendicular to the conveyance direction, before and after an event is detected. In this case, the storage processing unit 46 stores the distances between the print head 24 and the workpiece W, the conveyance speeds of the workpiece W, and the movement amounts of the workpiece W in the direction perpendicular to the conveyance direction before and after the event is detected in association with at least a part of the drawing data. Any storage period of the time-series data by the storage processing unit 46 can be set, and for example, the storage processing unit 46 stores information regarding measurement values and information regarding events as time-series data from a time point when the timing sensor 8 outputs a timing signal until drawing on the workpiece W is completed.

The ink jet printer 1 includes a temporary storage unit 46*a* that temporarily stores information regarding the measurement values generated by the optical movement measurement sensor 30. The temporary storage unit 46*a* stores the measurement values of the optical movement measurement sensor 30 regardless of presence or absence of an event. When the event detection unit 45 detects an event, the storage processing unit 46 reads information corresponding to the event out of the information stored in the temporary storage unit 46*a*, and stores the read information in association with at least a part of the drawing data.

When the presentation unit 47 presents the time-series data, a graph display screen 150 is generated as illustrated in FIG. 49 and displayed on the drawing-machine-side display unit 43*a* or the terminal-side operation unit 5*b*. In this graph, the lateral axis represents time, and the longitudinal axis represents the distance between the print head 24 and the workpiece W.

Time-series data may be displayed on the graph display screen 150 based on the log files regardless before and after detection of an event. From the graph illustrated in FIG. 49, it can be seen that the distance between the print head 24 and the workpiece W tends to increase over time, and thus, a deviation of a rail that guides the workpiece W on a manufacturing line, a change in a position of the drawing machine 2, and the like can be estimated. As a result, a countermeasure can be taken before a printing failure occurs. Note that, in a case where the time-series data before and after an event is detected is displayed, it can be assumed that the event has occurred in a central portion in a time-axis direction.

The controller 4 can be provided with a communication module capable of communicating with the outside. In this case, for example, at least one of the log files, the statistical information, and the time-series data can be transmitted to a device desired by the user and used in the device.

In addition, the user can also extract and use data included in the log files. After extracting desired data from the data included in the log files, the user can edit and process the extracted data using another tool or the like for use as a production report or the like.

Examples of the information regarding measurement values stored in the storage processing unit 46 may include data of the amount of received light of the optical movement measurement sensor 30 and may include time-series data of the amount of received light of the optical movement measurement sensor 30 before and after an event is detected. In this case, the event detection unit 45 detects an event based on a decrease in the amount of received light of the optical movement measurement sensor 30. That is, when droplets of ink splashed from the workpiece W adhere to the window 32*b* of the sensor housing 32, the amount of light received by the optical movement measurement sensor 30 may decrease, leading to a decrease in measurement accuracy or a state where measurement is impossible. This is an event that induces disturbance of drawing, and thus, is detected by the event detection unit 45 as an event related to the drawing state.

The ink jet printer 1 includes a cleaning unit 49 (illustrated in FIG. 2) that cleans the window 32*b* of the sensor housing 32 when the event detection unit 45 detects the event based on the decrease in the amount of light received by the optical movement measurement sensor 30. The cleaning unit 49 includes devices such as a blower (an example of the positive pressure generator) that blows compressed air to the window 32*b* and a wiper that wipes the window 32*b*, and is a portion that automatically cleans the window 32*b*. Note that the cleaning of the window 32*b* may be prompted to the user such that the user performs the cleaning.

(Inspection Apparatus)

Figure 50:
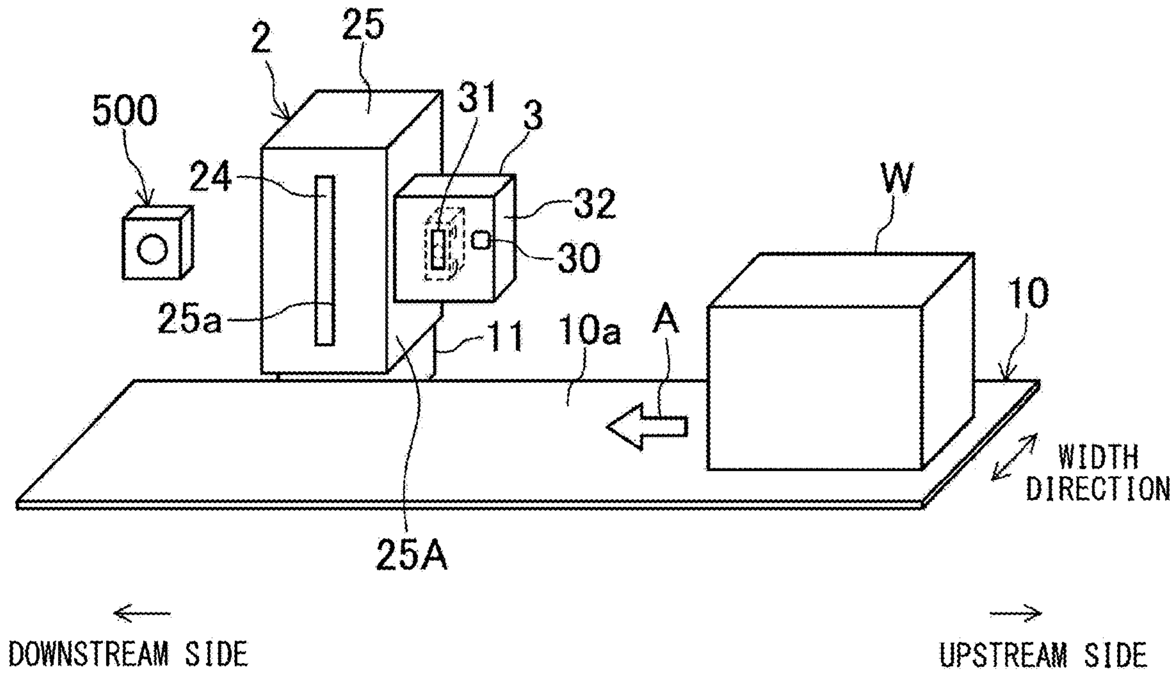
FIG. 50 is a view corresponding to FIG. 3, which illustrates an example in which an inspection apparatus is used during operation.

FIG. 50 illustrates an example in which an inspection apparatus 500 is used during operation of the drawing machine 2. The inspection apparatus 500 is an apparatus configured to inspect the information drawn by the drawing machine 2 on the workpiece W conveyed by the conveyor 10. An installation position of the inspection apparatus 500 is downstream of the drawing machine 2 in the conveyance direction of the workpiece W. At this installation position, the inspection apparatus 500 captures an image of the information drawn on the workpiece W to generate an inspection image, and determines "pass" or "fail" of a drawing state based on the generated inspection image. That is, the inspection apparatus 500 is an image inspection machine. The inspection apparatus 500 may constitute a part of the ink jet printer 1, or may be a device separate from the ink jet printer 1.

Figure 51:
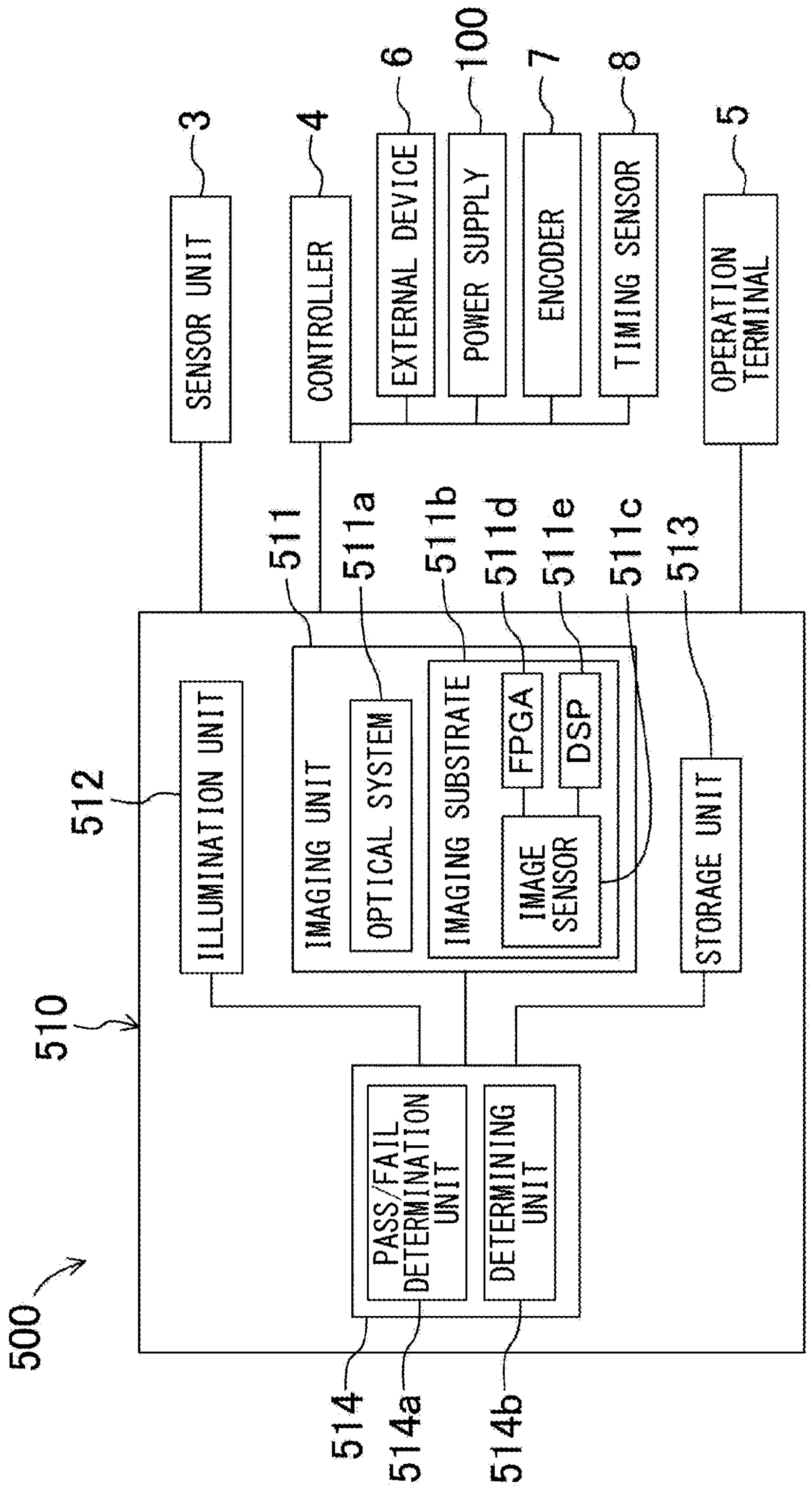
FIG. 51 is a block diagram of the inspection apparatus.

As illustrated in FIG. 51, the inspection apparatus 500 includes a main body 510, the sensor unit 3, the controller 4, and the operation terminal 5. The sensor unit 3, the controller 4, and the operation terminal 5 are the same as those described above. The main body 510 may be incorporated in the sensor unit 3. The external device 6, the power supply 100, the encoder 7, and the timing sensor 8 are also the same as those described above. The external device 6, the power supply 100, the encoder 7, and the timing sensor 8 may be devices each constituting a part of the inspection apparatus 500, or may be devices separate from the inspection apparatus 500. In addition, the ink jet printer 1 may include the inspection apparatus 500 and the drawing machine 2, or may be configured without the inspection apparatus 500.

The main body 510 includes an imaging unit 511, an illumination unit 512, a storage unit 513, and an arithmetic processing unit 514. The imaging unit 511, the illumination unit 512, the storage unit 513, and the arithmetic processing unit 514 may be integrated, or only a part thereof may be separated.

The illumination unit 512 is a portion that illuminates an inspection target region, and includes a light emitting element configured using, for example, an LED or the like. The imaging unit 511 is a portion that captures an image of the inspection target region to generate the inspection image, and includes an optical system 511*a* and an imaging substrate 511*b*. The optical system 511*a* includes a lens that receives light emitted from the illumination unit 512 and reflected by the inspection target region. The inspection target region in the inspection apparatus 500 is a drawn region on the workpiece W.

The imaging substrate 511*b* is provided with a complementary MOS (CMOS) image sensor 511*c*, an FPGA 511*d*, and a DSP 511*e*. The image sensor 511*c* is a portion that receives light incident from the optical system and generates the inspection image. The FPGA 511*d* and the DSP 511*e* are configured to execute filter processing and the like on the inspection image inside the imaging unit 511, and a signal output from the CMOS sensor 511*c* is input to the FPGA 511*d* and the DSP 511*e*.

In addition, the storage unit 513 stores an inspection parameter for determining "pass" or "fail" of the drawing state related to the information drawn on the workpiece W. For example, a plurality of types of inspection parameters can be stored in advance in the storage unit 513, and the plurality of types of inspection parameters may include a first inspection parameter for determining "pass" or "fail" of the drawing state related to the information drawn on the workpiece W and a second inspection parameter having a smaller tolerance for determination of "pass" than the first inspection parameter. The storage unit 513 may be configured using a part of the storage unit 42 of the controller 4 of the ink jet printer 1.

The arithmetic processing unit 514 includes a pass/fail determination unit 514*a* and a determining unit 514*b*. The pass/fail determination unit 514*a* is a portion that determines "pass" or "fail" of the drawing state related to the information drawn on the workpiece W based on the inspection image generated by the imaging unit 511 and the inspection parameter stored in the storage unit 513. The pass/fail determination unit 514*a* and the determining unit 514*b* may be provided inside the drawing machine 2 or inside the operation terminal 5. In addition, the determining unit 514*b* may be provided in the controller 4.

The inspection apparatus 500 is switchable between a setting mode in which various parameter settings such as an imaging setting, registration of a master image serving as a criterion of pass/fail determination, generation (learning) of a discriminator that enables a non-defective product image and a defective product image to be internally discriminated are performed, and an operating mode in which the pass/fail determination on the drawing state is performed based on the inspection image obtained by capturing the image of the inspection target region at a site where the drawing process is actually performed. In the setting mode, the user performs a preliminary operation for enabling a non-defective product and a defective product to be separated by a desired inspection.

The inspection apparatus 500 is switchable between a rule-based inspection mode (standard inspection mode) in which the pass/fail determination of the drawing state is performed based on various characteristic amounts (for example, a color, an edge, a position, and the like) in the inspection image and a learning-based inspection mode (learning inspection mode) in which the discriminator is generated and the pass/fail determination of the drawing state is performed by the generated discriminator. In the standard inspection mode, the user sets which characteristic amount included in the image is used to perform inspection and a threshold (part of the inspection parameter), and performs the pass/fail determination according to the settings.

In a case where important characters as a product, such as a manufacturing date and time or a consumption expiration date, have been drawn, the inspection apparatus 500 determines whether a character string preset by the user in the drawing common setting (Step SA2 in FIG. 8A) has been obtained based on an image recognition result in the pass/fail determination of the drawing state. Various methods can be considered as the pass/fail determination based on the image recognition result. For example, whether there are blobs (clusters of black pixels) that look like a character in the inspection image, whether there are a predetermined number of blobs if there is a blob, and the like. In addition, when the pass/fail determination of the drawing state is performed, the determination may be performed based on whether reading by OCR recognition is possible. In general, pass/fail determination using the OCR recognition can obtain a result with higher accuracy, but it is inevitable that erroneous reading of the character string (a drawing result desirably determined to be normal is determined to be abnormal) occurs with a certain probability as an OCR result of the inspection apparatus 500. A reason of the erroneous determination in the case of using the OCR recognition is that a non-defective product criterion that is visually readable by a person does not match non-defective product criterion determination in the OCR recognition by the inspection apparatus 500. What has been determined not to be a non-defective product is excluded from a production line and treated as a defective product, and thus, it is necessary to confirm and discard the falsely determined non-defective product by visual inspection again, and there is a problem that production efficiency is lowered.

For example, in a case where the user cannot permit the above-described discard, as described above, inspection as to whether the character string preset by the user in the drawing common setting has been obtained is adopted as described above, but this inspection is merely inspection as to whether there are characters and the number of the characters are correct. Thus, an error in the character string and the drawing quality cannot be determined, and defective products are allowed to flow to a subsequent process as non-defective products, which is contrary to the inspection using the OCR recognition, and there is a demerit that extra cost is caused since rework in the subsequent process and recovery of a defective product released to the market are required.

Therefore, in the present embodiment, the drawing state is determined as "fail" when a position or movement of the workpiece W does not correspond to the inspection target. For example, when the position or movement of the workpiece W does not correspond to the inspection target, the drawing state can also be determined as "fail" regardless of the inspection image generated by the imaging unit 511. As a result, the pass/fail determination close to visual sensation can be performed. Hereinafter, specific description will be given.

First, the determining unit 514*b* will be described. The determining unit 514*b* is a portion that determines whether the position or movement of the workpiece W is not an object to be inspected based on a measurement value generated by the optical movement measurement sensor 30 or a measurement value generated by the distance sensor 31. Various methods can be used when the determining unit 514*b* determines whether the position or movement of the workpiece W does not correspond to the inspection target, and some of them will be described hereinafter.

For example, when the measurement value generated by the distance sensor 31 is out of a predetermined range, the determining unit 514*b* determines that the position or movement of the workpiece W does not correspond to the inspection target. In addition, when the measurement value measured by the optical movement measurement sensor 30 is out of a predetermined range, the determining unit 514*b* determines that the position or movement of the workpiece W does not correspond to the inspection target. In addition, in a case where the optical movement measurement sensor 30 generates a measurement value related to movement of the workpiece W in the direction perpendicular to the conveyance direction by the conveyor 10, the determining unit 514*b* determines that the position or movement of the workpiece W does not correspond to the inspection target when the measurement value related to the movement of the workpiece W in the direction perpendicular to the conveyance direction measured by the optical movement measurement sensor 30 is out of a predetermined range. In addition, in a case where the optical movement measurement sensor 30 generates measurement values of two axes orthogonal to each other, the determining unit 514*b* determines that the position or movement of the workpiece W does not correspond to the inspection target when a measurement value related to movement in the conveyance direction determined from the measurement values of the two axes measured by the optical movement measurement sensor 30 is out of a predetermined range.

When the optical movement measurement sensor 30 acquires a current offset position with respect to the reference position of the workpiece W, the determining unit 514*b* determines that the position or movement of the workpiece W does not correspond to the inspection target when the current offset position acquired by the optical movement measurement sensor 30 is out of a predetermined range. In addition, when the accuracy of the measurement value generated by the optical movement measurement sensor 30 is equal to or lower than a predetermined value, the determining unit 514*b* determines whether the position or movement of the workpiece W does not correspond to the inspection target based on a movement amount of the workpiece W by the conveyor 10 acquired by the workpiece movement amount acquisition unit 40*d* of the controller 40. Further, the determining unit 514*b* determines whether the measurement value generated by the optical movement measurement sensor 30 exceeds a threshold, and determines whether the position or movement of the workpiece W does not correspond to the inspection target based on the movement amount of the workpiece W by the conveyor 10 acquired by the workpiece movement amount acquisition unit 40*d* until the measurement value generated by the optical movement measurement sensor 30 exceeds the threshold, and determines whether the position or movement of the workpiece W does not correspond to the inspection target based on the measurement value generated by the optical movement measurement sensor 30 when the measurement value generated by the optical movement measurement sensor 30 exceeds the threshold.

When the determining unit 514*b* determines that the position or movement of the workpiece W does not correspond to the inspection target, the pass/fail determination unit 514*a* determines that the drawing state is "fail" regardless of the inspection image generated by the imaging unit 511. The pass/fail determination close to the visual sensation becomes possible by adding the measurement values related to the position or movement of the workpiece W to the pass/fail determination in the pass/fail determination unit 514*b*. On the other hand, the pass/fail determination unit 514*a* performs the pass/fail determination based on the inspection image generated by the imaging unit 511 when the determining unit 514*b* determines that the position or movement of the workpiece W corresponds to the inspection target.

In a case where the first inspection parameter and the second inspection parameter are stored in the storage unit 513, "pass" or "fail" of the drawing state is determined based on the first inspection parameter and the inspection image generated by the imaging unit 511 when the pass/fail determination unit 514*a* performs the pass/fail determination. However, when the determining unit 514*b* determines that the position or movement of the workpiece W does not correspond to the inspection target, the pass/fail determination unit 514*a* determines "pass" or "fail" of the drawing state based on the second inspection parameter and the inspection image generated by the imaging unit 511.

When the inspection apparatus 500 is used, a pass/fail determination result of the inspection apparatus 500, the inspection image, and the like can be output to the controller 4 by communicably connecting the inspection apparatus 500 and the controller 4 of the ink jet printer 1. In this case, the event detection unit 45 illustrated in FIG. 2 can detect an event related to the drawing state based on the determination result of the inspection apparatus 500. The storage processing unit 46 stores information regarding the inspection image captured by the imaging unit 511 of the inspection apparatus 500 in association with at least a part of drawing data. Note that the inspection apparatus 500 and the operation terminal 5 may be communicably connected to output the pass/fail determination result, the inspection image, and the like of the inspection apparatus 500 to the operation terminal 5.

Figure 53:
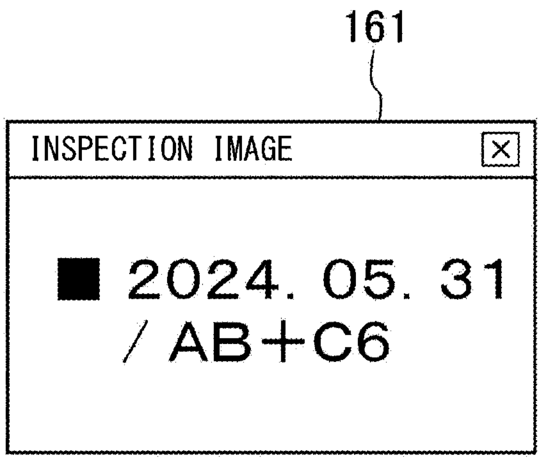
FIG. 53 is a view illustrating an image display window for displaying an inspection image.

The presentation unit 47 can present information regarding the measurement values generated by the optical movement measurement sensor 30 or the measurement value generated by the distance sensor 31 and information regarding the inspection image captured by the imaging unit 511 of the inspection apparatus 500 in association with at least a part of the drawing data. For example, as illustrated in FIG. 52, in a case where there is a numerical value (abnormal value) exceeding a predetermined range among numerical values indicating the distance, the speed, and the movement amount as a result of confirming the log files by the user viewing the drawing result confirmation screen 140, the presentation unit 47 displays an image display confirmation window 160 to be superimposed on the drawing result confirmation screen 140 if the user selects a drawing number to which the abnormal value belongs. The image display confirmation window 160 is provided with a display button 160*a* and a non-display button 160*b*. When the display button 160*a* is operated, the presentation unit 47 displays an image display window 161 for displaying an inspection image corresponding to the drawing number to be superimposed on the drawing result confirmation screen 140 as illustrated in FIG. 53. The drawing result confirmation screen 140 may include at least one of the drawing data extracted from the inspection image, the drawing state, and a margin in the case of determination of "pass".

Figure 54:
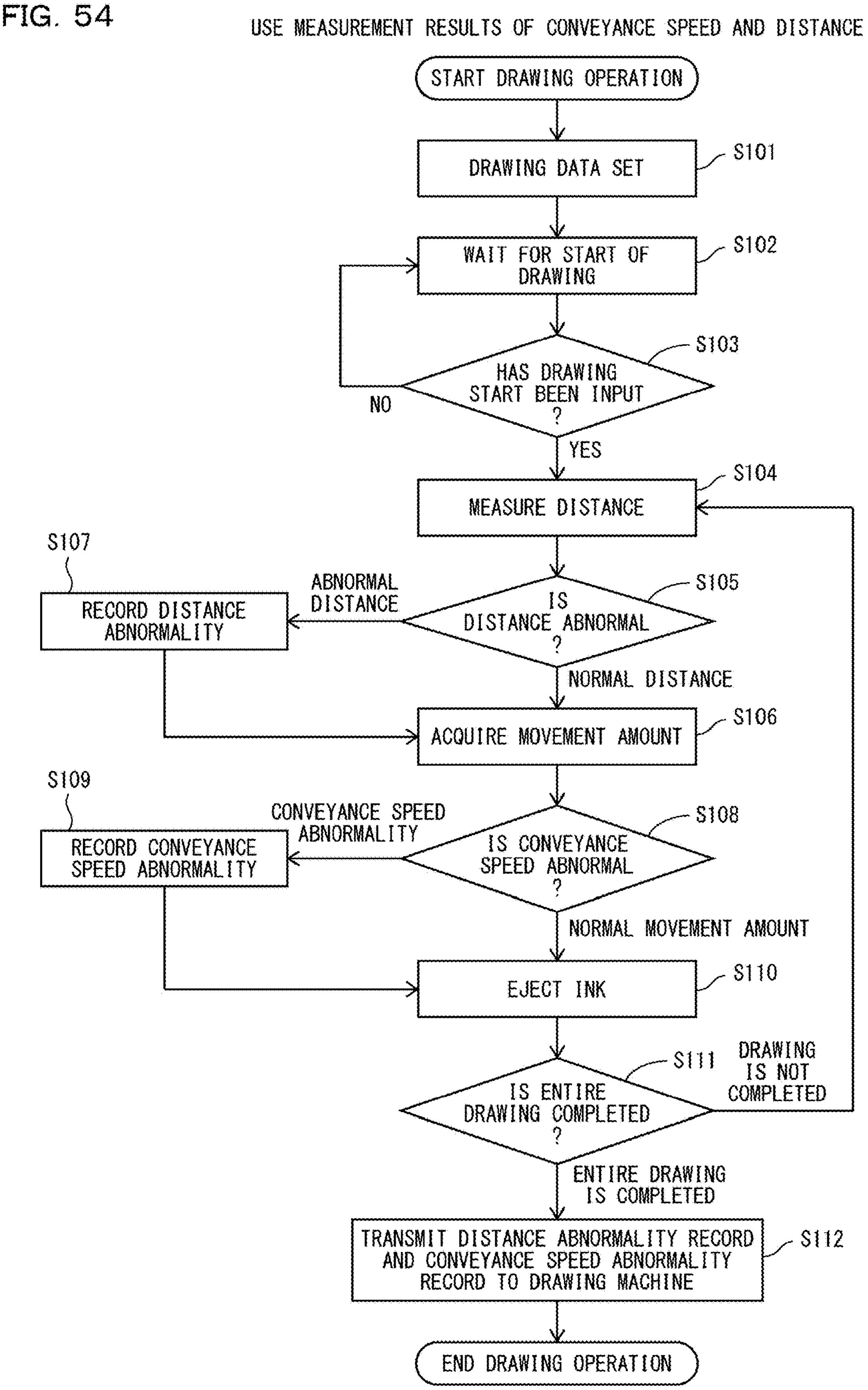
FIG. 54 is a flowchart illustrating an example of processing in a case where pass/fail determination is performed using measurement results of a conveyance speed and a distance of the workpiece.

FIG. 54 is a flowchart illustrating an example of processing in a case where the pass/fail determination is performed using measurement results of a conveyance speed and a distance of the workpiece W. Steps S101 to S103 are the same as SB1 to SB3 illustrated in FIG. 9, respectively. In Step S104, the determining unit 514*b* of the inspection apparatus 500 executes distance measurement based on a measurement value generated by the distance sensor 31. In Step S105, the determining unit 514*b* determines whether a distance detected in Step S104 is abnormal, that is, whether the measurement value generated by the distance sensor 31 is out of the predetermined range. When it is determined that the distance is normal (the measurement value generated by the distance sensor 31 is within the predetermined range), the process proceeds to Step S106, and the determining unit 514*b* acquires a movement amount of the workpiece W based on a measurement value generated by the optical movement measurement sensor 30. In a case where it is determined in Step S105 that the distance is abnormal (the measurement value generated by the distance sensor 31 is out of the predetermined range), the process proceeds to Step S107, and the determining unit 514*b* records that the distance is abnormal in the storage unit 513 or the like, and then, the process proceeds to Step S106.

In Step S108, the determining unit 514*b* determines whether a conveyance speed detected in Step S106 is abnormal, that is, whether the measurement value generated by the optical movement measurement sensor 30 is out of the predetermined range. When it is determined that the conveyance speed is normal (the measurement value generated by the optical movement measurement sensor 30 is within the predetermined range), the process proceeds to Step S110. When it is determined in Step S108 that the conveyance speed is abnormal (the measurement value generated by the optical movement measurement sensor 30 is out of the predetermined range), the process proceeds to Step S109, and the determining unit 514*b* records that the conveyance speed is abnormal in the storage unit 513 or the like, and then, the process proceeds to Step S110. Steps S110 and S111 are the same as Steps SB6 and SB7 in FIG. 9, respectively.

In Step S112, the inspection apparatus 500 transmits a distance abnormality record in Step S107 and a conveyance speed abnormality record in Step S109 to the drawing machine 2. As illustrated in FIG. 54, it may be determined to be abnormal when there is at least one abnormality, or it may be determined to be abnormal when the abnormality has continuously occurred more than a specified number of times. In addition, the abnormality may be determined according to an algorithm.

Note that, in a case where the number of characters to be printed on the workpiece W is set to, for example, four and the inspection apparatus 500 has determined that the number of characters to be printed is five, it can be determined as a non-defective product if the distance and the movement amount are normal.

Figure 55:
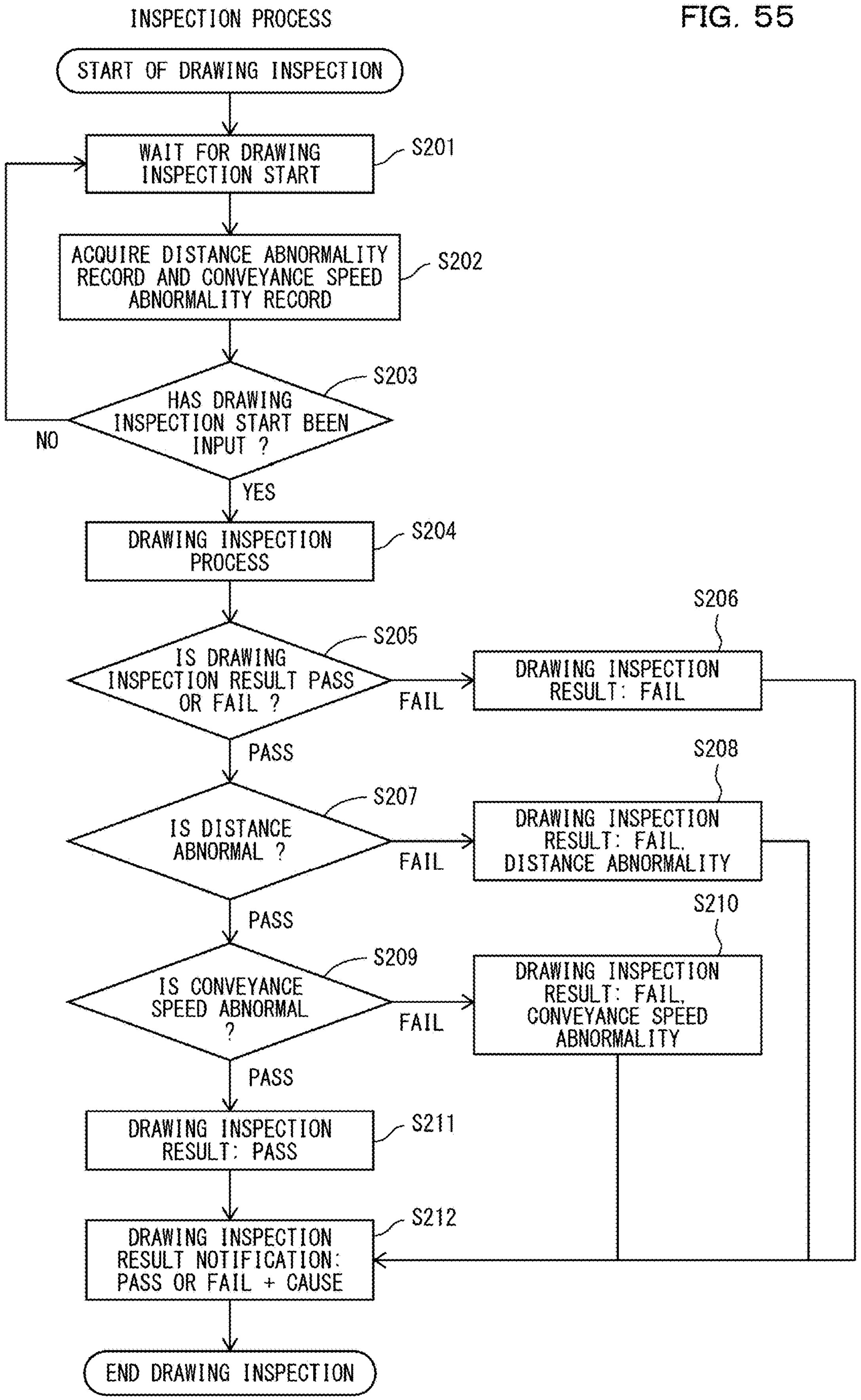
FIG. 55 is a flowchart illustrating an example of an inspection process after the end of a drawing process.

FIG. 55 is a flowchart illustrating an example of an inspection process after the end of the drawing process. In Step S201, the inspection apparatus 500 waits for the start of drawing inspection. In Step S202, the distance abnormality record and the conveyance speed abnormality record recorded in the flowchart illustrated in FIG. 54 are acquired. In Step S203, it is determined whether a trigger for the drawing inspection start has been input. When the trigger for starting the drawing inspection is input, the process proceeds to Step S204, and a drawing inspection process is started. In Step S205, as a result of determination performed by the pass/fail determination unit 514*a* based on the inspection image and the inspection parameter, the process proceeds to Step S206 in the case of "fail", or proceeds to Step S207 in the case of "pass". In Step S207, the pass/fail determination unit 514*a* executes determination on a distance abnormality, proceeds to Step S208 with determination of "fail" in a case where the distance is abnormal, and proceeds to Step S209 in the case of "pass". In Step S209, the pass/fail determination unit 514*a* executes determination on a conveyance speed abnormality, proceeds to Step S210 with determination of "fail" in a case where the conveyance speed is abnormal, and proceeds to Step S211 in the case of "pass".

In Step S211, it is assumed that the drawing state is "pass". In Step S212, the user is notified of "pass" or "fail" of the drawing state, and the user is also notified of a cause and a reason when the drawing state is "fail". For example, the presentation unit 47 can present the reason why the determination of the drawing state by the inspection apparatus 500 is "fail" in association with at least a part of the drawing data. Examples of the reason can include the distance abnormality (the workpiece W is too far from the print head 24) and the conveyance speed abnormality (the conveyance speed of the workpiece W is too slow, too fast, or varies).

The presentation unit 47 can also present a method for correcting the drawing state corresponding to the reason why the determination of the drawing state by the inspection apparatus 500 is "fail". For example, in a case where the reason why the determination of the drawing state is "fail" is the distance abnormality, a method for adjusting the guide such that the workpiece W does not move away from the print head 24 is presented to the user as the method for correcting the drawing state. In addition, in a case where the reason why the determination of the drawing state is "fail" is the conveyance speed abnormality, a method for adjusting the speed of the workpiece W within a predetermined speed range is presented to the user as the method for correcting the drawing state. The drawing machine 2 may acquire a reason why the determination of the drawing state is "fail" and automatically execute drawing state correction corresponding to the reason.

Figure 56:
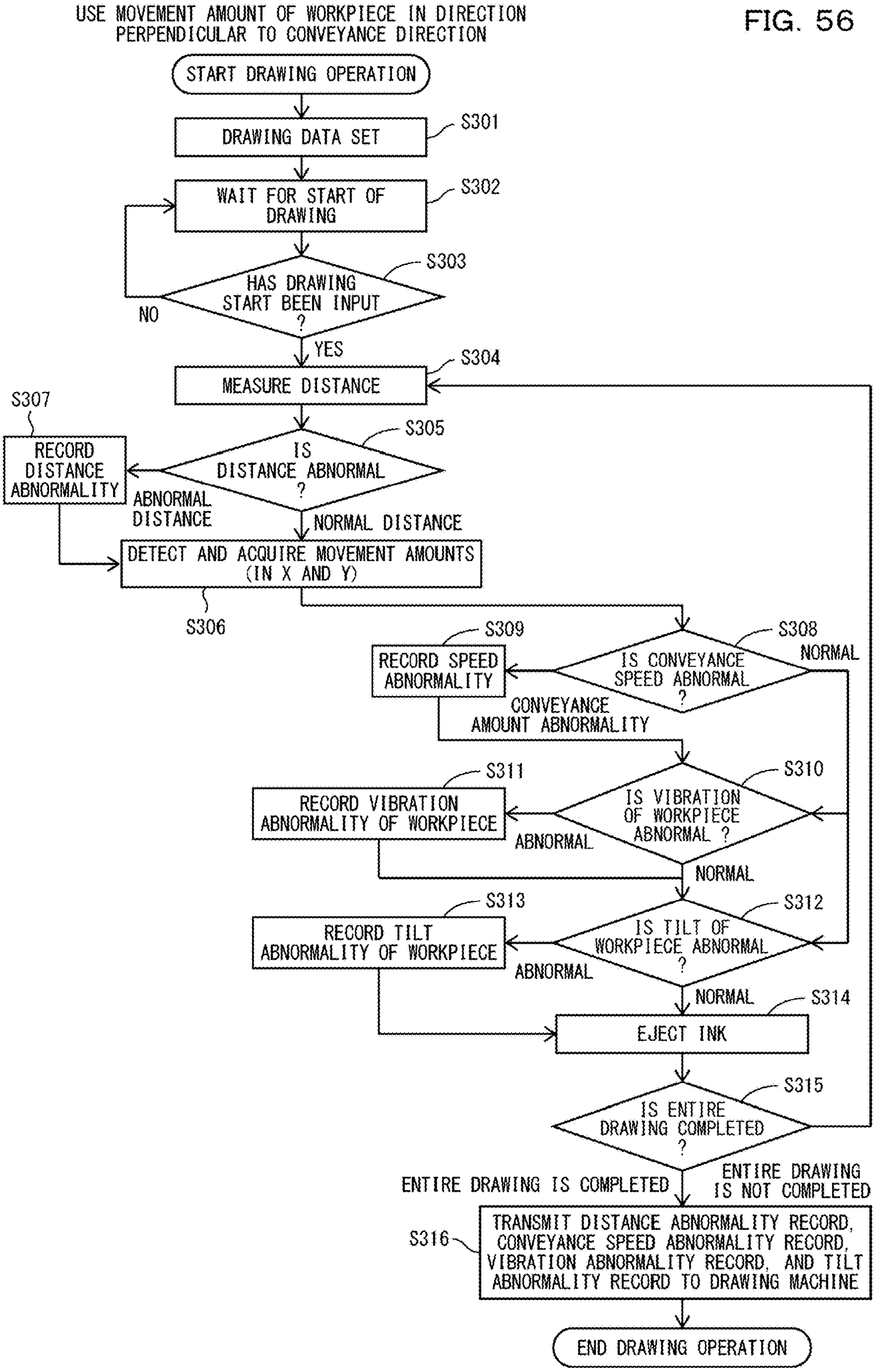
FIG. 56 is a flowchart illustrating an example of processing in a case where the pass/fail determination is performed using measurement results of movement perpendicular to a conveyance direction of the workpiece and a distance.

FIG. 56 is a flowchart illustrating an example of processing in a case where the pass/fail determination is performed using measurement results of movement perpendicular to the conveyance direction of the workpiece W and a distance. Steps S301 to S305 and S307 are the same as Steps S101 to S105 and S107 in FIG. 54, respectively. In Step S306, not only a movement amount (movement speed) of the workpiece W in the conveyance direction but also a movement amount (movement speed) in the direction perpendicular to the conveyance direction is measured.

Steps S308 and S309 are the same as Steps S108 and S109 in FIG. 54. In Step S310, the determining unit 514*b* determines whether vibration of the workpiece W is abnormal based on the movement amount of the workpiece W in the direction perpendicular to the conveyance direction. When it is determined that the vibration of the workpiece W is abnormal, the process proceeds to Step S311, and the determining unit 514*b* records that the vibration of the workpiece W is abnormal in the storage unit 513 or the like, and then, the process proceeds to Step S312. In Step S312, a tilt of the conveyance direction of the workpiece W is calculated based on the movement amount of the workpiece W in the conveyance direction and the movement amount of the workpiece W in the direction perpendicular to the conveyance direction, and it is determined whether the calculated tilt is abnormal. When it is determined that the tilt of the conveyance direction of the workpiece W is abnormal, the process proceeds to Step S313, and the determining unit 514*b* records that the tilt of the conveyance direction of the workpiece W is abnormal in the storage unit 513 or the like, and then, the process proceeds to Step S314. Steps S314 and S315 are the same as Steps S110 and S111 in FIG. 54, respectively.

In Step S316, the inspection apparatus 500 transmits a conveyance speed abnormality record in Step S309, the vibration abnormality record of the workpiece W in Step S311, and the tilt abnormality record of the conveyance direction of the workpiece W in Step 313 to the drawing machine 2.

Figure 57:
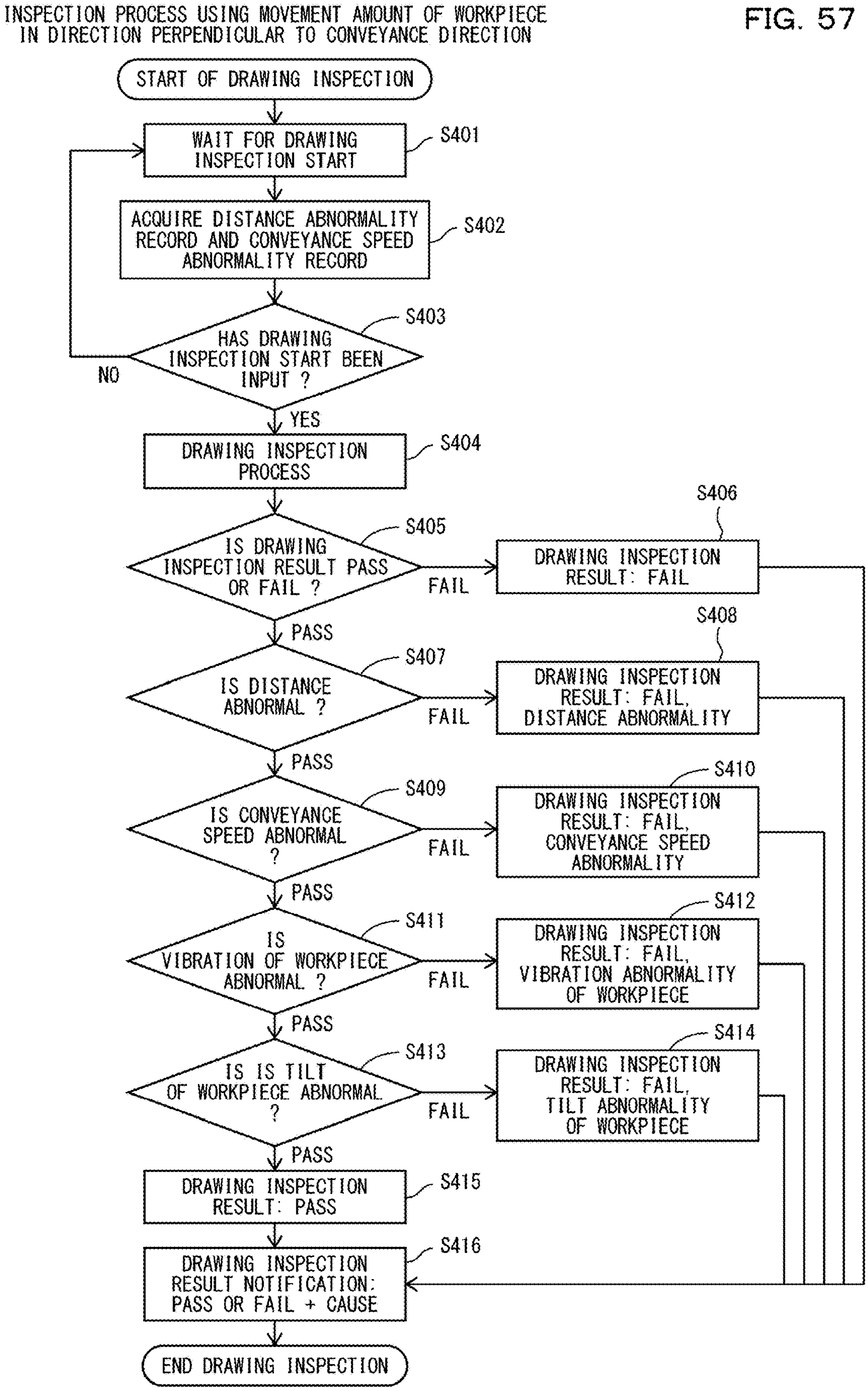
FIG. 57 is a flowchart illustrating an example of the inspection process using the measurement results of the movement perpendicular to the conveyance direction of the workpiece and the distance.

FIG. 57 is a flowchart illustrating an example of the inspection process using the measurement results of the movement perpendicular to the conveyance direction of the workpiece W and the distance. Steps S401 to S410 are the same as Steps S201 to S210 in FIG. 55, respectively. In Step S411, the pass/fail determination unit 514*a* executes determination on a vibration abnormality of the workpiece W, proceeds to Step S412 with determination of "fail" in a case where the vibration is abnormal, and proceeds to Step S413 in the case of "pass".

In Step S413, the pass/fail determination unit 514*a* executes determination on a tilt abnormality of the conveyance direction of the workpiece W, proceeds to Step S414 with determination of "fail" in a case where the tilt is abnormal, and proceeds to Step S415 in the case of "pass".

In Step S415, it is assumed that the drawing state is "pass". In Step S416, the user is notified of "pass" or "fail" of the drawing state, and the user is also notified of a cause and a reason when the drawing state is "fail". For example, it is possible to notify the user that the conveyance direction of the workpiece W is tilted, that the workpiece W is bumping, and the like.

Figure 58:
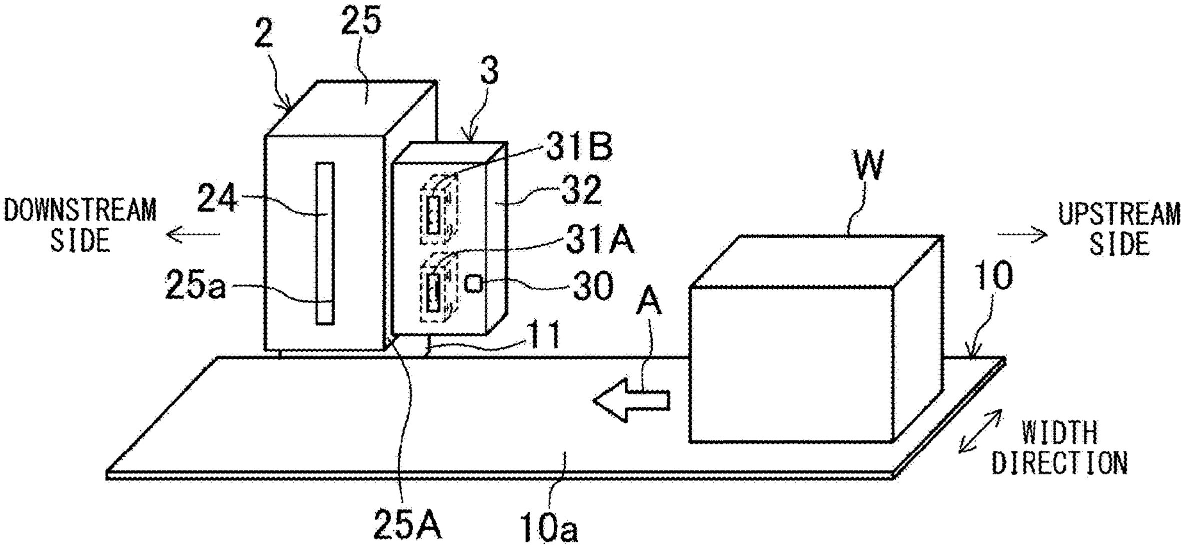
FIG. 58 is a view illustrating an installation example in a case where a plurality of distance sensors are provided.

When the tilt of the conveyance direction of the workpiece W is to be acquired, the acquisition can be performed using a first distance sensor 31A and a second distance sensor 31B provided side by side in the up-down direction as illustrated in FIG. 58. When two different points in the height direction of the workpiece W are measured by the first distance sensor 31A and the second distance sensor 31B, it is possible to measure a tilt abnormality of the workpiece W with respect to the drawing machine 2, and it is possible to determine an abnormality in the inspection apparatus 500 for an abnormal value.

Figure 59:
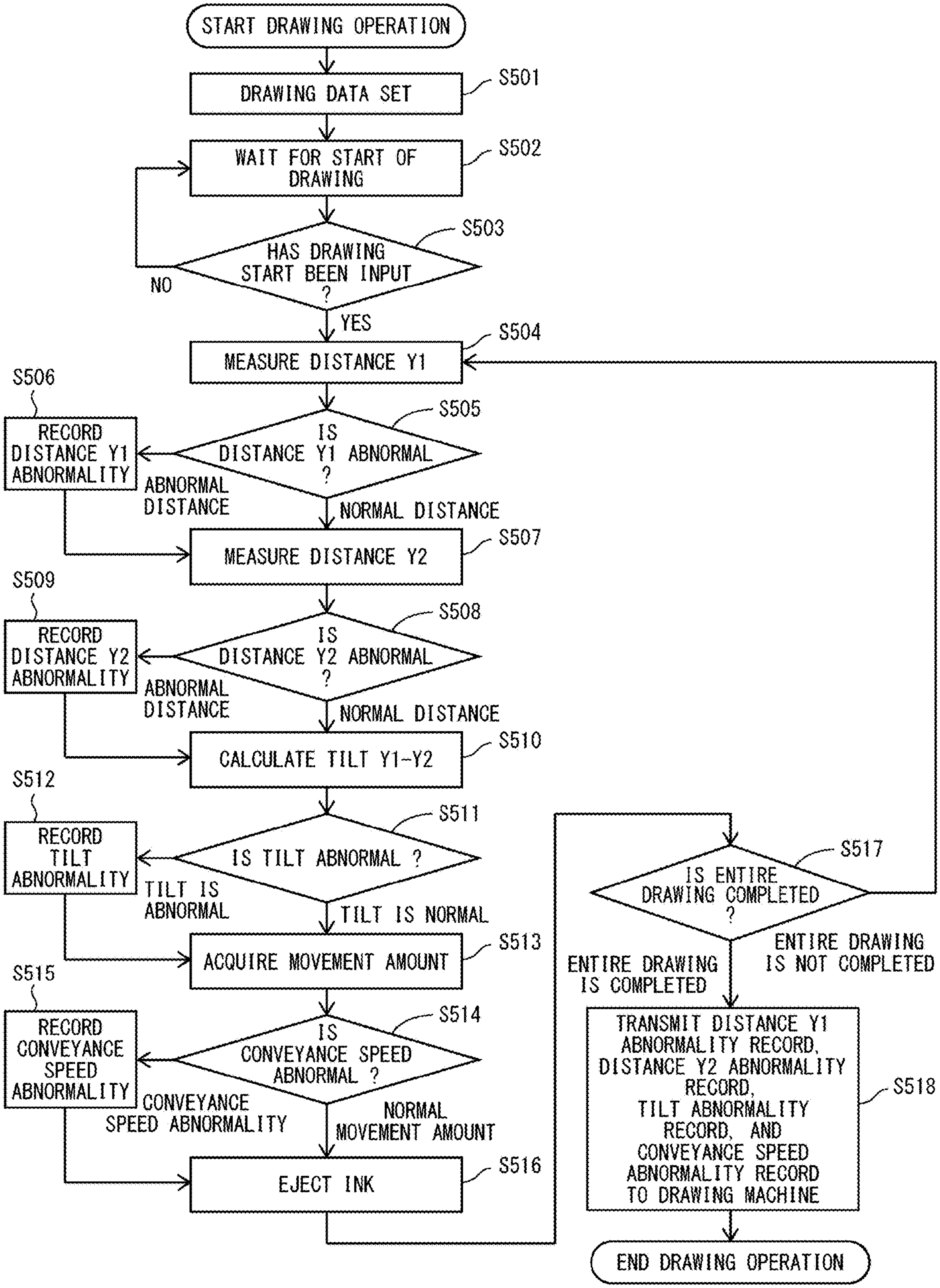
FIG. 59 is a flowchart illustrating an example of the inspection process in a case where the plurality of distance sensors are provided to perform the pass/fail determination.

FIG. 59 is a flowchart illustrating an example of the inspection process in a case where the first distance sensor 31A and the second distance sensor 31B are provided to perform the pass/fail determination. Steps S501 to S503 are the same as Steps S301 to S303 illustrated in FIG. 56, respectively. In Step S504, a measurement value Y1 generated by the first distance sensor 31A is acquired. In Step S505, the determining unit 514*b* determines whether Y1 is abnormal, that is, whether the measurement value Y1 generated by the first distance sensor 31A is out of a predetermined range. When it is determined that Y1 is normal (the measurement value generated by the first distance sensor 31A is within the predetermined range), the process proceeds to Step S507. When it is determined in Step S505 that Y1 is abnormal (the measurement value generated by the first distance sensor 31A is out of the predetermined range), the process proceeds to Step S506, and the determining unit 514*b* records that Y1 is abnormal in the storage unit 513 or the like, and then, the process proceeds to Step S507.

In Step S507, a measurement value Y2 generated by the second distance sensor 31B is acquired. In Step S508, the determining unit 514*b* determines whether Y2 is abnormal, that is, whether the measurement value Y2 generated by the second distance sensor 31B is out of a predetermined range. When it is determined that Y2 is normal (the measurement value generated by the second distance sensor 31B is within the predetermined range), the process proceeds to Step S510. When it is determined in Step S508 that Y2 is abnormal (the measurement value generated by the second distance sensor 31B is out of the predetermined range), the process proceeds to Step S509, and the determining unit 514*b* records that Y2 is abnormal in the storage unit 513 or the like, and then, the process proceeds to Step S510.

In Step S510, the determining unit 514*b* calculates a tilt of the workpiece W. In Step S511, the determining unit 514*b* determines whether the tilt of the workpiece W calculated in Step S510 is out of a predetermined range. When it is determined that the tilt of the workpiece W is normal (within the predetermined range), the process proceeds to Step S513. When it is determined in Step S511 that the tilt of the workpiece W is abnormal (out of the predetermined range), the process proceeds to Step S512, and the determining unit 514*b* records that the tilt of the workpiece W is abnormal in the storage unit 513 or the like, and then, the process proceeds to Step S513. Steps S513 to S517 are the same as Steps S106, S108, S109, S110, and S111 illustrated in FIG. 54, respectively.

In Step S518, the inspection apparatus 500 transmits a distance Y1 abnormality record in Step S506, a distance Y2 abnormality record in Step S509, a tilt abnormality record in Step S512, and a conveyance speed abnormality record in Step S515 to the drawing machine 2.

Figure 60:
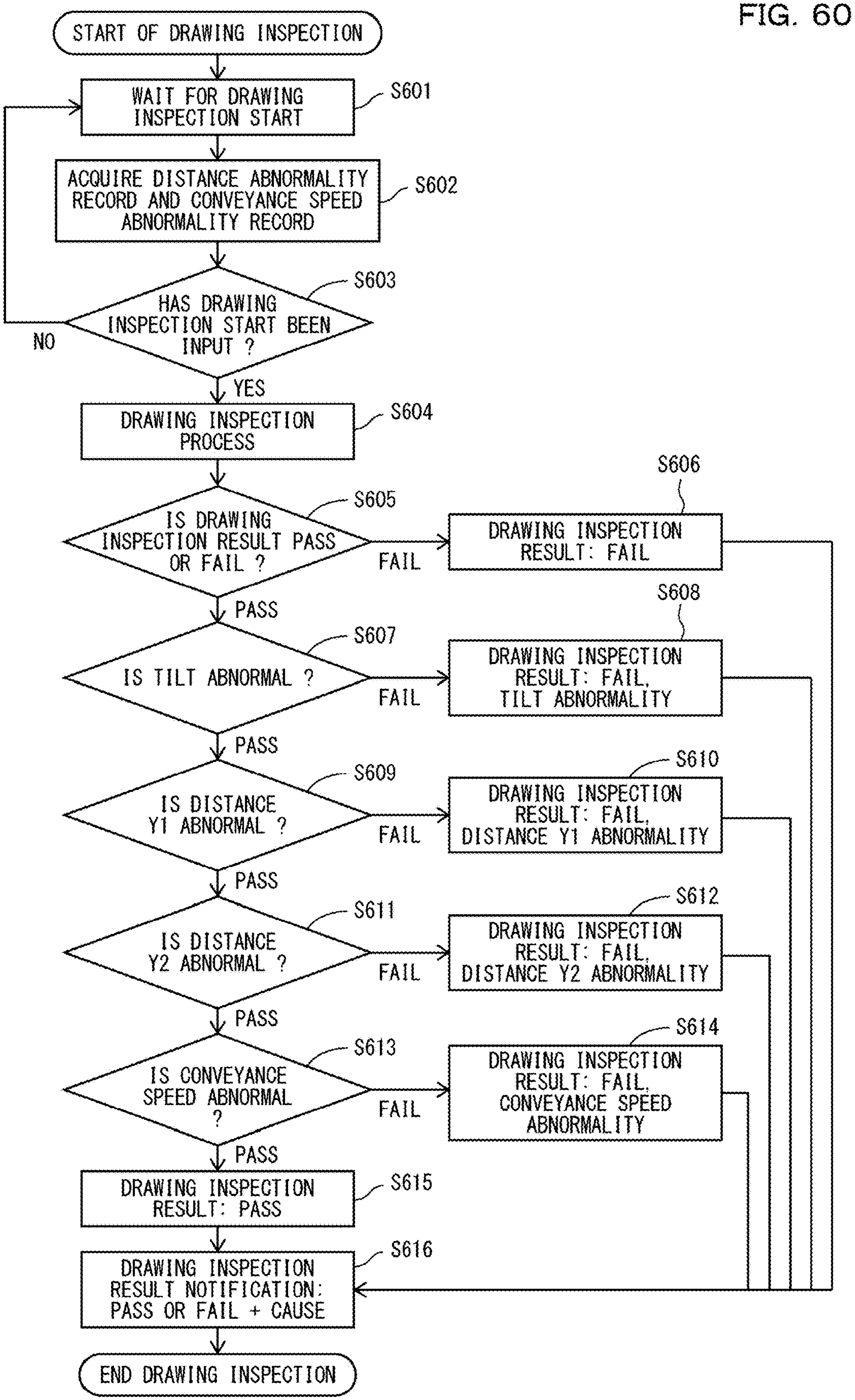
FIG. 60 is a flowchart illustrating an example of the inspection process in the case where the plurality of distance sensors are provided.

FIG. 60 is a flowchart illustrating an example of the inspection process in a case where the first distance sensor 31A and the second distance sensor 31B are provided. Steps S601 to S606 are the same as Steps S401 to S406 in FIG. 59, respectively. In Step S607, the pass/fail determination unit 514*a* executes determination on a tilt abnormality of the workpiece W, proceeds to Step S608 with determination of "fail" in a case where the tilt is abnormal, and proceeds to Step S609 in the case of "pass".

In Step S609, the pass/fail determination unit 514*a* executes determination on a distance Y1 abnormality, proceeds to Step S610 with determination of "fail" in a case where Y1 is abnormal, and proceeds to Step S611 in the case of "pass". In Step S611, the pass/fail determination unit 514*a* executes determination on a distance Y2 abnormality, proceeds to Step S612 with determination of "fail" in a case where Y2 is abnormal, and proceeds to Step S613 in the case of "pass".

In Step S613, the pass/fail determination unit 514*a* executes determination on a conveyance speed abnormality, proceeds to Step S614 with determination of "fail" in a case where the conveyance speed is abnormal, and proceeds to Step S615 in the case of "pass". Steps S615 and S616 are the same as Steps S211 and S212 in FIG. 55, respectively.

In addition, when the pass/fail determination unit 514*a* performs the pass/fail determination of a drawing state, the user can select whether to use one or both of the conveyance speed of the workpiece W and the measurement result of the distance. For example, a selection screen can be displayed to receive selection of the conveyance speed and/or the distance. In addition, thresholds for determining abnormalities may be set in advance or may be settable by the user. That is, the user can freely select whether to use initial setting values determined from the performance of the drawing machine 2 or values set by the user in consideration of installation noise (the influence of wind or the like) under an environment of the user as the thresholds at the time of determining that the conveyance speed and the distance of the workpiece W are abnormal.

(Action and Effect)

According to the present embodiment, when the ink jet printer 1 is installed, a measurement value related to a position or movement of the workpiece W conveyed by the conveyor 10 can be generated by the optical movement measurement sensor 30 or the distance sensor 31. Since the measurement value generated by the optical movement measurement sensor 30 or the distance sensor 31 includes a positional relationship between the print head 24 and the workpiece W, a movement speed, a movement amount, and the like of the workpiece W, it is possible to acquire information regarding an installation state of the ink jet printer 1 based on the measurement value generated by the optical movement measurement sensor 30 or the distance sensor 31. Therefore, a user does not need to perform trial drawing and adjustment several times, and the usability at the time of installation is improved.

In addition, when a variety of types of information are drawn on the workpiece W conveyed by the conveyor 10, a measurement value related to a movement of the workpiece W in the conveyance direction is generated by the optical movement measurement sensor 30. Based on this measurement value and reference position information of the workpiece W, it is possible to acquire a current offset position with respect to a reference position of the workpiece W. When ink ejection from the print head 24 is controlled based on the acquired current offset position and drawing data, the influence of errors due to a variation in a conveyance line speed, a variation in a position of the workpiece W in the width direction, and a slip of the workpiece W is suppressed, and thus, the occurrence of a drawing failure is suppressed.

When a drawing process is executed, the evaluation unit 40*h* evaluates reliability of the measurement by the optical movement measurement sensor 30. For example, an abnormality process can be executed by determining that the reliability does not satisfy a predetermined criterion when an amount of received light received by the optical movement measurement sensor 30 is less than a predetermined value. That is, the abnormality process can be executed at an appropriate timing when the reliability of the measurement by the optical movement measurement sensor 30 does not satisfy the predetermined criterion, so that the occurrence of a large number of drawing failures is suppressed.

In addition, a distance to the workpiece W can be measured by the distance sensor 31, and the ink ejection can be controlled based on a determination result as to whether the distance to the workpiece W satisfies a predetermined criterion. As a result, for example, in a case where the distance to the workpiece W is too long and the drawing failure is likely to occur, this case can be handled, and thus, the occurrence of the drawing failure is suppressed.

In addition, when an event related to a drawing state occurs during operation of the drawing machine 2, the event may cause the occurrence of the drawing failure. In this regard, the measurement value related to the position or movement of the workpiece W conveyed by the conveyor 10 is acquired, and the event detection unit 45 detects the event related to the drawing state occurring during operation of the drawing machine 2 based on the acquired measurement value. In response to the detection of the event, information regarding the measurement value generated by the optical movement measurement sensor 30 or the distance sensor 31 and information regarding the event are stored in association with at least a part of the drawing data, and thus, it is possible to analyze causes of the occurrence including whether the event is caused by the position or the movement of the workpiece W and what kind of drawing state is obtained by confirming the content of storage after the occurrence of the event.

The above-described embodiment is merely an example in all respects, and should not be construed as limiting. Further, all modifications and changes belonging to the equivalent range of the claims fall within the scope of the invention.

As described above, the disclosure can be used, for example, when various types of information are drawn on a packaging material such as corrugated cardboard.

What is claimed is:

1. An ink jet printer that ejects ink to draw information on an object conveyed by a conveyor, the ink jet printer comprising:

an ink tank that stores the ink;

a nozzle configured to eject the ink supplied from the ink tank toward a drawing target object;

a storage unit that stores drawing data specifying an ejection timing of the nozzle at each of a plurality of offset positions in a conveyance direction, the ejection timing corresponding to drawing information;

an optical movement measurement sensor that receives light from the drawing target object and generates a measurement value related to movement of the drawing target object in the conveyance direction based on the received light;

a drawing control unit that controls ink ejection from the nozzle based on a current offset position based on the measurement value generated by the optical movement measurement sensor, and the drawing data;

an evaluation unit that evaluates reliability of measurement by the optical movement measurement sensor; and an abnormality processing unit that executes an abnormality process when the reliability evaluated by the evaluation unit does not satisfy a predetermined criterion.

2. The ink jet printer according to claim 1, wherein the evaluation unit evaluates the reliability based on an amount of received light received by the optical movement measurement sensor, and the abnormality processing unit executes the abnormality process by determining that the reliability does not satisfy the predetermined criterion when the amount of received light received by the optical movement measurement sensor is less than a predetermined value.

3. The ink jet printer according to claim 1, wherein the evaluation unit evaluates the reliability based on whether the measurement by the optical movement measurement sensor is possible, and the abnormality processing unit executes the abnormality process by determining that the reliability does not satisfy the predetermined criterion when the measurement by the optical movement measurement sensor is impossible.

4. The ink jet printer according to claim 1, wherein the abnormality processing unit is configured to be capable of executing a notification process of notifying an abnormality as the abnormality process.

5. The ink jet printer according to claim 1, wherein the abnormality processing unit is configured to be capable of executing an interruption process of interrupting drawing as the abnormality process.

6. The ink jet printer according to claim 5, further comprising a reception unit that receives selection of execution or non-execution of the interruption process, wherein the abnormality processing unit is configured to execute the interruption process in a case where the reception unit receives the execution of the interruption process, and not to execute the interruption process in a case where the reception unit receives the non-execution of the interruption process.

7. The ink jet printer according to claim 1, wherein the optical movement measurement sensor includes a light projecting unit that projects light onto the drawing target object, and a light receiving unit that receives a speckle pattern, generated according to a characteristic of a surface shape of the drawing target object by the light projected from the light projecting unit, and generates light reception data including the speckle pattern, and generates the measurement value based on a movement amount of the speckle pattern included in the light reception data generated by the light receiving unit, the evaluation unit evaluates the reliability based on a recognition rate of the speckle pattern included in the light reception data generated by the light receiving unit, and the abnormality processing unit executes the abnormality process by determining that the reliability does not satisfy the predetermined criterion when the recognition rate of the speckle pattern is lower than a predetermined value.

8. The ink jet printer according to claim 1, further comprising a movement amount acquisition unit that acquires a movement amount caused by the conveyor, wherein the drawing control unit controls the ink ejection from the nozzle based on the movement amount acquired by the movement amount acquisition unit and the drawing data when the reliability evaluated by the evaluation unit does not satisfy the predetermined criterion.

9. An ink jet printer that ejects ink to draw information on an object conveyed by a conveyor, the ink jet printer comprising:

an ink tank that stores the ink;

a nozzle configured to eject the ink supplied from the ink tank toward a drawing target object;

a storage unit that stores drawing data specifying an ejection timing of the nozzle at each of a plurality of offset positions in a conveyance direction, the ejection timing corresponding to drawing information;

an optical movement measurement sensor that receives light from the drawing target object and generates a measurement value related to movement of the drawing target object in the conveyance direction based on the received light;

a drawing control unit that controls ink ejection from the nozzle based on a current offset position based on the measurement value generated by the optical movement measurement sensor, and the drawing data;

an evaluation unit that evaluates, as reliability of measurement by the optical movement measurement sensor, at least one of contrast of the drawing target generated according to an amount of received light from the drawing target object and quality of a speckle pattern generated according to a characteristic of a surface shape of the drawing target object; and an abnormality processing unit that executes an abnormality process when the reliability evaluated by the evaluation unit does not satisfy a predetermined criterion.

* * * * *